(12) United States Patent
Nakashima

(10) Patent No.: US 9,310,705 B2
(45) Date of Patent: Apr. 12, 2016

(54) COLOR IMAGE FORMING APPARATUS

(71) Applicant: CANON KABUSHIKI KAISHA, Tokyo (JP)

(72) Inventor: Satoshi Nakashima, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/945,466

(22) Filed: Jul. 18, 2013

(65) Prior Publication Data

US 2014/0037343 A1 Feb. 6, 2014

(30) Foreign Application Priority Data

Aug. 2, 2012 (JP) ................................. 2012-172304

(51) Int. Cl.
 *G03G 15/01* (2006.01)
 *H04N 1/50* (2006.01)
(52) U.S. Cl.
 CPC ............ *G03G 15/0131* (2013.01); *H04N 1/506* (2013.01); *G03G 2215/0158* (2013.01); *G03G 2215/0161* (2013.01)
(58) Field of Classification Search
 CPC ............... G03G 2215/0158; G03G 2215/0161
 USPC ................................................... 399/72, 301
 See application file for complete search history.

(56) References Cited

U.S. PATENT DOCUMENTS

| 7,777,767 B2 | 8/2010 | Tomita et al. |
| 2004/0041895 A1 | 3/2004 | Tajima |
| 2005/0041990 A1 | 2/2005 | Sugiyama |
| 2007/0268358 A1 | 11/2007 | Noguchi et al. |
| 2008/0226359 A1 | 9/2008 | Murayama |
| 2009/0162110 A1* | 6/2009 | Murayama .................... 399/301 |
| 2012/0148315 A1 | 6/2012 | Nakashima |

FOREIGN PATENT DOCUMENTS

| CN | 1967398 A | 5/2007 |
| CN | 101470378 A | 7/2009 |
| JP | 2001-356542 A | 12/2001 |

(Continued)

OTHER PUBLICATIONS

Office Action in Chinese Patent Application No. 201310332640.8, dated Aug. 14, 2015. r.

(Continued)

*Primary Examiner* — David Gray
*Assistant Examiner* — Michael Harrison
(74) *Attorney, Agent, or Firm* — Fitzpatrick, Cella, Harper & Scinto

(57) ABSTRACT

A color image forming apparatus includes an image forming unit configured to form misregistration detection patterns, a transfer member on which the misregistration detection patterns are transferred, a plurality of detection units configured to detect the misregistration detection patterns transferred onto the transfer member, a calculation unit which calculates misregistration values from detection results detected by the plurality of detection units, and a control unit which controls an image forming condition by the image forming unit based on the misregistration values. The image forming unit forms first and second marks at different positions in a direction perpendicular to a moving direction of the transfer member as the misregistration detection patterns, and the calculation unit calculates the misregistration values based on detection results of the first and second marks.

33 Claims, 33 Drawing Sheets

(56) References Cited

FOREIGN PATENT DOCUMENTS

| | | |
|---|---|---|
| JP | 2007-232763 A | 9/2007 |
| JP | 2009-223248 A | 10/2009 |
| JP | 2009-223276 A | 10/2009 |
| JP | 4506826 B2 | 7/2010 |
| JP | 2010-217798 A | 9/2010 |

OTHER PUBLICATIONS

Office Action in Korean Patent Application No. 10-2013-0091642, dated Sep. 18, 2015.

* cited by examiner

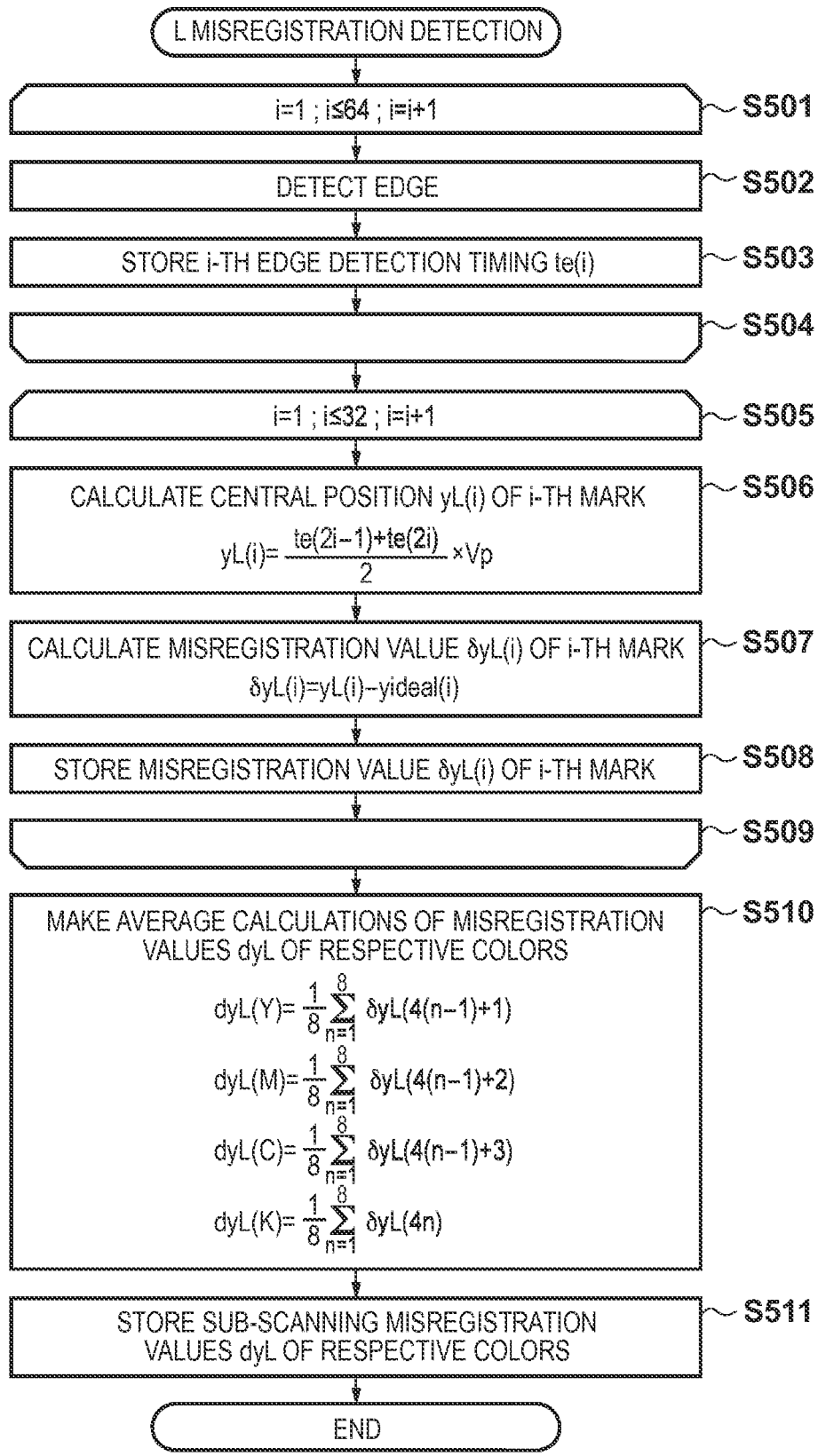

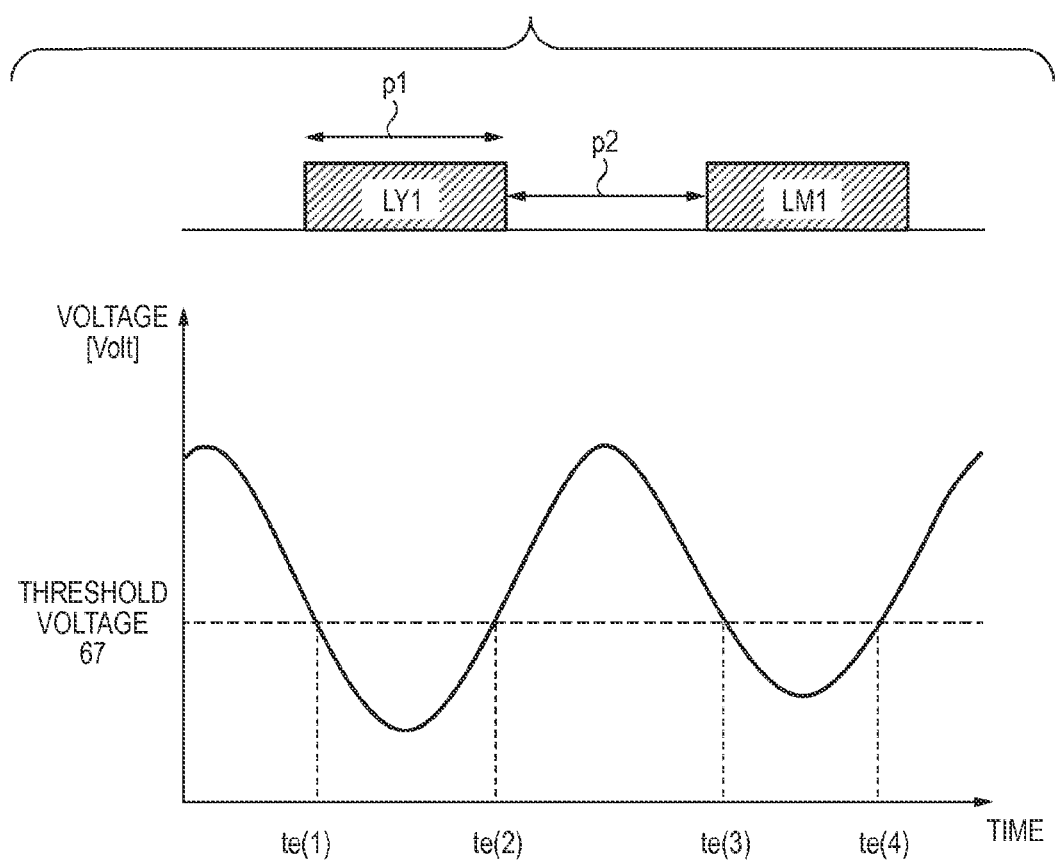

F I G. 17A
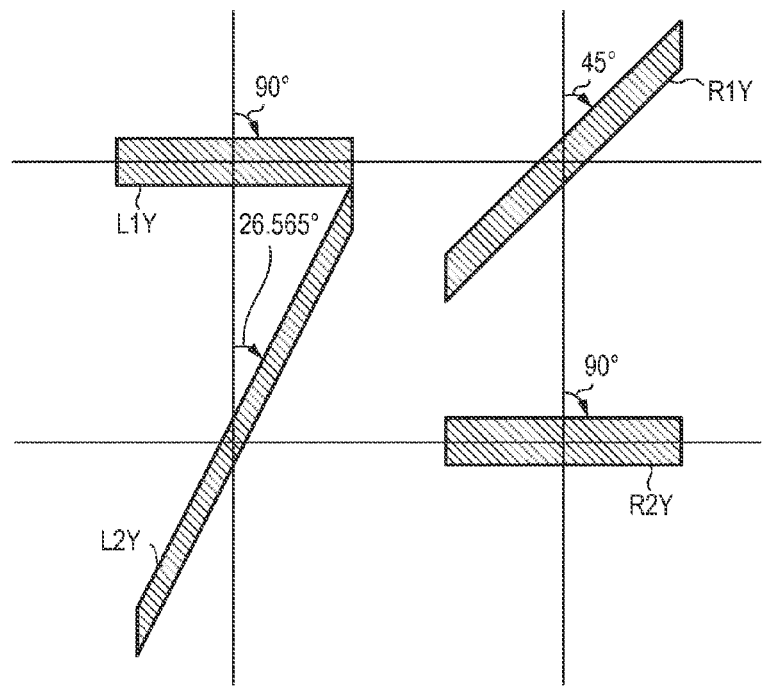
F I G. 17B
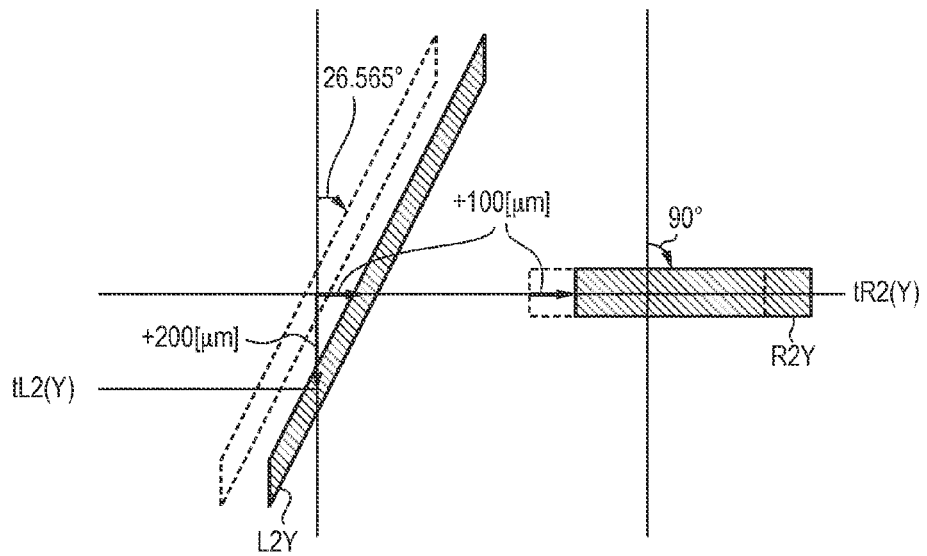

F I G. 18

| MARK ANGLE θ[deg] | 90 | 78.690 | 75.964 | 71.565 | 63.435 | 45 | 26.565 | 18.435 | 14.036 | 11.310 |
|---|---|---|---|---|---|---|---|---|---|---|
| SENSITIVITY RATIO x/y | 0 | 0.2 | 0.25 | 0.333 | 0.5 | 1 | 2 | 3 | 4 | 5 |
| CORRECTION COEFFICIENT α | | 5 | 4 | 3 | 2 | 1 | 0.5 | 0.333 | 0.25 | 0.2 |

FIG. 20B ( MAIN-SCANNING MISREGISTRATION VALUE CALCULATION )

S221 — CALCULATE LEFT AND RIGHT MAIN-SCANNING MISREGISTRATION VALUES dxL AND dxR OF RESPECTIVE COLORS $dxR(Y) = (tR1(Y) - tL1(Y)) \times Vp$
$dxL(Y) = (tL2(Y) - tR2(Y)) \times Vp$
$dxR(M) = (tR1(M) - tL1(M)) \times Vp$
$dxL(M) = (tL2(M) - tR2(M)) \times Vp$
$dxR(C) = (tR1(C) - tL1(C)) \times Vp$
$dxL(C) = (tL2(C) - tR2(C)) \times Vp$
$dxR(K) = (tR1(K) - tL1(K)) \times Vp$
$dxL(K) = (tL2(K) - tR2(K)) \times Vp$ S222 — CALCULATE SUB-SCANNING TILT MISREGISTRATION VALUES yprl OF RESPECTIVE COLORS $yprl(Y) = (tR3(Y) - tL3(Y)) \times Vp$
$yprl(M) = (tR3(M) - tL3(M)) \times Vp$
$yprl(C) = (tR3(C) - tL3(C)) \times Vp$
$yprl(K) = (tR3(K) - tL3(K)) \times Vp$ S223 — CALCULATE MAIN-SCANNING WRITE START POSITION MISREGISTRATION VALUES xtop $xtop(Y) = \frac{1}{2}(dxR(Y) + dxL(Y))$ $xtop(M) = \frac{1}{2}(dxR(M) + dxL(M))$ $xtop(C) = \frac{1}{2}(dxR(C) + dxL(C))$ $xtop(K) = \frac{1}{2}(dxR(K) + dxL(K))$ S224 — CALCULATE MAIN-SCANNING TOTAL MAGNIFICATION DISPLACEMENT VALUES xtw $xtw(Y) = dxR(Y) - dxL(Y) - 2 \times yprl(Y)$
$xtw(M) = dxR(M) - dxL(M) - 2 \times yprl(M)$
$xtw(C) = dxR(C) - dxL(C) - 2 \times yprl(C)$
$xtw(K) = dxR(K) - dxL(K) - 2 \times yprl(K)$ S225 — STORE MAIN-SCANNING MISREGISTRATION VALUES xtop AND xtw OF RESPECTIVE COLORS ( END )

FIG. 22B

```
MAIN-SCANNING
MISREGISTRATION VALUE
CALCULATION
```

S231 — CALCULATE LEFT AND RIGHT MAIN-SCANNING MISREGISTRATION VALUES dxL AND dxR OF RESPECTIVE COLORS $$dxR(Y) = -(tR1(Y) - tL1(Y)) \times Vp$$
$$dxL(Y) = (tL2(Y) - tR2(Y)) \times Vp$$
$$dxR(M) = -(tR1(M) - tL1(M)) \times Vp$$
$$dxL(M) = (tL2(M) - tR2(M)) \times Vp$$
$$dxR(C) = -(tR1(C) - tL1(C)) \times Vp$$
$$dxL(C) = (tL2(C) - tR2(C)) \times Vp$$
$$dxR(K) = -(tR1(K) - tL1(K)) \times Vp$$
$$dxL(K) = (tL2(K) - tR2(K)) \times Vp$$

S232 — CALCULATE SUB-SCANNING TILT MISREGISTRATION VALUES yprl OF RESPECTIVE COLORS $$yprl(Y) = (tR3(Y) - tL3(Y)) \times Vp$$
$$yprl(M) = (tR3(M) - tL3(M)) \times Vp$$
$$yprl(C) = (tR3(C) - tL3(C)) \times Vp$$
$$yprl(K) = (tR3(K) - tL3(K)) \times Vp$$

S233 — CALCULATE MAIN-SCANNING WRITE START POSITION MISREGISTRATION VALUES xtop $$xtop(Y) = \frac{1}{2}(dxR(Y) + dxL(Y)) + \frac{1}{2} yprl(Y)$$
$$xtop(M) = \frac{1}{2}(dxR(M) + dxL(M)) + \frac{1}{2} yprl(M)$$
$$xtop(C) = \frac{1}{2}(dxR(C) + dxL(C)) + \frac{1}{2} yprl(C)$$
$$xtop(K) = \frac{1}{2}(dxR(K) + dxL(K)) + \frac{1}{2} yprl(K)$$

S234 — CALCULATE MAIN-SCANNING TOTAL MAGNIFICATION DISPLACEMENT VALUES xtw $$xtw(Y) = dxR(Y) - dxL(Y)$$
$$xtw(M) = dxR(M) - dxL(M)$$
$$xtw(C) = dxR(C) - dxL(C)$$
$$xtw(K) = dxR(K) - dxL(K)$$

S235 — STORE MAIN-SCANNING MISREGISTRATION VALUES xtop AND xtw OF RESPECTIVE COLORS

END

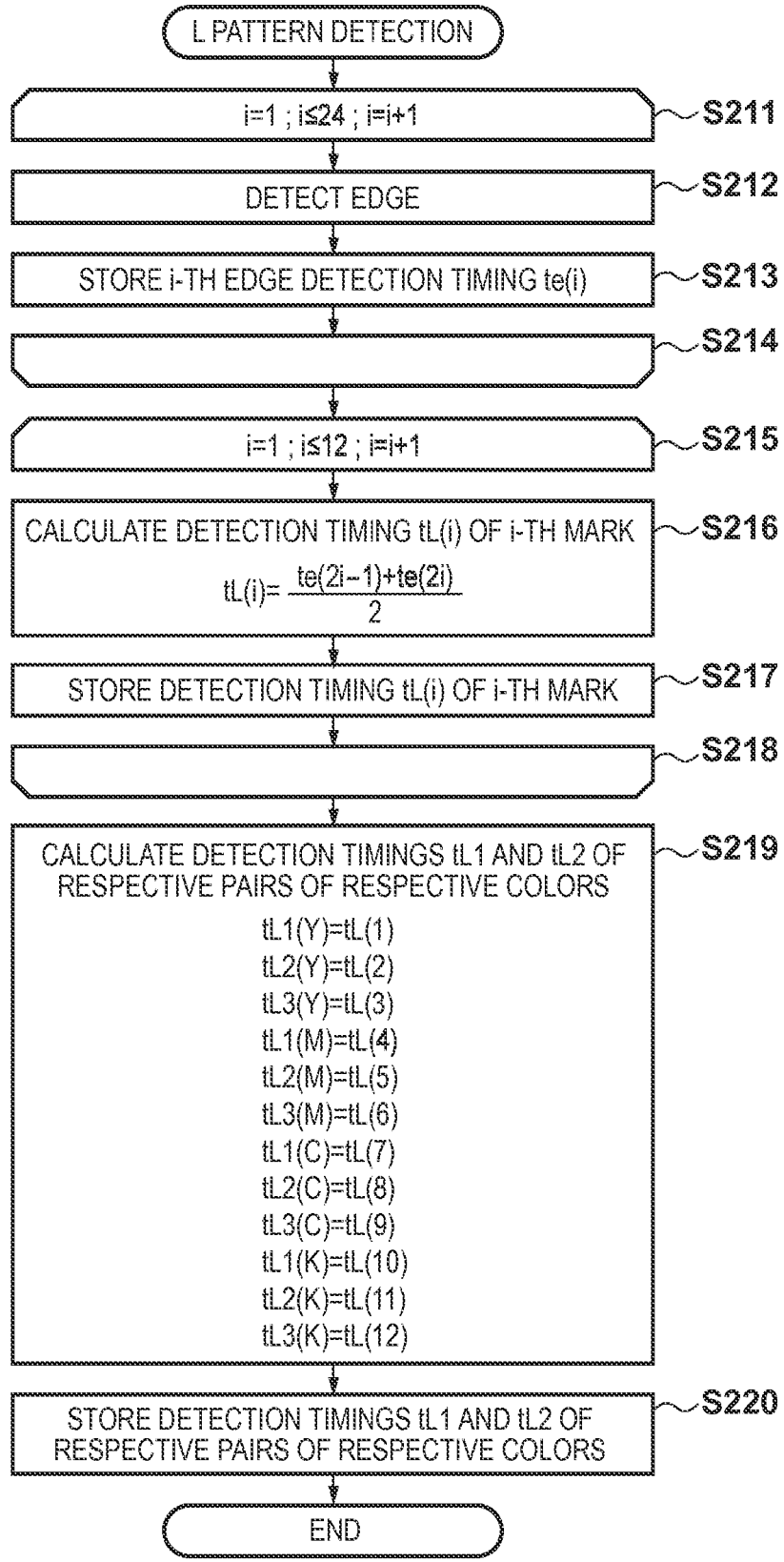

COLOR IMAGE FORMING APPARATUS

BACKGROUND OF THE INVENTION

1. Field of the Invention

The present invention relates to a color image forming apparatus using an electrophotography system.

2. Description of the Related Art

In a color image forming apparatus of an electrophotography system, a so-called tandem system including independent image forming units of respective colors so as to print an image at high speed is known. In such color image forming apparatus, mechanical factors in the image forming units of respective colors cause color misalignment (misregistration) upon superimposing images. Especially, in an arrangement independently including units of a laser scanner (optical scanning device) and photosensitive drum in the image forming unit of each color, steady (to be referred to as DC hereinafter) color misalignment occurs.

In order to correct DC color misalignment, in color misalignment correction control, detection toner images of respective colors are transferred from photosensitive drums onto an image carrier, and relative positions of the detection toner images in a scanning direction and conveyance direction are detected using an optical scanner. However, when detection toner images required to detect DC color misalignment are formed, periodic rotation velocity fluctuations of the photosensitive drums occur due to decentering and the like of rollers required to drive the photosensitive drums and an intermediate transfer belt. Such rotation velocity fluctuations cause non-steady (to be referred to as AC hereinafter) color misalignment, resulting in generation of detection errors.

As a measure against detection errors caused by AC color misalignment, Japanese Patent Laid-Open No. 2001-356542 has proposed the following means. That is, toner marks of respective colors are arranged to be spaced by an integer value at intervals of an integral submultiple of a period of velocity fluctuations as a case of AC components in detection patterns. By averaging mark detection results for respective colors, AC detection errors are eliminated.

FIG. 28 shows an example of the detection patterns of this related art. Assume that a linear mark is used. The number of sets of marks used in averaging processing is n, and a total of eight marks for four colors, that is, traverse line marks tLY1, tLM1, tLC1, and tLK1 and slant line marks sLY1, sLM1, sLC1, and sLK1 are arranged as the first set on the left side. The second and subsequent sets have the similar arrangement, and are repeated up to the n-th set. The same applies to marks arranged on the right side. The right and left detection patterns are formed as an image on a belt in correspondence with positions of right and left optical sensors. Color misalignment in a sub-scanning direction is calculated from detection results of the traverse line marks, and that in a main-scanning direction is calculated from detection results of the traverse line marks and slant line marks.

When the detection patterns as in Japanese Patent Laid-Open No. 2001-356542 are formed, a plurality of sets of detection marks have to be formed, resulting in a large total pattern length and a long color misalignment detection time. Since the total pattern length is large, toner consumption unwantedly increases.

When there are a plurality of periods (for example, a drum period, driving roller period, belt period, and the like) of AC components to be removed in AC color misalignment, detection errors of all the periods cannot be removed, and the detection precision may drop. This is because the total length of detection patterns which can be formed as an image on a belt at the same time is limited to one period of the belt, and the total length of ideal patterns required to remove detection errors of all AC component periods becomes very large beyond the limit normally as one period of the belt. That is, detection patterns formed within one period of the belt cannot remove all AC components, and detection errors remain to some extent.

SUMMARY OF THE INVENTION

In consideration of the aforementioned problems, the present invention provides a technique which can precisely detect color misalignment in the main-scanning direction by reducing the influence of detection errors caused by AC components.

According to one aspect of the present invention, there is provided a color image forming apparatus, which comprises a plurality of image forming units, corresponding to respective colors, for forming images on an intermediate transfer member or a conveyed printing material, in a tandem system, comprising: control unit configured to control the plurality of image forming units to form misregistration detection patterns on the intermediate transfer member, the printing material, or a conveyance member which conveys the printing material; first detection unit and second detection unit configured to detect the formed misregistration detection patterns, the first detection unit and the second detection unit being arranged to be juxtaposed in a direction perpendicular to a moving direction of the intermediate transfer member or in a direction perpendicular to a conveyance direction of the printing material; calculation unit configured to calculate misregistration values from detection results of the misregistration detection patterns by the first detection unit and the second detection unit; and correction unit configured to correct image forming conditions by the plurality of image forming units using the calculated misregistration values, wherein the misregistration detection patterns include: a linear first reference mark and a first detection mark to be detected by the first detection unit; and a linear second reference mark and a second detection mark to be detected by the second detection unit, the first reference mark and the second reference mark make substantially 90° as an angle with the moving direction of the intermediate transfer member or the conveyance direction of the printing material, an angle the second detection mark makes with the moving direction of the intermediate transfer member or the conveyance direction of the printing material is smaller than an angle made by the first reference mark, an angle the first detection mark makes with the moving direction of the intermediate transfer member or the conveyance direction of the printing material is smaller than an angle made by the second reference mark, the first reference mark and the second detection mark are arranged so that a detection timing of the first reference mark by the first detection unit and a detection timing of the second detection mark by the second detection unit are concurrent timings when no misregistration occurs on the intermediate transfer member, the printing material, or the conveyance member, the second reference mark and the first detection mark are arranged so that a detection timing of the first detection mark by the first detection unit and a detection timing of the second reference mark by the second detection unit are concurrent timings when no misregistration occurs on the intermediate transfer member, the printing material, or the conveyance member, the misregistration values include a write start position misregistration value indicating a misregistration value of a write start position and a total magnification displacement value indicating a misregistration value of an output magnification in the direction perpendicular to the moving direction of the intermediate transfer member or the direction perpendicular to the conveyance direction of the printing material, the calculation unit calculates the write start position misregistration value from an average value of a difference between detection timings of the first reference mark and the second detection mark and a difference between detection timings of the second reference mark and the first detection mark, and the calculation unit calculates the total magnification displacement value from a difference between the difference between detection timings of the first reference mark and the second detection mark and the difference between the detection timings of the second reference mark and the first detection mark.

According to another aspect of the present invention, there is provided a color image forming apparatus, which comprises a plurality of image forming units, corresponding to respective colors, for forming images on an intermediate transfer member or a conveyed printing material, in a tandem system, comprising: control unit configured to control the plurality of image forming units to form misregistration detection patterns on the intermediate transfer member, the printing material, or a conveyance member which conveys the printing material; first detection unit and second detection unit configured to detect the misregistration detection patterns formed on the intermediate transfer member, the printing material, or the conveyance member which conveys the printing material, the first detection unit and the second detection unit being arranged to be juxtaposed in a direction perpendicular to a moving direction of the intermediate transfer member or in a direction perpendicular to a conveyance direction of the printing material; calculation unit configured to calculate misregistration values from detection results of the misregistration detection patterns by the first detection unit and the second detection unit; and correction unit configured to correct image forming conditions by the plurality of image forming units from the calculated misregistration values, wherein the misregistration detection patterns include: a linear first reference mark, a first detection mark, and a third reference mark to be detected by the first detection unit; and a linear second reference mark, a second detection mark, and a third detection mark to be detected by the second detection unit, the first reference mark, the second reference mark, and the third reference mark make substantially 90° as an angle with the moving direction of the intermediate transfer member or the conveyance direction of the printing material, an angle the second detection mark makes with the moving direction of the intermediate transfer member or the conveyance direction of the printing material is smaller than an angle made by the first reference mark, an angle the first detection mark makes with the moving direction of the intermediate transfer member or the conveyance direction of the printing material is smaller than an angle made by the second reference mark, an angle the third detection mark makes with the moving direction of the intermediate transfer member or the conveyance direction of the printing material has a sign different from an angle the second detection mark makes with the conveyance direction of the intermediate transfer member, the first reference mark and the second detection mark are arranged so that a detection timing of the first reference mark by the first detection unit and a detection timing of the second detection mark by the second detection unit are concurrent timings when no misregistration occurs on the intermediate transfer member or the printing material, the second reference mark and the first detection mark are arranged so that a detection timing of the first detection mark by the first detection unit and a detection timing of the second reference mark by the second detection unit are concurrent timings when no misregistration occurs on the intermediate transfer member or the printing material, the third reference mark and the third detection mark are arranged so that a detection timing of the third reference mark by the first detection unit and a detection timing of the third detection mark by the second detection unit are concurrent timings when no misregistration occurs on the intermediate transfer member or the printing material, the misregistration values include a write start position misregistration value indicating a misregistration value of a write start position and a total magnification displacement value indicating a misregistration value of an output magnification in the direction perpendicular to the moving direction of the intermediate transfer member or the direction perpendicular to the conveyance direction of the printing material, the calculation unit calculates the write start position misregistration value from an average value of a difference between detection timings of the first reference mark and the second detection mark and a difference between detection timings of the second reference mark and the first detection mark, and the calculation unit calculates the total magnification displacement value from a difference between a value of a different sign of a difference between detection timings of the third reference mark and the third detection mark and the difference between the detection timings of the second reference mark and the first detection mark.

According to another aspect of the present invention, there is provided a color image forming apparatus comprising: image forming unit configured to form misregistration detection patterns; a transfer member on which the misregistration detection patterns are transferred; a plurality of detection units configured to detect the misregistration detection patterns transferred onto the transfer member; calculation unit configured to calculate misregistration values from detection results detected by the plurality of detection units; and control unit configured to control an image forming condition by the image forming unit based on the misregistration values, wherein the image forming unit forms a first mark and a second mark at different positions in a direction perpendicular to a moving direction of the transfer member as the misregistration detection patterns, and the calculation unit calculates the misregistration values based on a detection result of the first mark and a detection result of the second mark detected by the plurality of detection units.

According to another aspect of the present invention, there is provided a color image forming apparatus comprising: image forming unit configured to form misregistration detection patterns; a transfer member on which the misregistration detection patterns are transferred; first detection unit and second detection unit arranged to be juxtaposed in a direction perpendicular to a moving direction of the transfer member; calculation unit configured to calculate misregistration values from detection results of the first detection unit and the second detection unit; and control unit configured to control an image forming condition by the image forming unit based on the misregistration values, wherein the misregistration detection patterns include a linear first reference mark and a first detection mark to be detected by the first detection unit, and a linear second reference mark and a second detection mark to be detected by the second detection unit, and the first detection unit detects the first reference mark and then detects the first detection mark, and the second detection unit detects the second detection mark and then detects the second reference mark.

According to the present invention, color misalignment in the main-scanning direction can be precisely detected by reducing the influence of detection errors caused by AC components.

Further features of the present invention will become apparent from the following description of exemplary embodiments (with reference to the attached drawings).

BRIEF DESCRIPTION OF THE DRAWINGS

FIGS. 5A and 5B are flowcharts of sub-scanning misregistration value detection;

FIG. 7 is a graph showing a voltage signal when patterns are detected by the registration detection sensor;

FIGS. 17A and 17B are views showing the main-scanning misregistration detection patterns when an angle of a slant line mark is set to be an acute angle;

FIG. 18 is a table showing the relationship between angles of the slant line mark and correction coefficients;

FIGS. 20A and 20B are flowcharts of main-scanning misregistration value detection according to the second embodiment;

FIGS. 25A and 25B are flowcharts of main-scanning misregistration value detection according to the fourth embodiment;

DESCRIPTION OF THE EMBODIMENTS

Embodiments of the present invention will be exemplarily explained in detail hereinafter with reference to the drawings. Components described in the following embodiments are presented for the exemplary purpose only, and the scope of the present invention is not limited to them.

Figure 27A:
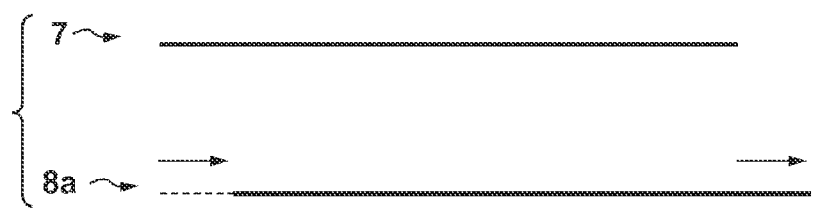
FIGS. 27A, 27B, 27C, and 27D are views showing conventional DC color misalignment.
Figure 27B:
Figure 27C:
Figure 27D:

Color misalignment to be handled by the present invention will be described first. FIGS. 27A to 27D respectively show four representative examples of DC color misalignment. A solid line 7 and broken lines indicate an original image position, and solid lines 8 indicate image positions when color misalignment has occurred. FIGS. 27A and 27B show color misalignment in the main-scanning direction, and FIGS. 27C and 27D show color misalignment in the sub-scanning direction.

FIG. 27A shows an error of a write start position in the main-scanning direction, which is called a main-scanning write start position misregistration, and occurs, for example, when the positional relationship between a laser scanner and photosensitive drum in the main-scanning direction has changed. FIG. 27B shows an error of an output magnification (total magnification) caused by variations of main-scanning line widths, which is called a main-scanning total magnification displacement, and occurs due to a distance difference between the laser scanner and photosensitive drum. FIG. 27C shows an error of a write start position in the sub-scanning direction, which is called a sub-scanning write start position misregistration, and occurs, for example, when the positional relationship between the laser scanner and photosensitive drum in the sub-scanning direction has changed. FIG. 27D shows a position error as a tilt of a main-scanning line in the sub-scanning direction, which is called a sub-scanning tilt misregistration, and occurs, for example, when the laser scanner and photosensitive drum suffer a tilt.

First Embodiment

Image Forming Operation of Overall Printer

Figure 1:
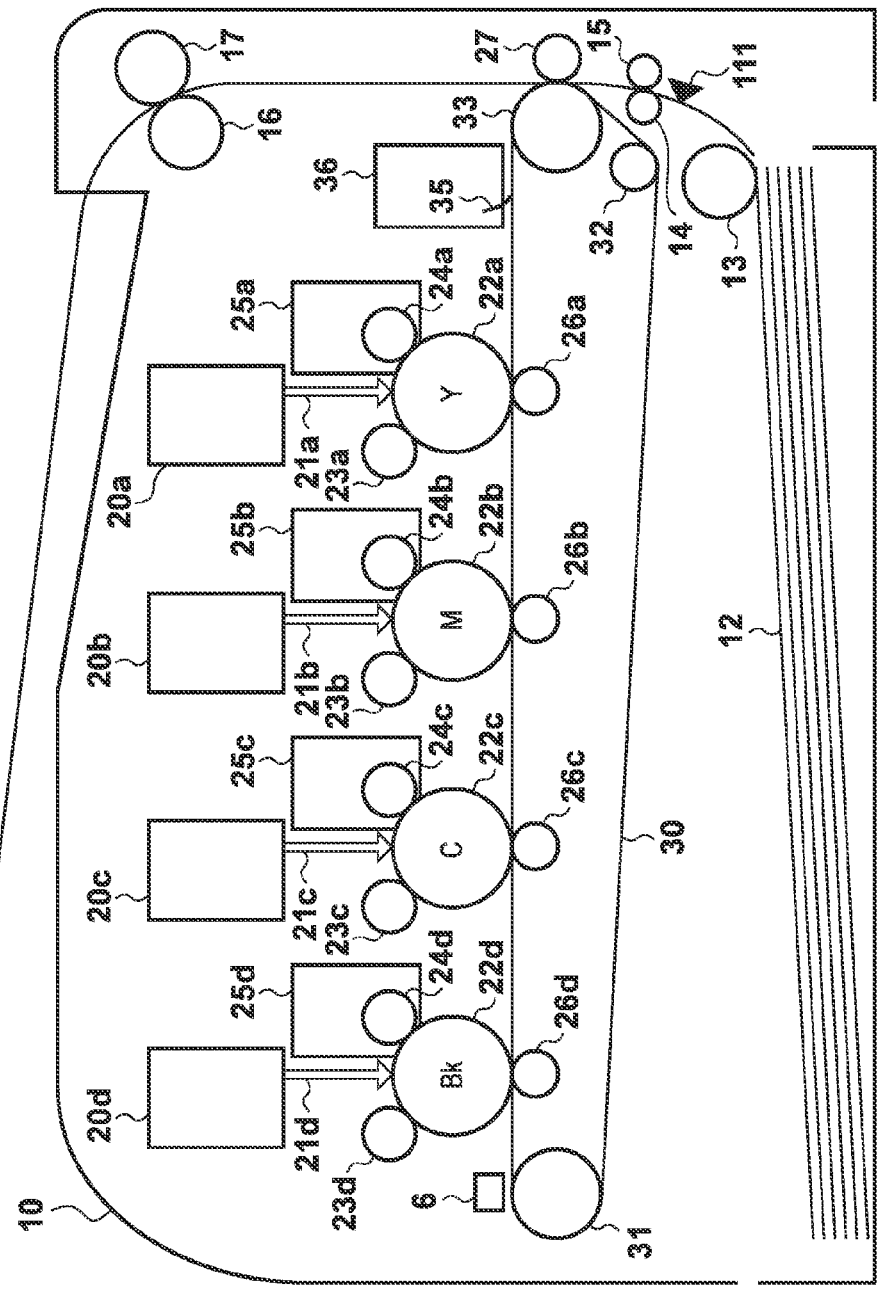
FIG. 1 is a view showing the arrangement of a color image forming apparatus of a tandem system (four-drum system)

FIG. 1 is a view showing the arrangement of a color image forming apparatus 10 of a tandem system (4-drum system). A leading end position of a printing medium 12, which is picked up by a pickup roller 13, is detected by a registration sensor 111, and conveyance of the printing medium is temporarily stopped at a position where the leading end has slightly passed a pair of conveyance rollers 14 and 15. On the other hand, scanner units 20a to 20d include reflection mirrors and laser diodes (light-emitting elements), and sequentially irradiate photosensitive drums 22a to 22d as photosensitive members to be rotated with laser beams 21a to 21d. At this time, the surfaces of the photosensitive drums 22a to 22d are charged in advance by charging rollers 23a to 23d.

Each charging roller outputs a voltage of, for example, −1,200 V, and the surface of the corresponding photosensitive drum is charged at, for example, −700 V. At this charging potential, when an electrostatic latent image is formed by irradiation of each of the laser beams 21a to 21d, a potential of a portion where the electrostatic latent image is formed is changed to, for example, −100 V. Developers 25a to 25d (developing sleeves 24a to 24d) output a voltage of, for example, −350 V, and supply toners to electrostatic latent images on the photosensitive drums 22a to 22d, thus forming toner images on the photosensitive drums. Primary transfer rollers 26a to 26d output a positive voltage of, for example, +100 V, thereby transferring the toner images on the photosensitive drums 22a to 22d onto an intermediate transfer belt 30 (endless belt) as a transfer member.

Note that members directly required to form toner images such as the charging roller 23, developer 25, and primary transfer roller 26 as well as the scanner unit 20 and photosensitive drum 22 will be referred to as an image forming unit hereinafter. In some cases, such members except for the scanner unit 20 may be referred to as an image forming unit.

The intermediate transfer belt 30 is driven to be rotated by rollers 31, 32, and 33, and conveys the toner images to a position of a secondary transfer roller 27. At this time, the conveyance of the printing medium 12 is restarted to be synchronized with a timing of the conveyed toner image at the secondary transfer position of the secondary transfer roller 27. Then, the secondary transfer roller 27 transfers the toner images from the intermediate transfer belt 30 onto a printing material (printing medium 12).

After that, the toner images on the printing medium 12 are heated and fixed by a pair of fixing rollers 16 and 17, and the printing medium 12 is then output outside the apparatus. In this case, residual toners, which are not transferred from the intermediate transfer belt 30 onto the printing medium 12 by the secondary transfer roller 27, are recovered into a waste toner container 36 by a cleaning blade 35.

A registration detection sensor 6 as a misregistration (color misalignment) detection means reads misregistration (color misalignment) detection patterns according to the present invention, which include toner marks formed on the intermediate transfer belt 30, and executes misregistration (color misalignment) detection by a method to be described later. Note that alphabetic letters a, b, c, and d of reference numerals respectively indicate yellow, magenta, cyan, and black members and units. In the following description, reference numerals without these alphabetical letters will be described when the members of the same type perform the same operations.

Note that in FIG. 1, the system which performs light irradiation by the scanner units has been explained. However, the present invention is not limited to this, and an image forming apparatus including, for example, an LED array as a light irradiation means may be applied to the following embodiments in terms of occurrence of color misalignment (misregistration). The case will be described hereinafter wherein the image forming apparatus includes the scanner units as the light irradiation means.

The image forming apparatus including the intermediate transfer belt has been described above. However, the present invention is applicable to image forming apparatuses of other systems. For example, a system which includes a printing material conveyor belt, and directly transfers toner images developed on the photosensitive drums onto a transfer material (printing material) conveyed by the printing material conveyor belt (endless belt) in place of forming toner images on the intermediate transfer belt may be adopted.

In the present specification, a moving direction of the intermediate transfer belt 30 corresponds to a sub-scanning direction, and a direction perpendicular to the moving direction corresponds to a main-scanning direction.

[Registration Detection Sensor and Operation]

Figure 2A:
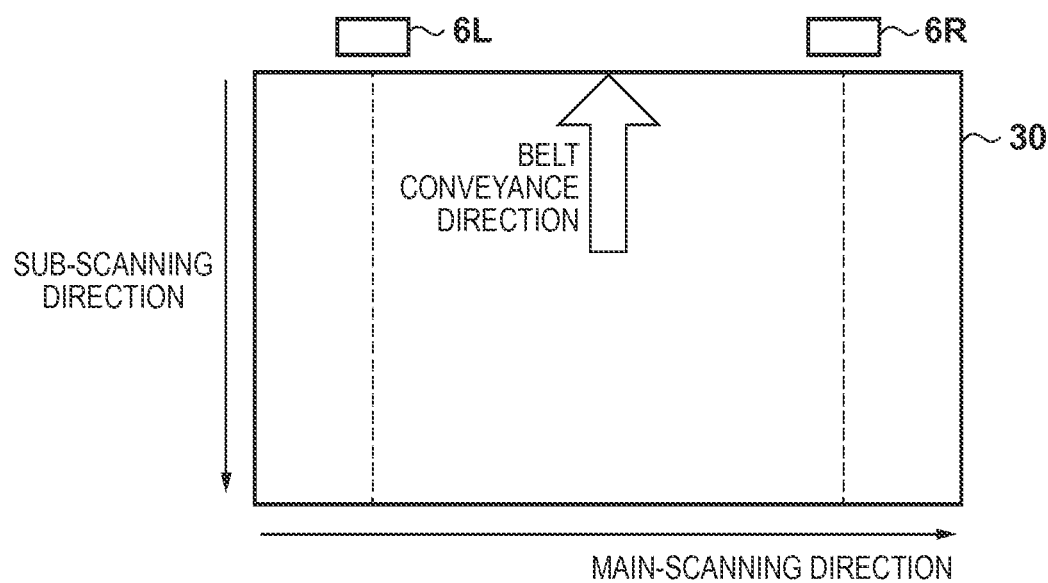
FIGS. 2A, 2B, and 2C are views for explaining the arrangement of a registration detection sensor and the schematic circuit arrangement of a control unit 45.
Figure 2B:
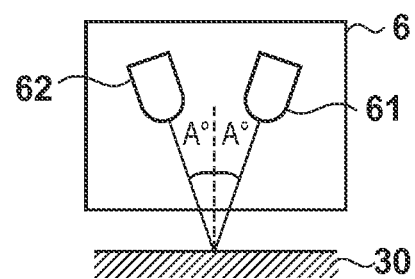

The detailed arrangement of the intermediate transfer belt 30 and registration detection sensor 6 will be described below with reference to FIGS. 2A to 2C.

The arrangement of the registration detection sensor 6 will be described below with reference to FIG. 2A. Two sensors 6L and 6R are arranged in the main-scanning direction as the registration detection sensors 6. The sensor 6L is arranged at an image write start side in the main-scanning direction, and the sensor 6R is arranged at an image write end side in the main-scanning direction.

The arrangement of the registration detection sensor 6 will be described below with reference to FIG. 2B. The registration detection sensor 6 includes an LED 61 as a light irradiation means and a phototransistor 62 (to be abbreviated as PTR hereinafter) as a light amount detection means, which are mounted obliquely. The LED 61 is mounted obliquely with respect to a detection surface, and may be configured to irradiate the detection surface with light obliquely using a light guide and the like. The LED 61 and PTR 62 are arranged to be tilted by an angle A from the center to be optically symmetrical with each other, as shown in FIG. 2B. The PTR 62 receives light which is emitted by the LED 61 and is regularly reflected by the surface of the intermediate transfer belt 30. In this embodiment, the sensor which detects only regular reflected light is arranged. Also, a phototransistor which detects irregular reflected light may be added.

Figure 2C:
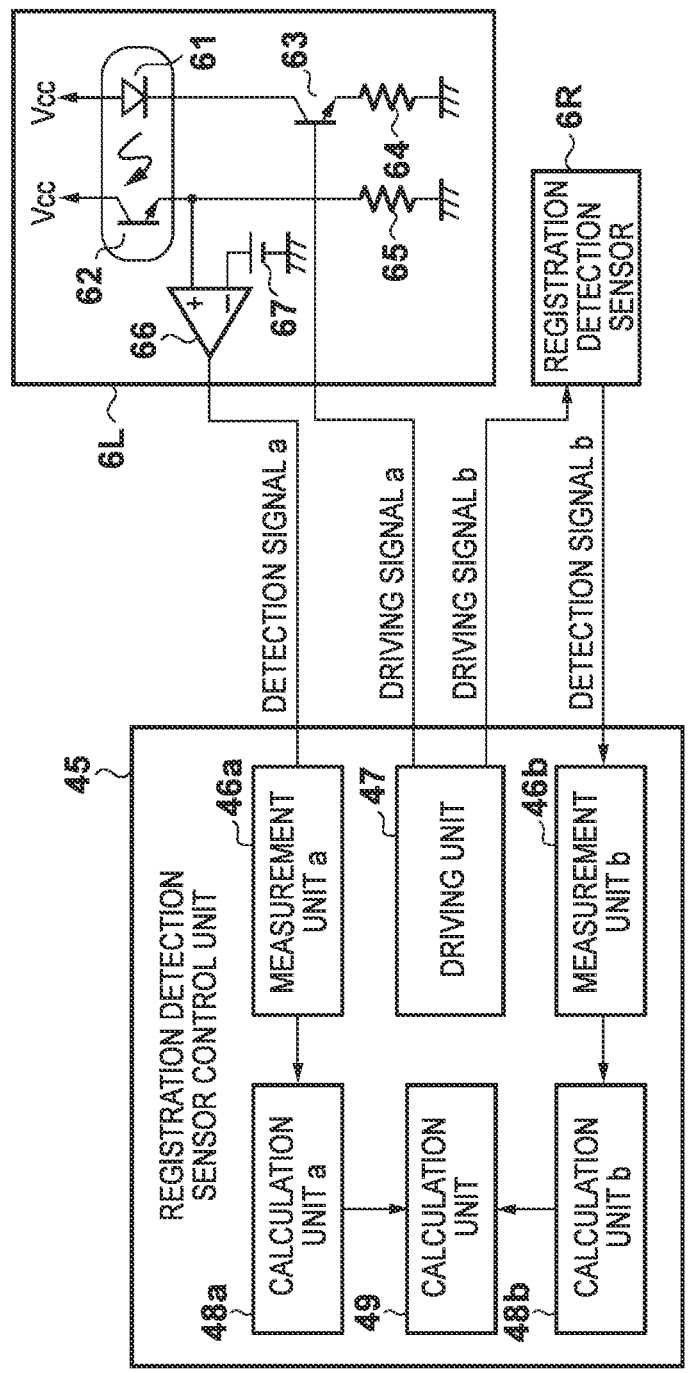

FIG. 2C is a schematic circuit diagram of the registration detection sensors 6L and 6R and a registration detection sensor control unit 45. The registration detection sensor 6L includes the LED 61, the PTR 62, a transistor 63, resistors 64 and 65, a comparator 66, and a threshold voltage 67. The transistor 63 is used to turn on/off the LED 61. The resistor 64 limits a current flowing through the LED. The resistor 65 is used to convert a photocurrent of the PTR 62 into an optical voltage. The comparator 66 outputs a detection signal a by binarizing the voltage converted by the resistor 65. The threshold voltage 67 is that of the comparator 66. The arrangement of the registration detection sensor 6R is the same as that of the registration detection sensor 6L, and a description thereof will not be repeated.

The registration detection sensor control unit 45 includes a driving unit 47, measurement units 46 (46a and 46b), calculation units 48 (48a and 48b), and calculation unit 49. The driving unit 47 outputs driving signals a and b required to turn on/off the LEDs. The measurement units 46 measure output times of detection signals a and b output from the registration detection sensors 6 (6L and 6R). The calculation units 48 calculate color misalignment amounts detected by the registration detection sensors 6 based on the measurement results of the measurement units 46. The calculation unit 49 calculates a correction value such as an image write start position based on the calculation results of the calculation units 48.

When the driving unit 47 outputs an LED-ON signal, the transistor 63 is turned on, and the LED 61 emits light. The PTR 62 generates a photocurrent upon reception of light which is emitted from the LED 61 and is regularly reflected by the intermediate transfer belt 30. The comparator 66 compares an optical voltage converted by the resistor 65 with the threshold voltage 67, and outputs High when the optical voltage is lower than the threshold voltage 67 or Low when the optical voltage is higher than the threshold voltage 67.

Misregistration detection patterns shown in FIGS. 6A, 6B, and 12 (to be described later) are formed on the intermediate transfer belt 30, and are read by the registration detection sensors 6, thereby detecting misregistration values of respective colors. Alternatively, relative color misalignment values between colors as differences from predetermined reference colors may be calculated. Note that a series of color misalignment correction control processes are executed at a timing independent of normal image forming processing. For example, the series of color misalignment correction control processes are executed at, for example, a power-ON timing or a judgment timing of deterioration of color misalignment due to an increased interior temperature during continuous printing (to be described later). Details of the color misalignment correction control execution timing as correction of image forming conditions will be described later.

[Functional Block Diagram of Color Misalignment Correction Control]

Figure 3:
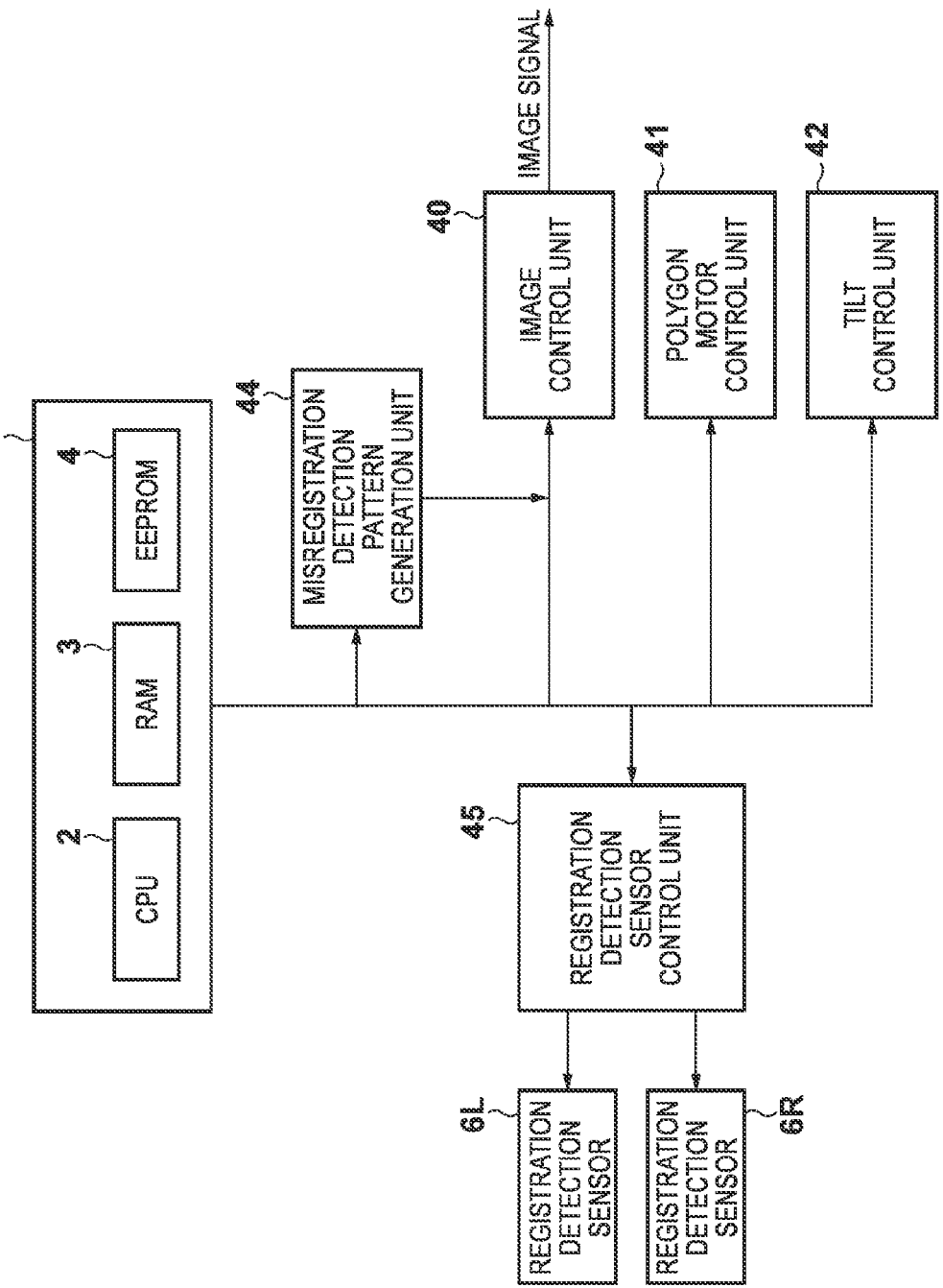
FIG. 3 is a functional block diagram related to color misalignment correction control.

FIG. 3 is a block diagram showing the overall color misalignment correction control operation of this embodiment.

A control unit 1 systematically controls the color misalignment correction control operation. A CPU 2 controls operation timings of respective blocks and communications between these blocks via a bus (not shown) in accordance with various data (to be described later), which are stored in an EEPROM 4 and are related to the color misalignment correction operation, using a RAM 3 as a main memory and work area.

Figure 6A:
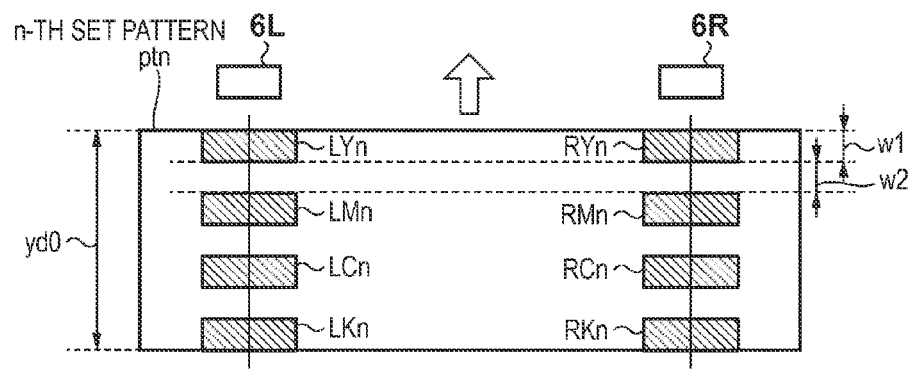
FIGS. 6A and 6B are views showing sub-scanning misregistration detection patterns.
Figure 6B:
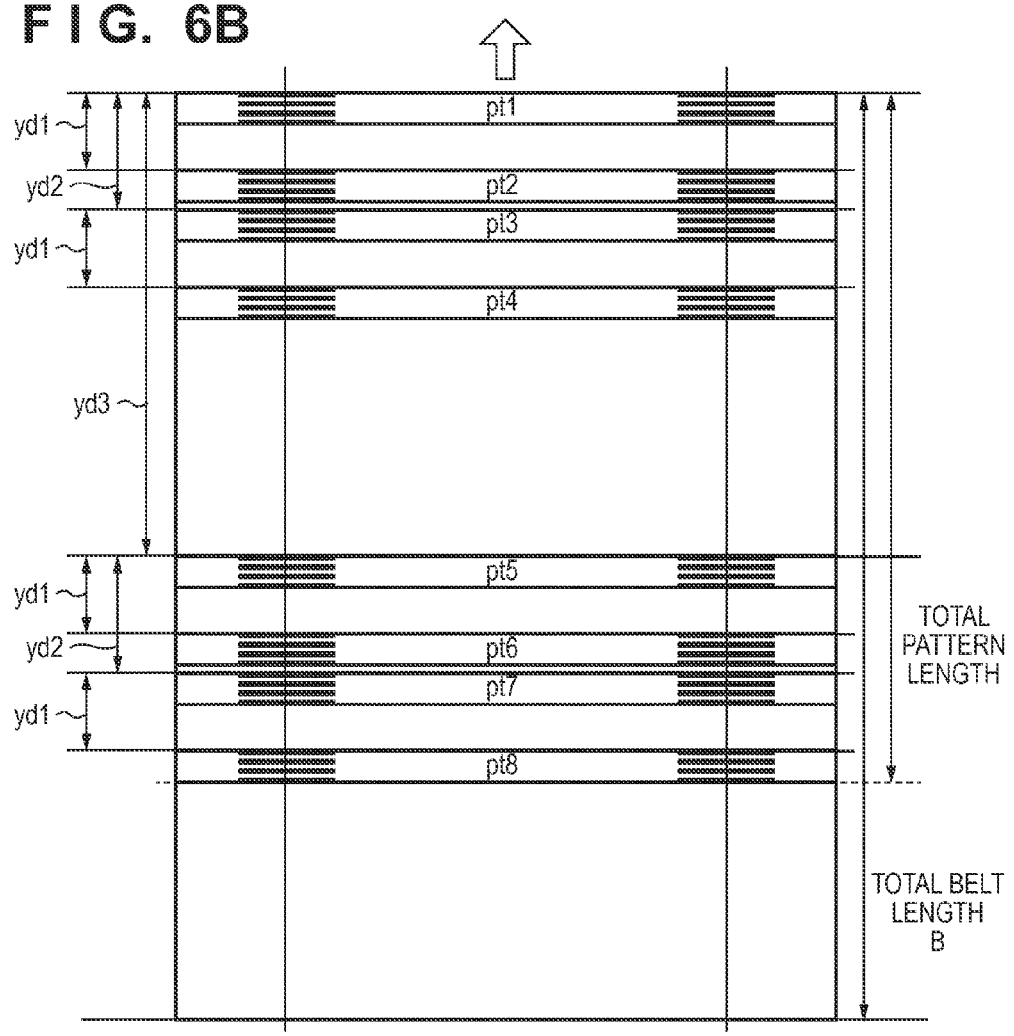
Figure 12:
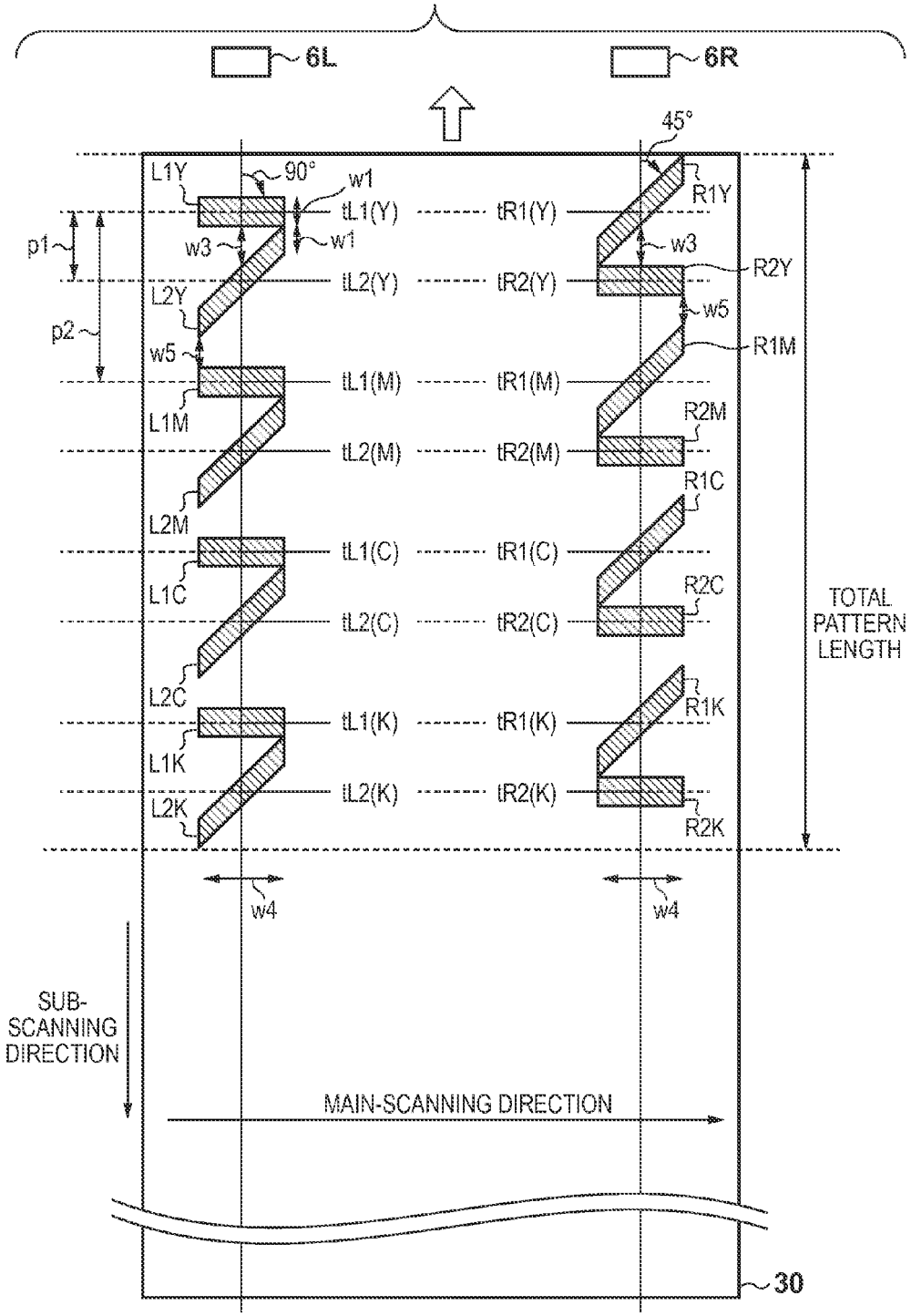
FIG. 12 is a view showing main-scanning misregistration detection patterns.

When the color misalignment correction control is executed, image data which is stored in the EEPROM 4 and expresses misregistration detection patterns is read out, and a misregistration detection pattern generation unit 44 generates an image of detection patterns (FIGS. 6A, 6B, and 12; to be described later). The patterns used in this embodiment use linear marks. The generated detection patterns are converted into image signals of C, M, Y, and K colors by an image control unit 40, and are output to the scanner units 20a to 20d, thus forming an image of the detection patterns on the intermediate transfer belt 30. The detection patterns formed as the image are read by the registration detection sensors 6 controlled by the registration detection sensor control unit 45, which calculates color misalignment correction values. The color misalignment correction values calculated based on the detection results are stored in the EEPROM 4.

The color misalignment correction values used in this embodiment include four different types of correction values, that is, main-scanning write start position misregistration, main-scanning total magnification displacement, sub-scanning write start position misregistration, and sub-scanning tilt misregistration correction values, which are required to correct DC color misalignment as described with reference to FIGS. 27A to 27D and are prepared as many as the number of colors. The image control unit 40 executes correction of video clock frequencies and write start timings in accordance with the stored main-scanning write start position misregistration and main-scanning total magnification displacement color misalignment correction values. A polygon motor control unit 41 controls plane phases of a polygon according to the sub-scanning write start position misregistration color misalignment correction values, thus executing correction of write start timings. A tilt control unit 42 corrects tilts of scanning lines by controlling motors attached to tilt correction lenses according to sub-scanning tilt misregistration color misalignment correction values. Control blocks related to respective color misalignment correction control operations will be described in detail in main-scanning and sub-scanning color misalignment correction control sequences to be described later.

[Color Misalignment Correction Control]

In this embodiment, the color misalignment correction control is separated into two independent correction control sequences, that is, sub-scanning color misalignment correction and main-scanning color misalignment correction.

The sub-scanning color misalignment correction control and main-scanning color misalignment correction control in this embodiment will be described below, and execution timings of these correction control operations will also be described. Assume that in this embodiment, the control unit 1 controls the respective correction control operations to be described below.

[Sub-Scanning Color Misalignment Correction Control]

Figure 4:
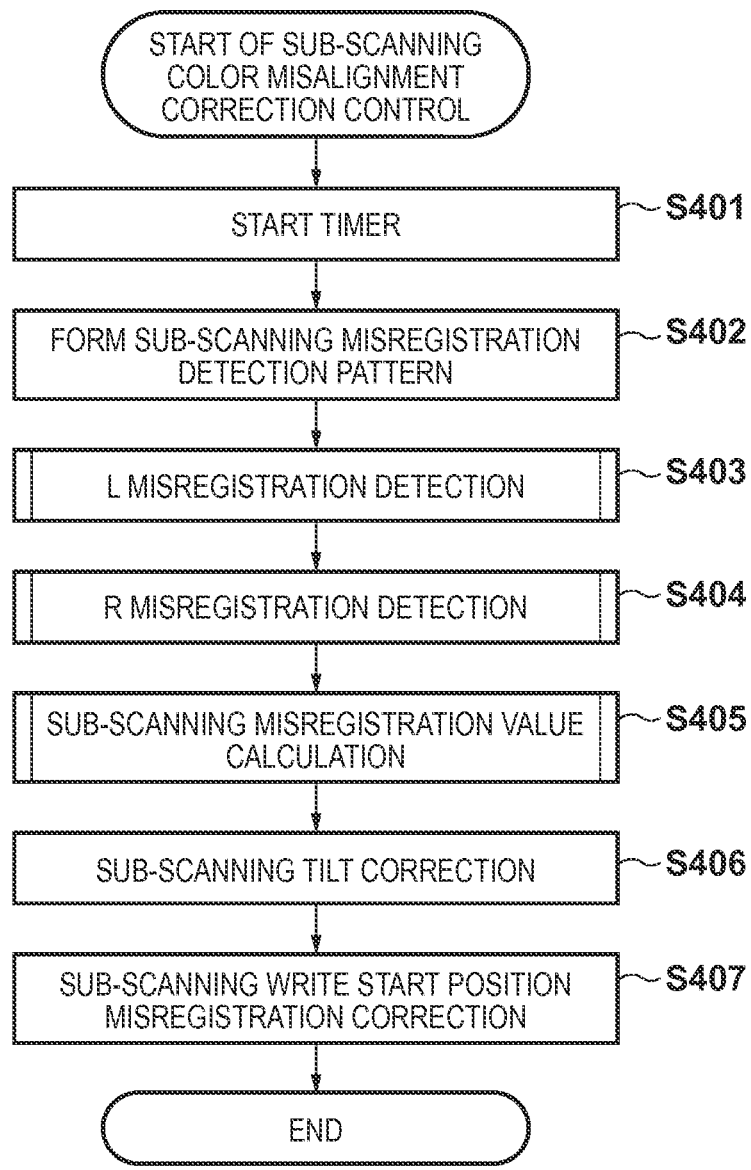
FIG. 4 is a flowchart of sub-scanning color misalignment correction control.

FIG. 4 is a flowchart for explaining the overall sub-scanning color misalignment correction control. In step S401, the control unit 1 starts a timer.

In step S402, the control unit 1 controls the misregistration detection pattern generation unit 44 and image control unit 40 to form pattern images including sub-scanning misregistration detection toner marks on the intermediate transfer belt 30. FIGS. 6A and 6B show the sub-scanning misregistration detection patterns, and the patterns will be described below.

[Sub-Scanning Misregistration Detection Pattern]

As described in the related arts, in order to precisely detect misregistration, patterns have to be designed to remove detection errors caused by AC components due to various velocity fluctuations. In this embodiment, patterns including a plurality of sets are arranged and designed so as to satisfactory remove, by average calculations, periodic detection errors caused by three components, that is, a drum period D (=100 mm), driving roller period T (=70 mm), and belt period B (=700 mm).

FIG. 6A shows an arrangement of a pattern ptn of one (n-th set) of those of a total of eight sets. In one set, traverse line marks of four colors are arranged at positions in the main-scanning direction so as to be respectively detected by the left and right registration detection sensors 6L and 6R. An outline arrow indicates a moving direction of the intermediate transfer belt 30, and the longitudinal direction of each traverse line mark agrees with a vertical direction which makes an angle of 90° with that belt moving direction. Note that the sub-scanning direction is a direction opposite to the belt moving direction, and a downward direction on the plane of the figure is a positive direction. Marks LYn, LMn, LCn, and LKn on the side of the left registration detection sensor 6L are respectively those of Y, M, C, and K colors, and a suffix n indicates the pattern of the n-th set. In the sub-scanning direction, each mark width w1 is about 1.7 mm (40 dots: 600 dpi), and a gap w2 between neighboring marks is also about 1.7 mm (40 dots). These values are set to obtain satisfactory detection results by the registration detection sensors 6, and a detection state will be described in step S502 shown in FIG. 5A to be described later. Hence, a mark interval p is defined by w1+w2, that is, about 3.4 mm (80 dots: 600 dpi), and a total length yd of the pattern ptn is about 11.9 mm (280 dots). The same applies to marks RYn, RMn, RCn, and RKn on the side of the right registration detection sensor 6R. As for positions in the sub-scanning direction, these marks are arranged at the same positions as those of the left marks.

FIG. 6B shows the overall sub-scanning misregistration detection patterns by arranging eight pattern sets (pt1 to pt8) shown in FIG. 6A to fall within a total belt length. In order to remove the aforementioned three AC components, set intervals yd1, yd2, and yd3 in FIG. 6B are defined to arrange pattern sets to have opposite phases so that detection errors of AC components cancel with each other, that is, to arrange a small number of (two) pattern sets within an interval of a half period. That is, the set interval yd1 is set to be a length T/2=35 mm of a driving roller semiperimeter, the set interval yd2 is set to be a length D/2=50 mm of a drum semiperimeter, and the set interval yd3 is set to be B/2=350 mm of a belt semi-perimeter. By arranging the respective sets in this way, averaging processing calculations are made for all the eight sets at a pattern detection timing, and all of the periods of the three components have opposite phase relationships, thus removing detection errors, or at least reducing detection errors.

The description will revert to that of the flowchart shown in FIG. 4. In step S403, the detection patterns formed on the intermediate transfer belt 30 are detected by the left registration detection sensor 6L, thereby detecting and calculating misregistration values (L misregistration detection).

[L Misregistration Detection Processing Sequence]

Details of this processing block will be described below with reference to the flowchart shown in FIG. 5A. The control unit 1 executes loop processing of i=1 to 64 in steps S501 to S504. The control unit 1 detects edge detection timings te(i) (i=1 to 64) for 32 toner marks on the left side L shown in FIG. 6B in step S502. FIG. 7 shows an edge detection state of toner marks. FIG. 7 shows a voltage waveform (converted by the resistor 65) obtained by detecting two leading toner marks LY1 and LM1 of the first set using the registration detection sensor 6 (FIG. 2C).

By detecting edges based on changes in detection signal a binarized by the threshold voltage 67, timings of a trailing edge te(1) and leading edge te(2) of the mark LY1 and a trailing edge te(3) and leading edge te(4) of the mark LM1 are detected. Each mark width w1 and gap w2 between neighboring marks are designed to prevent that edges of respective marks cannot be satisfactorily detected due to overlapping of voltage waveforms of the respective marks even when large color misalignment has occurred (for example, when Y and M toner marks are closely formed at adjacent positions). That is, the gap w2 between neighboring marks is designed to be sufficiently larger than an assumed color misalignment amount.

In step S503, the control unit 1 temporarily stores a detected timer value te(i) in the RAM 3.

In steps S505 to S509, the control unit 1 executes loop processing of i=1 to 32. In step S506, the control unit 1 calculates a central position yL(i) of the i-th mark from the edge detection timing te(i). This central position yL(i) of the mark can be calculated from an average value of the two edge detection timings of each mark, and a moving velocity Vp (mm/s) of the intermediate transfer belt 30 as follows:

$$yL(i) = \frac{te(2i-1) + te(2i)}{2} \times Vp \quad (1)$$

Note that the timer used at the detection timing sets so that a write start time of the detection patterns (FIGS. 6A and 6B) is zero in step S402. For this reason, the mark central position yL(i) is a position coordinate to have, as an origin, a position in the sub-scanning direction on the belt, which is detected by the registration detection sensor 6L at the write start timing of the detection patterns. That is, the mark central position yL(i) is a practical position coordinate corresponding to a belt moving distance of that position on the belt in the sub-scanning direction from the origin (moved at an ideal moving velocity Vp).

Subsequently, in step S507, the control unit 1 calculates a misregistration value δyL(i) from an ideal position of the i-th mark. This mark misregistration value can be calculated by calculating a difference from an ideal (central) position coordinate yideal(i) of each mark, which can be detected from FIGS. 6A and 6B, using:

$$\delta yL(i) = yL(i) - yideal(i) \quad (2)$$

Note that the ideal (central) position coordinate yideal(i) of the mark assumes the same origin as that of the position coordinate system of the aforementioned mark central position yL(i). That is, the ideal (central) position coordinate yideal(i) of the mark means that all marks assume a value=0 (free from any misregistration) when the aforementioned misregistration values δyL(i) are calculated using an ideal printer which is free from any DC color misalignment and AC color misalignment. The value of the ideal (central) position coordinate yideal(i) may be held in advance in the EEPROM 4 or the like, or may be calculated upon execution of this processing sequence.

In step S509, the control unit 1 temporarily stores the misregistration value δyL(i) of the i-th mark in the RAM 3.

Next, in step S510, the control unit 1 makes averaging calculations from the misregistration values δyL of all the 32 marks while classifying them into those of respective colors. A misregistration value dyL(Y) of yellow Y can be calculated by executing averaging processing of data of eight sets obtained by extracting only Y toner marks from the misregistration values δyL(i) of the i-th marks using:

$$dyL(Y) = \frac{1}{8}\sum_{n=1}^{8} \delta yL(4(n-1)+1) \quad (3)$$

Using the similar methods, misregistration values of the remaining colors, that is, magenta M, cyan C, and black K can be respectively calculated by:

$$dyL(M) = \frac{1}{8}\sum_{n=1}^{8} \delta yL(4(n-1)+2) \quad (4)$$

$$dyL(C) = \frac{1}{8}\sum_{n=1}^{8} \delta yL(4(n-1)+3) \quad (5)$$

$$dyL(K) = \frac{1}{8}\sum_{n=1}^{8} \delta yL(4n) \quad (6)$$

In this case, the calculated misregistration values dyL of the respective colors are those of DC components in the sub-scanning direction, which are detected at the position of the left registration detection sensor 6L in the main-scanning direction, and AC components can be already removed by the arrangement of the detection patterns, as has been described above using FIGS. 6A and 6B.

Then, in step S511, the control unit 1 stores the misregistration values dyL(Y), dyL(M), dyL(C), and dyL(K) of the respective colors calculated in step S510 in the EEPROM 4.

The description will revert to that of the flowchart shown in FIG. 4. In step S404, the control unit 1 detects the detection patterns formed on the intermediate transfer belt 30 using the right registration detection sensor 6R to detect and calculate misregistration values (R misregistration detection). This R misregistration detection processing block has the same processing contents as those of the L misregistration detection in step S403, and a detailed description thereof will not be given. L of variable names and suffixes in the description of step S403 and the flowchart in FIG. 5A can be read as R. That is, by the R misregistration detection processing, color misregistration values dyR(Y), dyR(M), dyR(C), and dyR(K) of DC components in the sub-scanning direction, which are detected at the position of the right registration detection sensor 6R in the main-scanning direction, are obtained, and are stored in the EEPROM 4.

In step S405, the control unit 1 calculates, for respective colors, two types of sub-scanning misregistration values, that is, sub-scanning write start position misregistration values and sub-scanning tilt misregistration values from the misregistration values dyL and dyR in the sub-scanning direction obtained in steps S403 and S404.

[Sub-Scanning Misregistration Value Calculation Processing Sequence]

Figure 5B:
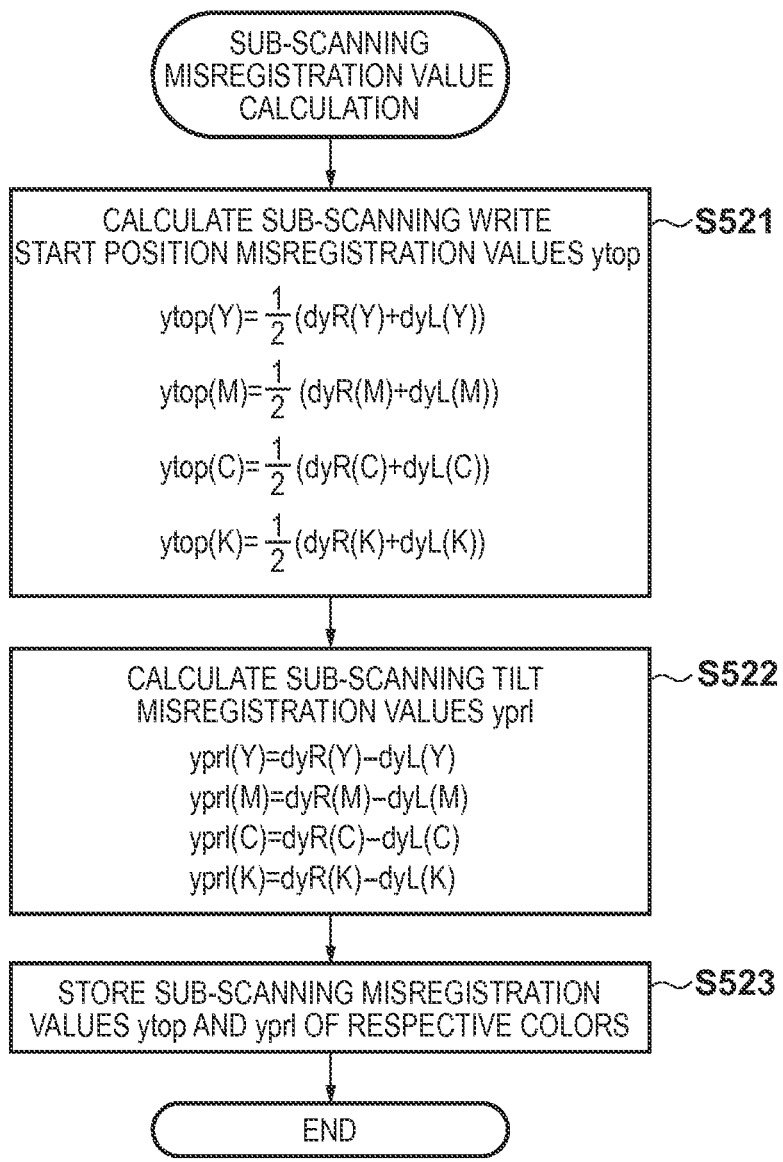

Details of this processing block will be described below with reference to the flowchart shown in FIG. 5B. In step S521, the control unit 1 calculates sub-scanning write start position misregistration values ytop for respective colors. A sub-scanning write start position misregistration value ytop (Y) of yellow Y can be calculated from the misregistration values dyL(Y) and dyR(Y) in the sub-scanning direction by:

$$ytop(Y) = \frac{1}{2}(dyR(Y) + dyL(Y)) \quad (7)$$

By the similar methods, misregistration values of the remaining colors, that is, magenta M, cyan C, and black K can be respectively calculated by:

$$ytop(M) = \frac{1}{2}(dyR(M) + dyL(M)) \quad (8)$$

$$ytop(C) = \frac{1}{2}(dyR(C) + dyL(C)) \quad (9)$$

$$ytop(K) = \frac{1}{2}(dyR(K) + dyL(K)) \quad (10)$$

When the left and right sub-scanning misregistration values have a difference, this indicates occurrence of sub-scanning tilt misregistration. For this reason, in this embodiment, in order to correct sub-scanning misregistration with reference to the left and right central positions, an average of the left and right sub-scanning misregistration values dyL and dyR is calculated in the calculation of the sub-scanning write start position misregistration value ytop.

Next, in step S522, the control unit 1 calculates sub-scanning tilt misregistration values yprl for respective colors. A sub-scanning tilt misregistration value yprl(Y) of yellow Y can be calculated from a difference between the misregistration values dyL(Y) and dyR(Y) in the sub-scanning direction by:

$$yprl(Y) = (dyR(Y) - dyL(Y)) \quad (11)$$

By the similar methods, misregistration values of the remaining colors, that is, magenta M, cyan C, and black K can be respectively calculated by:

$$yprl(M) = (dyR(M) - dyL(M)) \quad (12)$$

$$yprl(C) = (dyR(C) - dyL(C)) \quad (13)$$

$$yprl(K) = (dyR(K) - dyL(K)) \quad (14)$$

This sub-scanning tilt misregistration value yprl is to calculate a tilt value of a scanning line from the main-scanning position of the registration detection sensor 6L to that of the registration detection sensor 6R. Then, in step S523, the control unit 1 stores the sub-scanning write start position misregistration values ytop and sub-scanning tilt misregistration values yprl of the respective colors, which are calculated in steps S521 and S522, in the EEPROM 4.

The description will revert to that of the flowchart shown in FIG. 4. In step S406, the control unit 1 executes sub-scanning tilt misregistration correction control from calculation results of the sub-scanning tilt misregistration values yprl.

[Sub-Scanning Tilt Misregistration Correction Control]

Figure 8A:
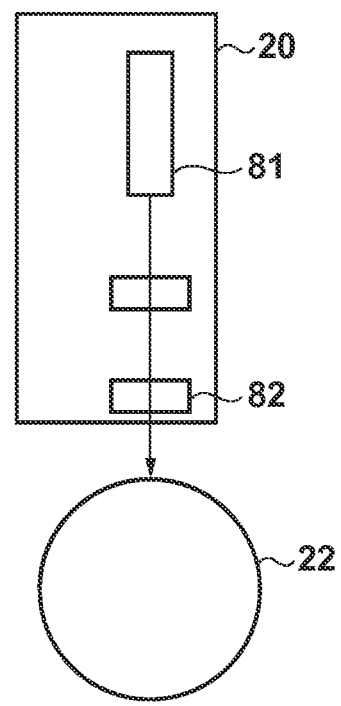
FIGS. 8A and 8B are views for explaining a correction operation of a sub-scanning tilt misregistration.
Figure 8B:
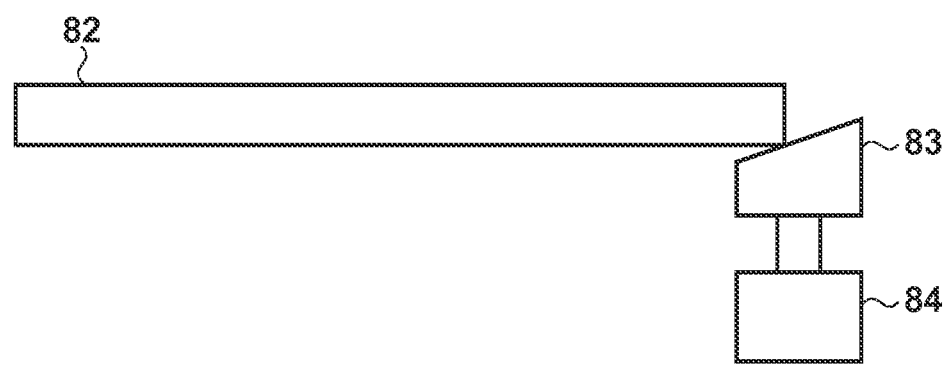

FIGS. 8A and 8B are views for explaining an operation related to correction of a tilt in the sub-scanning direction according to this embodiment. FIG. 8A shows the photosensitive drum 22, the scanner unit 20, a polygon mirror 81, and a tilt correction lens 82. Furthermore, FIG. 8B shows the tilt correction lens 82, a cam 83, and a motor 84. One end of the tilt correction lens 82 is held by the cam 83 attached to a shaft of the motor 84. When the motor 84 is operated to rotate the cam 83, one end of the tilt correction lens 82 is moved to a rotation direction of the photosensitive drum 22, thus changing an incidence position of the laser beam 21 deflected by the polygon mirror 81 to the photosensitive drum 22. This tilt correction in the sub-scanning direction adopts an arrangement in which the same operations are executed for respective colors.

The control unit 1 reads out the sub-scanning tilt misregistration value yprl(Y) of yellow Y stored in the EEPROM 4 in step S523, and outputs the readout value to the tilt control unit 42. The tilt control unit 42 operates the motor 84 according to that tilt value yprl(Y), thus correcting a tilt in the sub-scanning direction. At this time, since only the other end of the tilt correction lens 82 is moved with reference to its one end, and since, for example, the left end side is fixed and only the right end side is vertically moved on an image, the write start position in the sub-scanning direction is changed at the same time. Hence, the write start position in the sub-scanning direction is also corrected in accordance with an operation amount (moving amount) of the tilt correction lens 82 by the tilt correction operation. By the similar methods, sub-scanning tilts of the remaining colors, that is, magenta M, cyan C, and black K are corrected.

In this embodiment, tilts for respective colors are independently corrected based on the tilt misregistration values yprl of the respective colors. Alternatively, tilt correction may be made according to relative color misalignment values between colors as differences from a predetermined reference color (for example, black K) only for the remaining colors except for the reference color. In this case, tilts of the remaining colors are corrected in correspondence with a sub-scanning tilt value of the reference color.

The description will revert to that of the flowchart shown in FIG. 4. In step S407, the control unit 1 executes sub-scanning write start position misregistration correction control based on the calculation results of the sub-scanning write start position misregistration values ytop.

[Sub-Scanning Write Start Position Misregistration Correction Control]

Figure 9A:
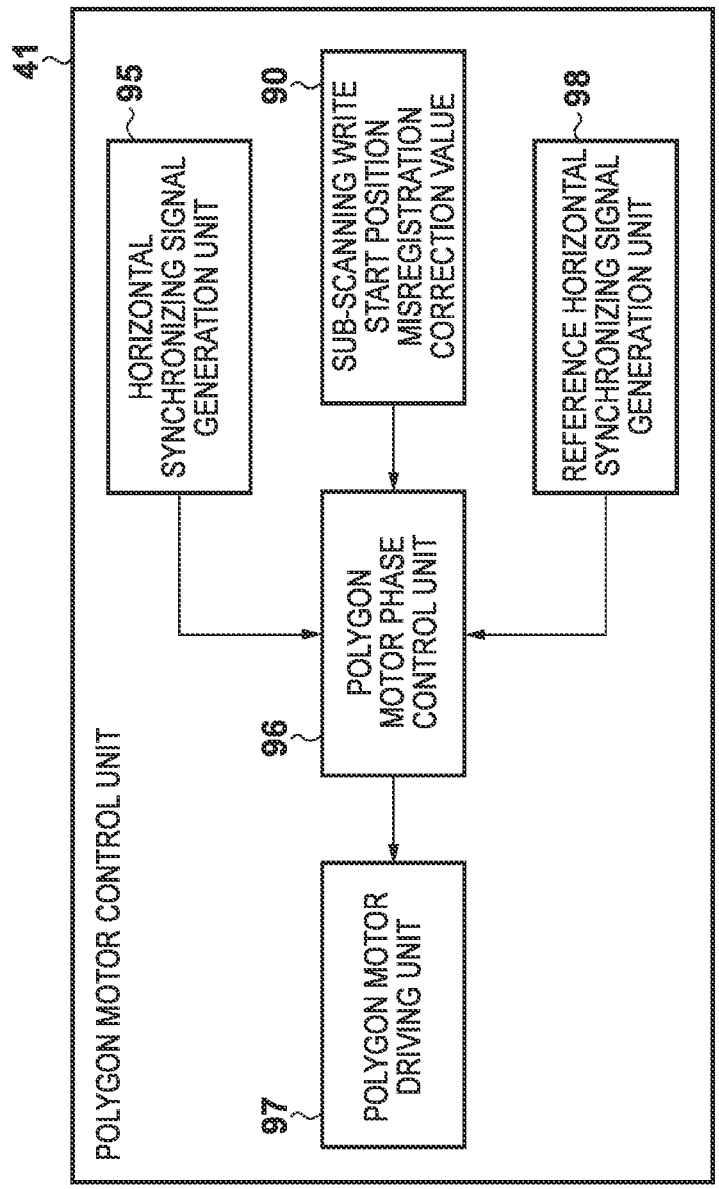
FIGS. 9A, 9B, and 9C are views for explaining a correction operation of sub-scanning write start position misregistration.
Figure 9B:
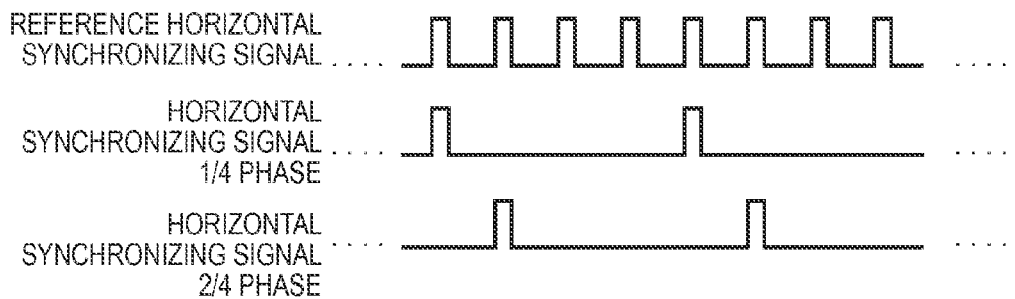
Figure 9C:
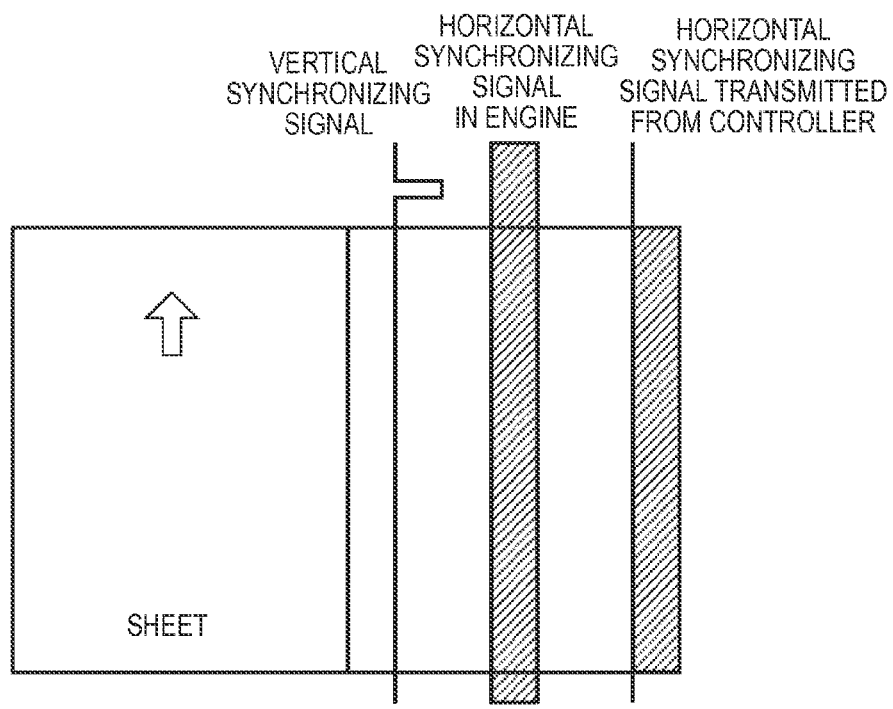

FIGS. 9A to 9C are views for explaining an operation related to correction of sub-scanning write start position misregistration according to this embodiment.

The control unit 1 reads out the sub-scanning write start position misregistration value ytop(Y) of yellow Y stored in the EEPROM 4 in step S523, and outputs the readout value to the polygon motor control unit 41. The polygon motor control unit 41 corrects sub-scanning write start position misregistration according to that write start position misregistration value ytop(Y) as follows.

As shown in FIG. 9A, the polygon motor control unit 41 includes a horizontal synchronizing signal generation unit 95, polygon motor phase control unit 96, polygon motor driving unit 97, and reference horizontal synchronizing signal generation unit 98.

For example, a case will be described below wherein the write start position misregistration value ytop(Y) is −2.25 dots (600 dpi). At this time, this write start position misregistration correction value 90 is calculated as +2.25 (2+¼) dots which have a sign opposite to the detected value. Note that when the aforementioned sub-scanning tilt misregistration correction control is executed at this time (immediately before this control), a sub-scanning write start position misregistration correction value 90, which additionally considers a sub-scanning write start position misregistration fluctuation caused by the tilt correction, is calculated to execute a correction operation.

In a system using laser scanners, in order to align write start positions of respective scanning lines, a horizontal synchronizing signal generated by the horizontal synchronizing signal generation unit 95 for each plane of the polygon mirror in synchronism with rotation of the polygon mirror driven by the polygon motor driving unit 97 is used. A controller (not shown) transmits image data in synchronism with the horizontal synchronizing signal transmitted from an engine (not shown) for each scanning line in an image forming region. A write start position misregistration correction value in 1-dot units is generated by advancing or delaying a timing of the horizontal synchronizing signal to be transmitted to the controller for each scanning line. Note that one scanning line has the same meaning as one dot (600 dpi) in the sub-scanning direction.

When the timing is delayed by an amount for two scanning lines, a count value of horizontal synchronizing signals in the engine from a vertical synchronizing signal indicating a reference position in the sub-scanning direction shown in FIG. 9C until the horizontal synchronizing signal begins to be transmitted to the controller is incremented by +2. Correction less than one dot (for example, ¼) is attained by controlling a plane phase of the polygon. Four pulses of reference horizontal synchronizing signal are generated at equal intervals during a 1-scanning line period. The plane phases of the polygon are controlled so that a horizontal synchronizing signal of each color is synchronized with desired one of the four phases of the reference horizontal synchronizing signal. Thus, when a setting before correction is ¼ phase, and the timing is delayed from it by ¼ dots, a reference phase is switched from ¼ phase to ¾ phase, as shown in FIG. 9B. By the similar methods, the sub-scanning write start position misregistration amounts of the remaining colors, that is, magenta M, cyan C, and black K can also be corrected.

In this embodiment, the write start position misregistration amounts are independently corrected for respective colors based on the misregistration values ytop of the respective colors. Alternatively, correction may be made according to relative misregistration values between colors as differences from a predetermined reference color (for example, black K) only for the remaining colors except for the reference color. In this case, the write start position misregistration amounts of the remaining colors are corrected to be adjusted to the sub-scanning write start position misregistration value of the reference color.

With the aforementioned sub-scanning misregistration correction control using the related art, color misalignment correction can be executed by precisely detecting color misalignment values in the sub-scanning direction.

[Main-Scanning Color Misalignment Correction Control]

Figure 10:
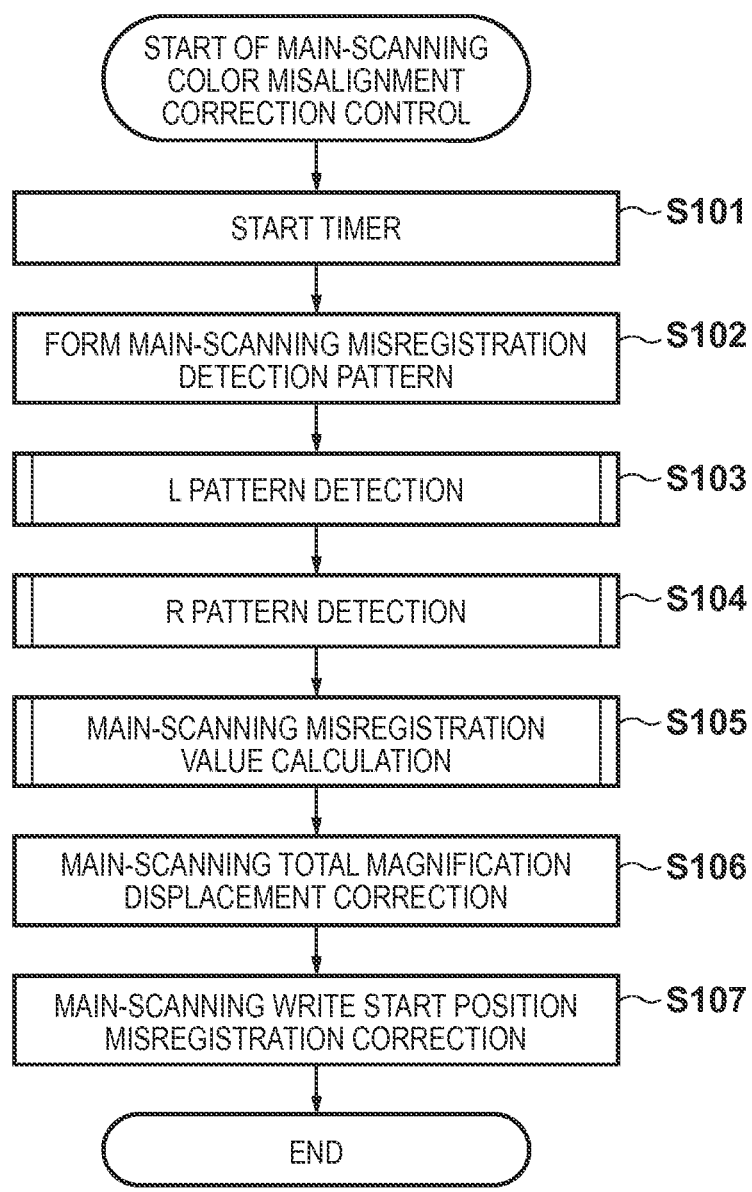
FIG. 10 is a flowchart of main-scanning color misalignment correction control.

Main-scanning color misalignment correction control according to the present invention, especially, a method of executing color misalignment detection in the main-scanning direction more precisely and quickly than in the related art will be described below. FIG. 10 is a flowchart for explaining the overall main-scanning color misalignment correction control.

In step S101, the control unit 1 starts a timer.

In step S102, the control unit 1 controls the misregistration detection pattern generation unit 44 and image control unit 40 to form pattern images including main-scanning misregistration detection toner marks on the intermediate transfer belt 30. FIG. 12 shows the main-scanning misregistration detection patterns, and the patterns will be described below.

[Main-Scanning Misregistration Detection Pattern]

In FIG. 12, an outline arrow indicates a moving direction of the intermediate transfer belt 30. The main-scanning misregistration detection patterns include two types of marks, that is, traverse line marks each of which is directed in the vertical direction that makes an angle=90° with the belt moving direction, and slant line marks each of which is directed in a slant direction that makes an angle=45° with the belt moving direction. Note that a sign of the angle the direction of the slant line mark makes with the belt moving direction is defined to have a rotation direction shown in FIG. 12 as a positive direction. That is, a right-handed system definition is adopted when a rotation axis is turned back via the plane of the figure.

Patterns required to detect main-scanning misregistration of yellow Y will be described in detail below. The patterns for yellow Y include a total of four marks, that is, a traverse line mark L1Y and slant line mark L2Y on the side of the left registration detection sensor 6L, and a slant line mark R1Y and traverse line mark R2Y on the side of the right registration detection sensor 6R. The traverse line mark L1Y and slant line mark R1Y are arranged at the same position with respect to the sub-scanning direction so as to be simultaneously detected by the registration detection sensors 6 in a case free from any main-scanning misregistration, and form a pair (pair 1). Likewise, the slant line mark L2Y and traverse line mark R2Y are arranged at the same position with respect to the sub-scanning direction so as to be simultaneously detected by the registration detection sensors 6 in a case free from any main-scanning misregistration, and form a pair (pair 2).

Note that in the configuration example of the detection patterns to be described in this embodiment, the traverse line mark L1 will also be described as a first reference mark and the slant line mark L2 will also be described as a first detection mark for the sake of convenience. The slant line mark R1 will also be described as a second detection mark, and the traverse line mark R2 will also be described as a second reference mark. Furthermore, in this embodiment, the registration detection sensor 6L implements a first detection means, and the second registration detection sensor 6R implements a second detection means. In a pair of a reference mark and detection mark, these marks will also be described as first and second marks.

In FIG. 12, tL1(Y), tR1(Y), tL2(Y), and tR2(Y) are detection timings obtained by detecting the four marks L1Y, R1Y, L2Y, and R2Y by the registration detection sensors 6. This Each of these timings indicates a detection time of a mark central position in the sub-scanning direction in each mark. Details of the detection timings will be described later. The detection timings tL1(Y) and tR1(Y) of pair 1 assume the same value. Likewise, the detection timings tL2(Y) and tR2

(Y) of pair 2 assume the same value. That is, the four marks are arranged so that marks in each pair are located at the same central positions.

Since the detection timings tL1(Y) and tR2(Y) of the traverse line marks L1Y and R2Y are left unchanged even when main-scanning misregistration has occurred, these marks serve as references required to detect main-scanning misregistration in respective pairs, and are also called reference marks. When main-scanning misregistration has occurred, since the detection timings tR1(Y) and tL2(Y) of the slant line marks R1Y and L2Y are changed according to the misregistration values, these marks serve as targets required to detect main-scanning misregistration in the respective pairs, and are also called detection marks. For example, when a main-scanning misregistration of 100 µm has occurred, the slant line mark of 45° causes the same misregistration of 100 µm in the sub-scanning direction at each sensor position, and the detection timings tR1(Y) and tL2(Y) are detected later according to this misregistration.

Figure 15:
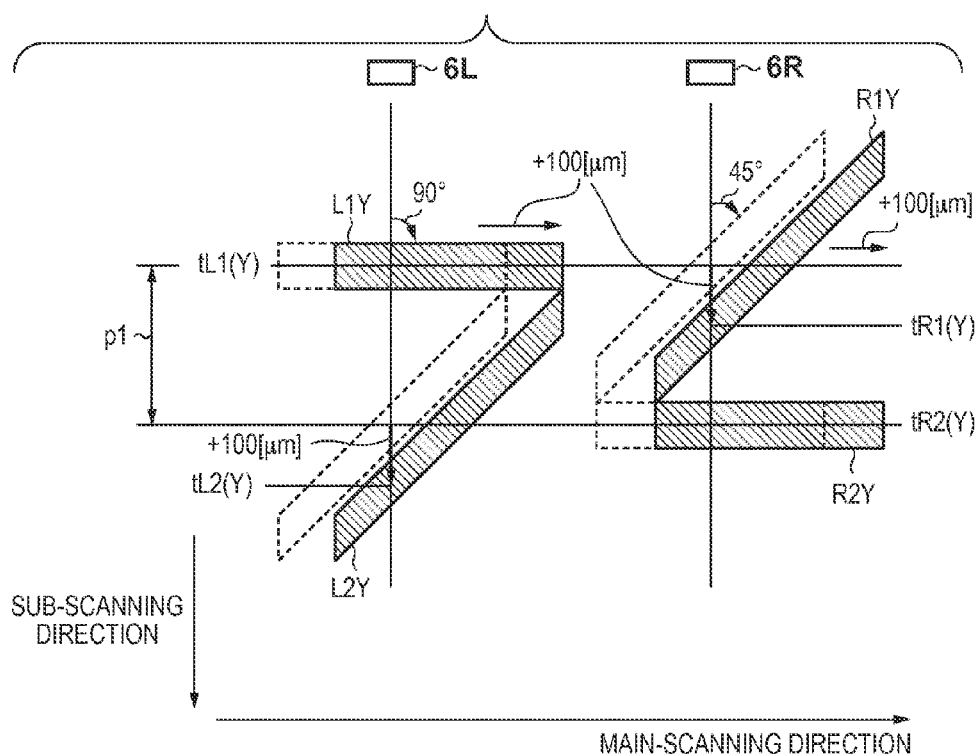
FIG. 15 is a view showing a state of the main-scanning misregistration detection patterns when main-scanning misregistration has occurred.

FIG. 15 shows a state when this main-scanning misregistration has occurred. FIG. 15 extracts only marks of yellow Y, broken lines indicate ideal mark positions free from any misregistration, and gray marks indicate mark positions when a main-scanning misregistration of +100 µm has occurred. However, in the state in which the misregistration has occurred in FIG. 15, the mark positions are illustrated to be exaggerated more than actual misregistration for the sake of easy understanding. When the main-scanning misregistration of +100 µm has occurred, the detection timings tL1(Y) and tR2(Y) are left unchanged since the traverse line marks (reference marks) have not been displaced in the sub-scanning direction. On the other hand, as can be seen from FIG. 15, since the slant line marks (detection marks) have been displaced by +100 µm in the sub-scanning directions, the timings tR1(Y) and tL2(Y) are also delayed accordingly.

The same applies to patterns of the remaining colors, that is, magenta M (traverse line marks L1M and R2M, and slant line marks R1M and L2M), cyan C (traverse line marks L1C and R2C, and slant line marks R1C and L2C), and black K (traverse line marks L1K and R2K, and slant line marks R1K and L2K).

Each mark width w1 of a traverse line and slant line is about 1.7 mm (40 dots: 600 dpi), a gap w3 between two marks is about 2.1 mm (50 dots), a width w4 in the mark longitudinal direction is about 4.2 mm (100 dots), and a gap w5 between neighboring color marks is about 1.7 mm (40 dots). A mark interval p1 between the same color marks is defined by w1+w3, that is, about 3.8 mm (90 dots), and a mark interval p2 between colors is about 9.3 mm (220 dots). These values are set to obtain satisfactory detection results by the registration detection sensors 6 for the same reasons as described for the sub-scanning misregistration detection patterns (step S502, FIG. 7). The total length of the main-scanning misregistration detection patterns is about 35.6 mm (840 dots), and is considerably shorter than 700 mm of the total belt length B.

The description will revert to that of the flowchart shown in FIG. 10. In step S103, the left registration detection sensor 6L detects the main-scanning misregistration detection patterns formed on the intermediate transfer belt 30.

[L Pattern Detection Processing Sequence]

Details of this processing block will be described below with reference to the flowchart shown in FIG. 11A. The control unit 1 executes loop processing of i=1 to 16 in steps S111 to S114. The control unit 1 detects edge detection timings te(i) (i=1 to 16) for eight toner marks on the left side L shown in FIG. 12 in step S112. The toner mark edge can be detected by the same method shown in FIG. 7 described above.

In step S113, the control unit 1 temporarily stores a detected timer value te(i) in the RAM 3.

In steps S115 to S118, the control unit 1 executes loop processing of i=1 to 8. In step S116, the control unit 1 calculates a detection timing tL(i) of a central position of the i-th mark from the edge detection timing te(i). This detection timing tL(i) can be detected from an average value of the two edge detection timings of the i-th mark using:

$$tL(i) = \frac{te(2i-1) + te(2i)}{2} \quad (15)$$

In step S117, the control unit 1 temporarily stores the detected timer value tL(i) in the RAM 3.

In step S119, the control unit 1 makes calculation for separating detection timings in respective pairs of the colors from the detection timings tL of all the eight marks. The detection timings of respective pairs of yellow Y are tL1(Y) for pair 1 and tL2(Y) for pair 2, and can be calculated using:

$$tL1(Y)=tL(1), tL2(Y)=tL(2) \quad (16)$$

By similar methods, the detection timings of respective pairs of the remaining colors, that is, magenta M, cyan C, and black K, can be calculated using:

$$tL1(M)=tL(3), tL2(M)=tL(4) \quad (17)$$

$$tL1(C)=tL(5), tL2(C)=tL(6) \quad (18)$$

$$tL1(K)=tL(7), tL2(K)=tL(8) \quad (19)$$

The calculated detection timings tL1 and tL2 of each pair of each color correspond to those of the respective marks shown in FIG. 12. Then, the control unit 1 temporarily stores the detection timings tL1 and tL2 of respective pairs of the respective colors in the RAM 3 in step S120.

The description will revert to that of the flowchart shown in FIG. 10. In step S104, the control unit 1 detects the main-scanning misregistration detection patterns formed on the intermediate transfer belt 30 using the right registration detection sensor 6R. This R pattern detection processing block has the same processing contents as those of the L pattern detection in step S103 above, and a detailed description thereof will not be given. L of variable names and suffixes in the description of step S103 and the flowchart in FIG. 11A can be read as R. That is, by the R pattern detection processing, detection timings tR1(Y), tR1(M), tR1(C), tR1(K), tR2(Y), tR2(M), tR2(C), tR2(K) of respective pairs of the respective colors of the right marks of the detection patterns can be obtained. These values are temporarily stored in the RAM 3.

Next, in step S105, the control unit 1 calculates, for respective colors, two types of main-scanning misregistration values, that is, main-scanning write start position misregistration values and main-scanning total magnification displacement values from the detection timings tL1, tL2, tR1, and tR2 of respective pairs of the respective colors obtained in steps S103 and S104.

[Main-Scanning Misregistration Value Calculation Processing Sequence]

Details of this processing block will be described below with reference to the flowchart shown in FIG. 11B. The control unit 1 calculates main-scanning misregistration values xL and xR of respective colors in the registration detection sensors 6L and 6R in step S121. Details of a method of calculating Y main-scanning misregistration values xL(Y) and xR(Y) from the detection timings tL1(Y), tR1(Y), tL2(Y), and tR2(Y) of respective pairs of yellow Y will be described below.

The detection timing of the detection (slant line) mark in pair 1 is tR1(Y), and that of the reference (traverse line) mark is tL1(Y). Hence, since the detection mark (slant line mark) as a main-scanning misregistration detection target is at the right side R, a main-scanning misregistration value dxR at the right side R in pair 1 can be detected and calculated. That is, the main-scanning misregistration value dxR can be calculated by multiplying a timing difference, which is obtained by subtracting the detection timing tL1(Y) of the reference mark from the detection timing tR1(Y) of the detection mark, by a moving velocity Vp (mm/s) of the intermediate transfer belt 30, as given by:

$$dxR(Y)=(tR1(Y)-tL1(Y))\times Vp \qquad (20)$$

This calculates a relative misregistration amount between marks when the detection mark is displaced from the reference mark in the sub-scanning direction due to the main-scanning misregistration. Since the detection (slant line) mark has an angle of 45°, the relative misregistration in the sub-scanning direction is equal to that in the main-scanning direction by that value. Note that as for a misregistration direction (sign), a direction opposite to the belt moving direction in FIG. 12 is a positive direction of the sub-scanning direction, and a rightward direction is a positive direction of the main-scanning direction. For example, when the main-scanning misregistration value xR=+100 μm is calculated by the above equation, this indicates that the detection mark R1Y is displaced in the rightward direction by 100 μm.

The detection timing of the detection (slant line) mark in pair 2 is tL2(Y), and that of the reference (traverse line) mark is tR2(Y). Hence, since the detection mark (slant line mark) as a main-scanning misregistration detection target is at the left side L, a main-scanning misregistration value dxL at the left side L in pair 2 can be detected and calculated. That is, as in pair 1, the main-scanning misregistration value dxL can be calculated from a timing difference, which is obtained by subtracting the detection timing tR2(Y) of the reference mark from the detection timing tL2(Y) of the detection mark, by:

$$dxL(Y)=(tL2(Y)-tR2(Y))\times Vp \qquad (21)$$

In this manner, the main-scanning misregistration values on the right and left sides can be calculated from respective pairs. By the similar methods, main-scanning misregistration values on the right and left sides of the remaining colors, that is, magenta M, cyan C, and black K, can be respectively calculated by:

$$dxR(M)=(tR1(M)-tL1(M))\times Vp \qquad (22)$$

$$dxL(M)=(tL2(M)-tR2(M))\times Vp \qquad (23)$$

$$dxR(C)=(tR1(C)-tL1(C))\times Vp \qquad (24)$$

$$dxL(C)=(tL2(C)-tR2(C))\times Vp \qquad (25)$$

$$dxR(K)=(tR1(K)-tL1(K))\times Vp \qquad (26)$$

$$dxL(K)=(tL2(K)-tR2(K))\times Vp \qquad (27)$$

Next, in step S122, the control unit 1 calculates main-scanning write start position misregistration values xtop of respective colors. A main-scanning write start position misregistration value xtop(Y) of yellow Y can be calculated from an average value of misregistration values dxL(Y) and dxR(Y) in the main-scanning direction by:

$$xtop(Y) = \frac{1}{2}(dxR(Y)+dxL(Y)) \qquad (28)$$

By the similar methods, misregistration values of the remaining colors, that is, magenta M, cyan C, and black K can be respectively calculated by:

$$xtop(M) = \frac{1}{2}(dxR(M)+dxL(M)) \qquad (29)$$

$$xtop(C) = \frac{1}{2}(dxR(C)+dxL(C)) \qquad (30)$$

$$xtop(K) = \frac{1}{2}(dxR(K)+dxL(K)) \qquad (31)$$

When the left and right main-scanning misregistration values have a difference, this indicates that a main-scanning total magnification displacement has occurred. For this reason, in this embodiment, in order to correct the main-scanning misregistration with reference to the left and right central positions, the left and right main-scanning misregistration values dxL and dxR are averaged in the calculation of each main-scanning write start position misregistration value xtop.

In step S123, the control unit 1 calculates main-scanning total magnification displacement values xtw of respective colors. A main-scanning total magnification displacement value xtw(Y) of yellow Y can be calculated from a difference between the main-scanning misregistration values dxL(Y) and dxR(Y) by:

$$xtw(Y)=dxR(Y)-dxL(Y) \qquad (32)$$

By the similar methods, misregistration values of the remaining colors, that is, magenta M, cyan C, and black K can be respectively calculated by:

$$xtw(M)=dxR(M)-dxL(M) \qquad (33)$$

$$xtw(C)=dxR(C)-dxL(C) \qquad (34)$$

$$xtw(K)=dxR(K)-dxL(K) \qquad (35)$$

This main-scanning total magnification displacement xtw is to calculate an increment/decrement value due to enlargement/reduction of a scanning line width from the main-scanning position of the registration detection sensor 6L to that of the registration detection sensor 6R. Then, in step S124, the control unit 1 stores the main-scanning write start position misregistration values xtop and main-scanning total magnification displacement values xtw of respective colors, which are calculated in steps S122 and S123, in the EEPROM 4.

The description will revert to that of the flowchart shown in FIG. 10. In step S106, the control unit 1 executes main-scanning total magnification displacement correction control from main-scanning total magnification displacement calculation results xtw.

[Main-Scanning Total Magnification Displacement Correction Control]

Figure 13A:
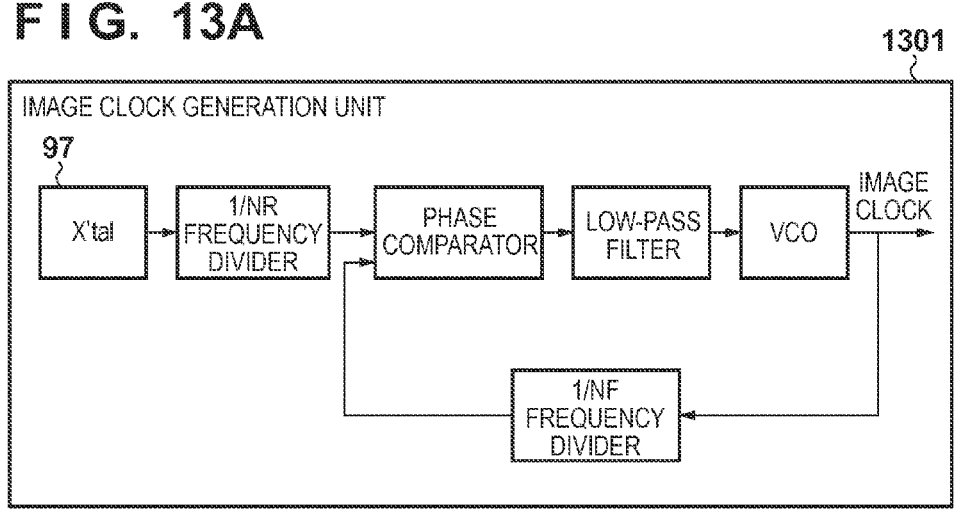
FIGS. 13A, 13B, and 13C are views for explaining a correction operation of a main-scanning total magnification displacement and main-scanning write start position misregistration.
Figure 13B:
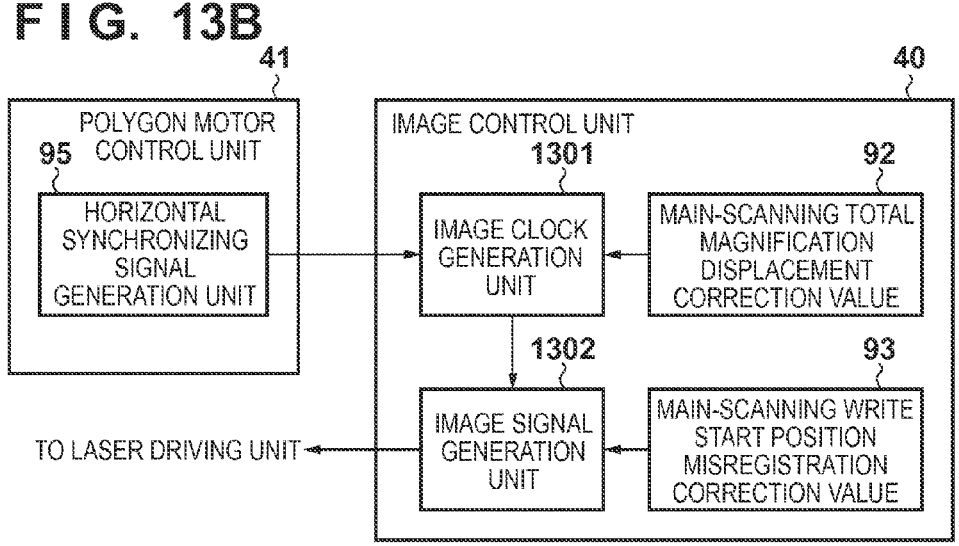

FIGS. 13A and 13B are block diagrams for explaining an operation related to main-scanning total magnification displacement correction in this embodiment. FIG. 13A is a block diagram showing the operation of an image clock generation unit 1301, which is configured by a so-called PLL (Phase Locked Loop) circuit. FIG. 13B is a block diagram showing the operation of the image control unit 40.

The control unit 1 reads out the main-scanning total magnification displacement value xtw(Y) of yellow Y, which is stored in the EEPROM 4 in step S124, and outputs the readout value to the image control unit 40. The image control unit 40 controls the image clock generation unit 1301 to calculate a correction value required to correct a total magnification displacement in accordance with the main-scanning total magnification displacement value xtw(Y), and to set the correction value as a main-scanning total magnification displacement correction value 92. The correction value to be set will be described later.

The image clock generation unit 1301 includes a voltage control X'tal, 1/NR frequency divider, 1/NF frequency divider, phase comparator, low-pass filter, and VCO (voltage-controlled oscillator). The 1/NR frequency divider frequency-divides an output of the X'tal. The 1/NF frequency divider frequency-divides an image clock output. The phase comparator outputs pulses having different polarities and widths according to a phase difference between the outputs of the 1/NR frequency divider and 1/NF frequency divider. The low-pass filter smooths the output of the phase comparator. The VCO (Voltage-Controlled Oscillator) generates different output frequencies depending on input voltages.

Letting fX be a frequency of the X'tal, an image clock frequency fV is given by:

$$fV = (NR/NF) \times fX \quad (36)$$

By finely adjusting NR (integer) and NF (integer), fV can be adjusted. That is, the main-scanning total magnification displacement is corrected by changing NR and NF setting values. Hence, as the main-scanning total magnification displacement correction value 92, NR and NF values required to correct the main-scanning total magnification displacement xtw(Y) are set.

For example, when a total magnification displacement is detected and calculated in a direction to narrow down the main-scanning width, a ratio between NR and NF is set to be small to set low fV (long period). At this time, since the image frequency is changed, the write start position in the main-scanning direction is also changed. Therefore, the write start position in the main-scanning direction is also corrected according to a change amount of an image clock due to correction of the main-scanning width (details of the write start position in the main-scanning direction will be described later). Different NR and NF setting values may be set even for an identical total magnification displacement value depending on the circuit arrangement of a controller.

Furthermore, jitter of the image clock frequency may often be impaired depending on the relationship between the circuit arrangement of the controller and the NR and NF setting values. In such case, a method of avoiding settings with which jitter may impair by adding or subtracting a very small amount (within a range free from any visual influence on the total size of an image) to correction values of all the colors including the remaining colors is available. By the similar methods, the main-scanning total magnification displacements of the remaining colors, that is, magenta M, cyan C, and black K are also corrected.

In this embodiment, the main-scanning total magnification displacement correction is executed from the misregistration values xtw of respective colors independently for the respective colors. Alternatively, correction may be made according to relative color misalignment values between colors as differences from a predetermined reference color (for example, black K) only for the remaining colors except for the reference color. In this case, the total magnification displacements of the remaining colors are corrected in correspondence with the main-scanning total magnification displacement value of the reference color.

The description will revert to that of the flowchart shown in FIG. 10. In step S107, the control unit 1 executes main-scanning write start position misregistration correction control from the main-scanning write start position misregistration calculation results xtop.

[Main-Scanning Write Start Position Misregistration Correction Control]

Figure 13C:
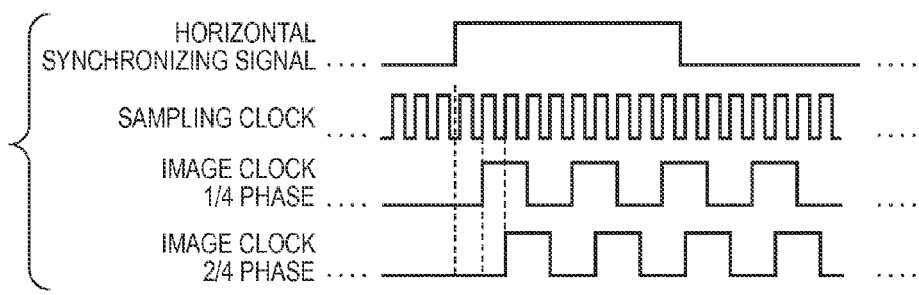

FIGS. 13B and 13C are views for explaining an operation related to the main-scanning write start position misregistration correction according to this embodiment. The control unit 1 reads out the main-scanning write start position misregistration value xtop(Y) of yellow Y stored in the EEPROM 4 in step S124, and outputs the readout value to the image control unit 40. The image control unit 40 controls an image signal generation unit 1302 to calculate a correction value required to correct a write start position misregistration in accordance with the main-scanning write start position misregistration value xtop(Y), and to set that value as a main-scanning write start position misregistration correction value 93.

In the system using the laser scanners, write start positions for respective scanning lines are aligned. For this purpose, as described above, the controller controls the image clock generation unit 1301 to generate an image clock in synchronism with a horizontal synchronizing signal, which is generated by the horizontal synchronizing signal generation unit 95 and is transmitted for each scanning line in an image forming region. Then, the controller transmits an image signal (image data) generated by the image signal generation unit to each laser driving unit of the engine in synchronism with the generated image clock.

A case will be described below wherein the calculated main-scanning write start position misregistration value xtop (Y) is, for example, −2.25 dots (600 dpi). At this time, the main-scanning write start position misregistration correction value 93 is calculated as +2.25 (2+¼) dots which have a sign opposite to the detected value. Note that when the aforementioned main-scanning total magnification displacement correction control is executed at this time, a correction value which additionally considers a main-scanning total magnification displacement fluctuation amount caused by the main-scanning total magnification displacement correction is calculated to execute a correction operation.

A misregistration correction value of a 1-dot unit is generated by changing a count value of image clocks from the horizontal synchronizing signal until a transmission start position of an image signal (image formation start position). When the timing is delayed by an amount for two dots, the count value is set to be +2. Correction less than one dot (for example, ¼) is attained by controlling a synchronizing phase of the horizontal synchronizing signal. A sampling clock has a frequency four times of that of the image clock so as to control the synchronizing phase of the horizontal synchronizing signal. An image clock (for four sampling clocks) begins to be output in synchronism with a desired trailing edge of four clocks since the leading edge of the horizontal synchronizing signal, thereby controlling the phase of the image clock with respect to the horizontal synchronizing signal. Thus, when a setting before correction is ¼ phase, and the timing is delayed from it by ¼ dots, a sampling phase is switched from ¼ phase to ²⁄₄ phase. By the similar methods, the main-scanning write start position misregistration amounts of the remaining colors, that is, magenta M, cyan C, and black K can also be corrected.

In this embodiment, the write start position misregistration correction is executed from the misregistration values xtop of respectively colors independently for the respective colors.

Alternatively, correction may be made according to relative color misalignment values between colors as differences from a predetermined reference color (for example, black K) only for the remaining colors except for the reference color. In this case, the write start position misregistration values of the remaining colors are corrected in correspondence with the main-scanning write start position misregistration value of the reference color.

With the aforementioned main-scanning misregistration correction control, color misalignment correction can be executed by detecting a misregistration amount in the main-scanning direction more precisely than in the related art. The reason why a misregistration amount can be detected more precisely than in the related art in the misregistration detection in the main-scanning direction will be described in detail later.

[Execution Timing of Misregistration Correction Control]

The aforementioned sub-scanning color misalignment correction control and main-scanning color misalignment correction control in this embodiment are respectively independent correction control processes, and execution timings of these two correction control operations will be described below.

The color misalignment correction control execution timings include two cases, that is, a case in which the color misalignment correction control is executed at a normal print timing upon power-ON or after the apparatus is left unused for a long period of time, and a case in which the color misalignment correction control is executed at a continuous print timing.

The case will be described first wherein the color misalignment correction control is executed at the normal print timing. This is the case in which when the power switch is turned on or after the apparatus is left unused for a long period of time, a considerable time has elapsed since the previous color misalignment correction control, and color misregistration is expected to be worsened. This mainly assumes a case in which an external temperature has changed, and color misalignment is caused by changes of positions and shapes of members in the apparatus (for example, optical members in the laser scanners or photosensitive drum members) due to that temperature change. For example, the external temperature in a room in which the apparatus is placed becomes high due to sunlight, air-conditioning in the room, and the like in the daytime, but it becomes low since these influences are removed in the morning and at night.

Hence, when it is judged that a considerable time has elapsed since the previous color misalignment correction control, for example, if a setting value required to execute the color misalignment correction is six hours, and when six hours have elapsed, the color misalignment correction control is executed. At this time, since color misalignment is expected to be worsened in both the main-scanning and sub-scanning direction, the sub-scanning color misalignment correction control (FIG. 4) and main-scanning color misalignment correction control (FIG. 10) are continuously executed. Note that the order may be reversed.

The case will be described below wherein the color misalignment correction control is executed at the continuous print timing.

Figure 14:
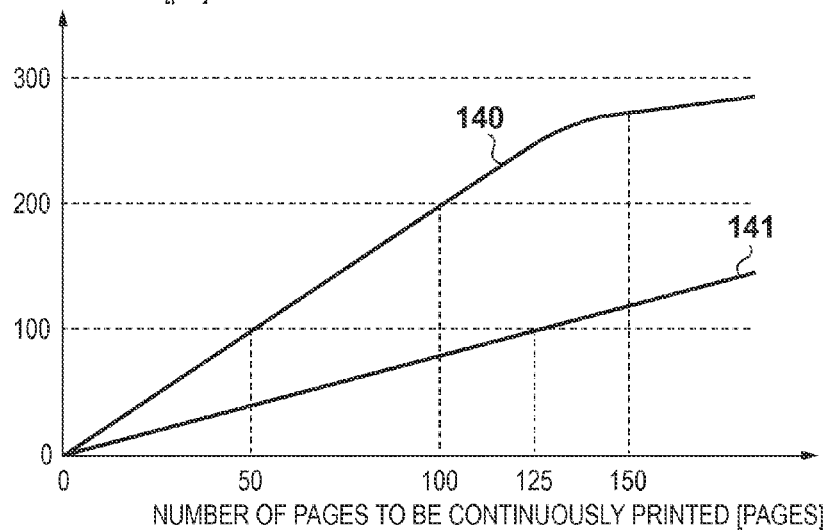
FIG. 14 is a graph for explaining a color misalignment correction control execution timing.

The color misalignment correction control is executed at a timing when the internal temperature rise of the apparatus is detected by the sensor or when a color misalignment amount exceeds a predetermined value by predicting from the number of pages to be continuously printed and the like. FIG. 14 shows prediction curves of color misalignment amounts predicted from the number of pages to be continuously printed, so as to decide this color misalignment correction control execution timing. Since color misalignment generation mechanisms are different depending on types of color misalignment, FIG. 14 shows two sub-scanning and main-scanning color misalignment prediction curves.

Assume that a main-scanning color misalignment amount is expressed by a color misalignment prediction curve 140, and a sub-scanning color misalignment amount is expressed by a color misalignment prediction curve 141. That is, in this embodiment, since main-scanning color misalignment is worsened due to a temperature change earlier than sub-scanning color misalignment, the main-scanning color misalignment correction control is executed at intervals of smaller page counts (earlier timings) than the sub-scanning color misalignment correction control. Assume that information corresponding to the color misalignment prediction curves shown in FIG. 14 is defined and held in advance.

When predicted main-scanning and sub-scanning color misalignment amounts exceed 100 μm since the corresponding previous color misalignment correction control operations, the respective color misalignment correction control operations are executed. For example, the color misalignment correction control execution timing until the number of pages to be continuously printed is 150 will be described below. When 50 pages are printed after the continuous print operation is started, since the predicted main-scanning color misalignment amount exceeds 100 μm, the continuous print operation is temporarily stopped, and the main-scanning color misalignment correction control is executed. As a result of execution of this correction control, the main-scanning color misalignment amount ideally becomes zero. Then, when the continuous print operation is restarted, and 50 pages are further printed, that is, when 100 pages are printed since the very beginning of the continuous print operation, the main-scanning color misalignment correction control is executed again. This is because although the color misalignment amount becomes zero by the main-scanning color misalignment correction control when 50 pages were continuously printed previously, a change amount of the predicted color misalignment amount from continuous 50 pages until continuous 100 pages exceeds 100 μm based on the main-scanning color misalignment prediction curve 140.

Then, when the continuous print operation is restarted, and 25 pages are further continuously printed, that is, when 125 pages are printed from the very beginning of the continuous print operation, since the predicted sub-scanning color misalignment amount exceeds 100 μm, the sub-scanning color misalignment correction control is executed. As a result of this correction control, the sub-scanning color misalignment amount ideally becomes zero. Then, although the continuous print operation is restarted, the color misalignment correction control is not executed later from the very beginning of the continuous print operation until 150 pages are printed. In main-scanning color misalignment, although the color misalignment amount becomes 0 by the main-scanning color misalignment correction control when 100 pages were continuously printed previously, since the change amount of the predicted color misalignment amount until 150 pages are continuously printed does not exceed 100 μm based on the main-scanning color misalignment prediction curve 140, the main-scanning color misalignment correction control is not executed.

Note that the main-scanning color misalignment prediction curve 140 indicates a larger one of a main-scanning write start position color misalignment amount and main-scanning total magnification color misalignment amount, and for example, in the continuous print operation, the main-scanning write start position color misalignment amount becomes always larger. On the other hand, the sub-scanning color misalignment prediction curve 141 indicates a larger one of a sub-scanning write start position color misalignment amount and sub-scanning tilt color misalignment amount, and for example, in the continuous print operation, the sub-scanning write start position color misalignment amount becomes always larger. Note that the sub-scanning write start position color misalignment amount may become larger than the main-scanning write start position color misalignment amount depending on conditions such as an individual difference and installation environment of the image forming apparatus, and the color misalignment correction control of this embodiment can be executed in such situation.

Note that the reason why these two color misalignment correction control operations are executed separately is to decrease an unavailable time of the printer by the user by the correction control. This is because a time required to detect color misalignment amounts occupies much of a total time required for the color misalignment control, and a time required to solely detect the sub-scanning color misalignment amount is shorter than a time required to detect both the main-scanning and sub-scanning color misalignment amounts.

The main-scanning color misalignment correction control and sub-scanning color misalignment correction control are executed at the aforementioned execution timings.

[Main-Scanning Color Misalignment Detection Mechanism]

Figure 11A:
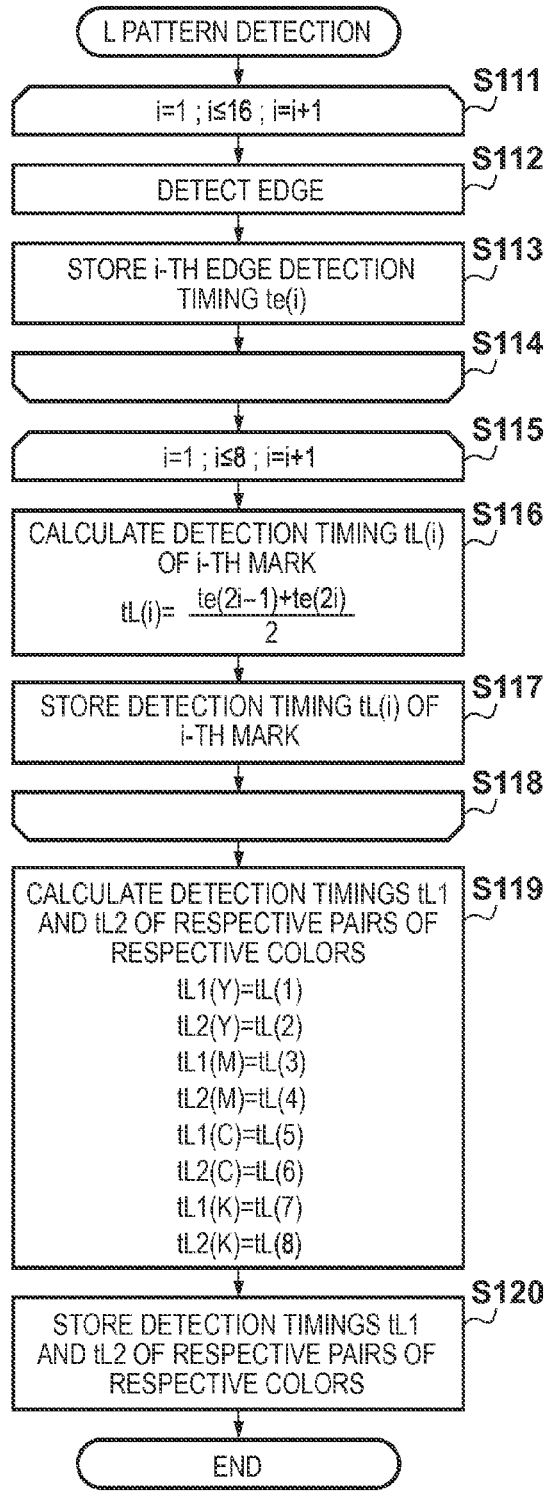
FIGS. 11A and 11B are flowcharts of main-scanning misregistration value detection.
Figure 11B:
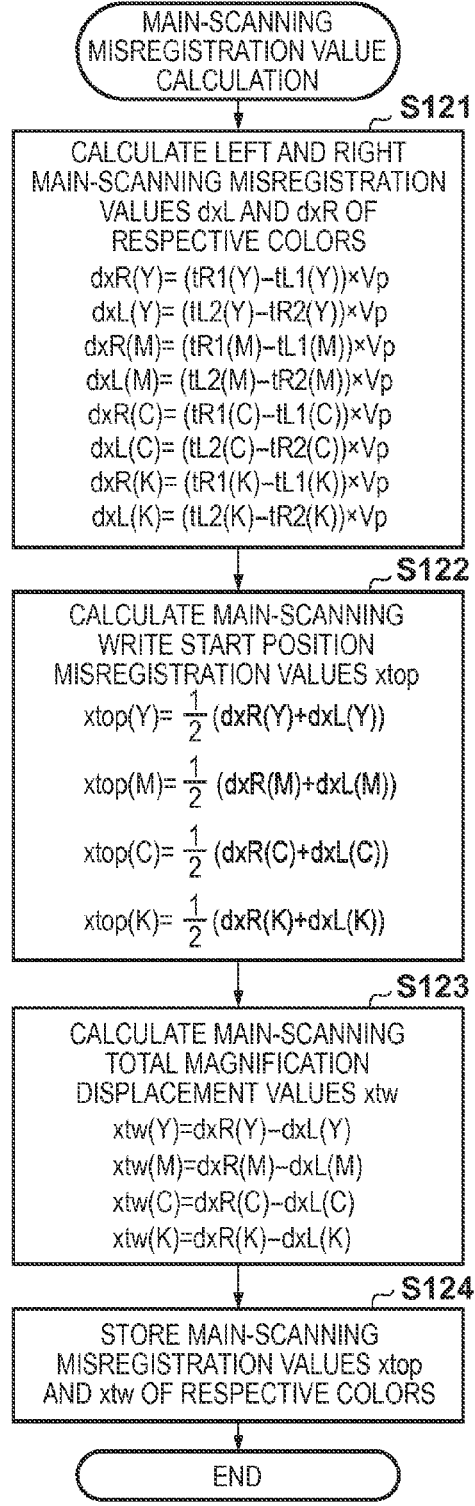

In the main-scanning color misalignment detection according to the present invention, main-scanning detection errors caused by AC color misalignment are removed (eliminated) by the method different from the related art, that is, use of the main-scanning color misalignment detection patterns shown in FIG. 12 and the main-scanning color misalignment detection calculation method shown in FIG. 11B. The mechanism for removing AC components will be described below with reference to FIGS. 16A and 16B.

Figure 16A:
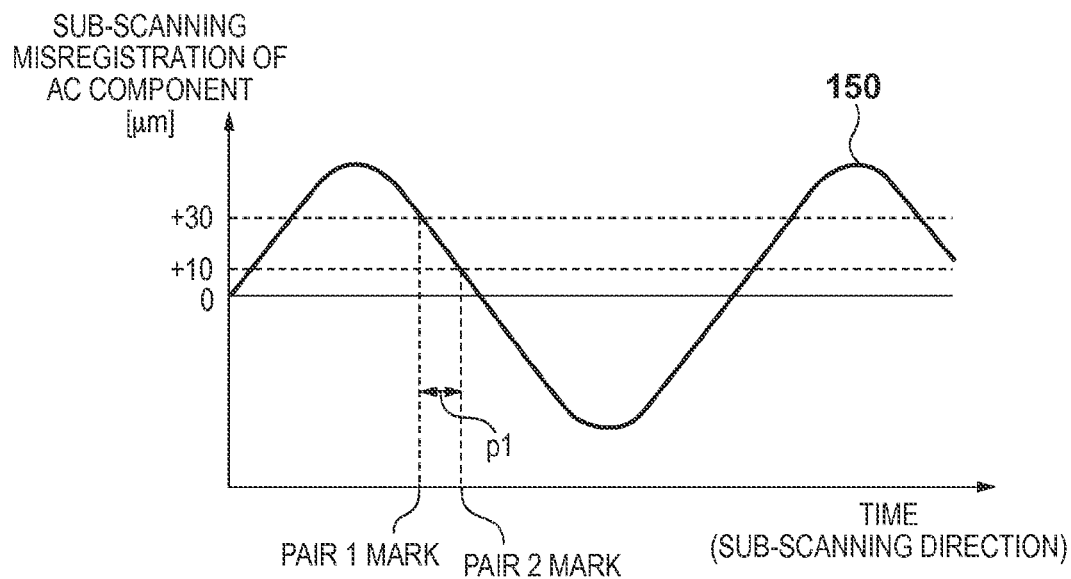
FIGS. 16A and 16B are views showing a state of the main-scanning misregistration detection patterns when sub-scanning misregistration caused by AC components has occurred.

FIG. 16A shows an example of an AC component, and an AC component 150 shows a state in which sub-scanning misregistration of a driving roller period has occurred due to fluctuations of a rotation velocity of the driving roller. Assume that such AC components 150 are similarly generated for respective colors.

Figure 16B:
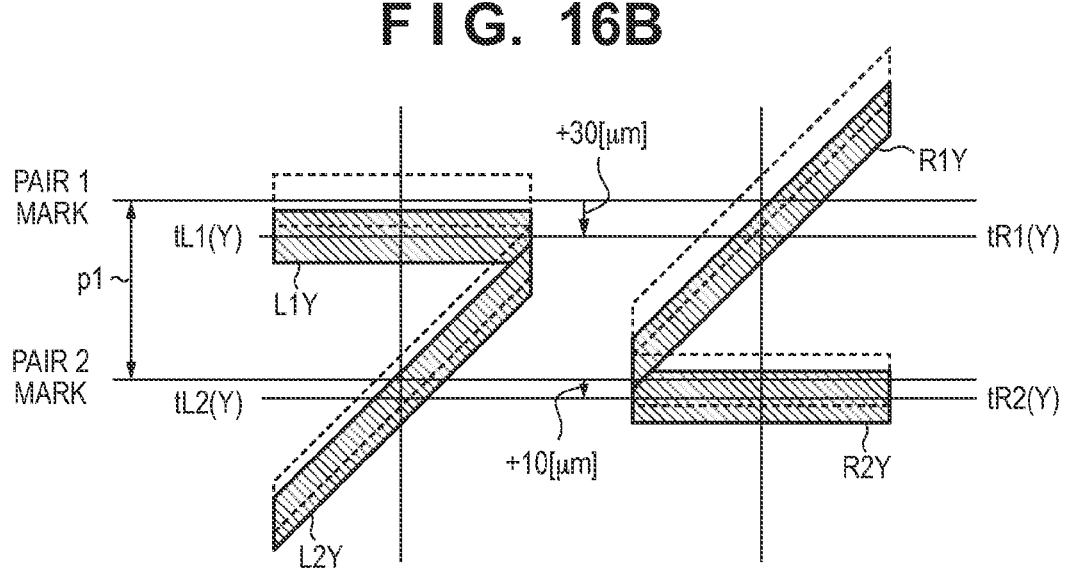

FIG. 16B shows a state in which marks of the main-scanning color misalignment detection patterns (FIG. 12) are displaced when the sub-scanning misregistration has occurred due to the AC component 150. FIG. 16B extracts only marks of yellow Y. In FIG. 16B, broken lines indicate ideal mark positions free from any misregistration, and gray marks indicate mark positions when the AC component 150 is generated.

Since marks L1Y and R1Y of pair 1 and the marks L2Y and R2Y of pair 2 are separated in the sub-scanning direction by a mark interval p1 (between identical colors), the marks of the respective pairs assume different misregistration values in the sub-scanning direction due to the AC component. That is, as shown in FIG. 16A, since the formation timing of the marks of pair 1 are shifted by p1 from that of the marks of pair 2, the AC component 150 has different phases at these timings, and the respective pairs have different sub-scanning misregistration values. As practical numeric values at this time are, for example, +30 μm for pair 1, and +10 μm for pair 2. The following description will be given using these practical numeric values.

Referring to FIG. 16B, in pair 1, both the traverse line mark L1Y and slant line mark R1Y are equally displaced by a misregistration amount=+30 μm, their detection timings tL1(Y) and tR1(Y) are also delayed according to that misregistration amount. That is, the detection timings tL1(Y) and tR1(Y) of pair 1 have no difference. Likewise, in pair 2, both the slant line mark L2Y and traverse line mark R2Y are equally displaced by a misregistration amount=+10 μm, and their detection timings tL2(Y) and tR2(Y) are equally delayed according to that misregistration amount. That is, the detection timings tL2(Y) and tR2(Y) of pair 2 have no difference.

Even when the sub-scanning misregistration has occurred due to the AC component, if their detection timings in each pair have no difference, detection errors are never generated consequently. As has been described above using FIG. 11B, since the main-scanning misregistration value is calculated using a detection timing difference of each pair, if the detection timings of each pair have no difference due to the AC components, a main-scanning misregistration amount is not erroneously detected. That is, sub-scanning misregistration caused by the AC component simultaneously and equally occurs in the left and right marks in each pair. For this reason, the main-scanning misregistration detection method of the present invention, which calculates a detection timing difference between the detection (slant line) mark and reference (traverse line) mark in each pair can automatically remove detection errors due to the AC component, which cancel with each other.

In practical calculation formulas, since the main-scanning misregistration value dxR(Y) is calculated from pair 1 (equation (20)), and the main-scanning misregistration value dxL(Y) is calculated from pair 2 (equation (21)), detection errors caused by the AC component become zero. Since detection errors of the main-scanning misregistration values dxL(Y) and dxR(Y) due to the AC component become zero, no detection errors are mixed in the calculations of each main-scanning write start position misregistration value xtop and main-scanning total magnification displacement value xtw to be calculated later.

Note that the AC component 150 shown in FIG. 16A is caused by fluctuations of the rotation velocity of the driving roller, as described above. However, the present invention is not limited to this. Detection errors caused by any other AC components as various velocity fluctuations of the photosensitive drums, belt, eccentric gears to be driven, and the like can be removed by the same mechanism. More strictly speaking, detection errors caused by an AC component, which changes sub-scanning misregistration values depending on sub-scanning positions, but generates no difference between the left and right sub-scanning misregistration values at the main-scanning positions of the left and right registration detection sensors 6L and 6R, can be removed.

Effect

Effects of use of the main-scanning color misalignment detection method according to the present invention will be described below. Two effects, that is, precision enhancement of main-scanning misregistration detection and shortening of the detection pattern length, will be described.

Precision enhancement of main-scanning misregistration detection will be described first. Note that the detection precision indicates a degree of detection errors caused by AC components. As for detection errors in the related art (Japanese Patent Laid-Open No. 2001-356542) which averages detection patterns in a plurality of sets, even when detection errors caused by a plurality of AC components are to be removed, not all of the AC components can be removed, and detection errors remain to some extent.

By contrast, when the main-scanning color misalignment detection method according to the present invention is used, detection errors can be removed even for any AC component, a non-periodic component, and a plurality of AC components, as can be obvious from the description (FIGS. 16A and 16B) of the mechanism for removing the abovementioned AC component. Detection errors ideally become zero. That is, the main-scanning misregistration detection precision is enhanced compared to the related art. Especially, it is very advantageous to remove all detection errors even for many AC components, compared to the related art.

Figure 28:
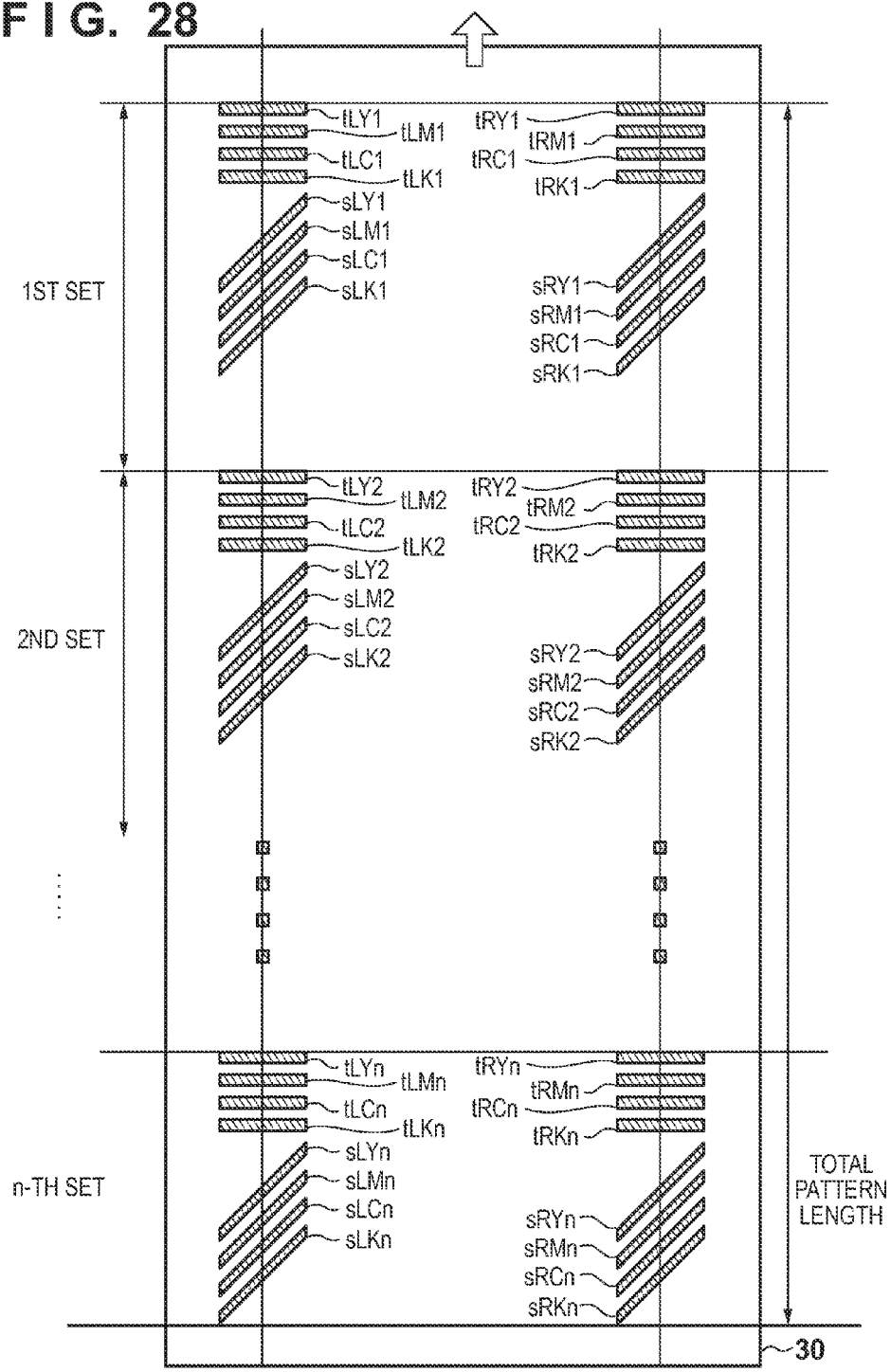
FIG. 28 is a view showing conventional detection patterns.

Shortening of the detection pattern length will be described below. The detection patterns of the present invention includes only two pairs of marks (a total of four marks) per color in the sub-scanning direction, that is, only eight pairs of marks (a total of 32 marks) for four colors in the sub-scanning direction. The total length of the main-scanning misregistration detection patterns of this embodiment is about 35.6 mm (840 dots), which is greatly shorter than the total belt length B=700 mm. On the other hand, in the related art (Japanese Patent Laid-Open No. 2001-356542) which performs averaging by arranging a plurality of sets of detection patterns, since the belt entire surface is normally used to remove AC components as much as possible, its total pattern length is nearly equal to the total belt length. Therefore, the detection pattern length of the present invention can be greatly shorter than that of the related art (for example, FIG. 28).

Such shortening of the pattern length can shorten a time required to detect main-scanning misregistration, and can effectively reduce an unavailable time of the printer by the user by the correction control. Also, since the number of marks is small, toner consumption can also effectively be suppressed. Note that the reason why the detection pattern length can be shortened largely depends on the precision enhancement of the main-scanning misregistration detection as the first effect. Since all of detection errors caused by AC components can be precisely removed, many pattern sets need not be arranged unlike in the related art.

[Modification]
[Modification of Mark Angle]

In the main-scanning misregistration detection patterns (FIG. 12) of this embodiment, the slant line mark to be used as the detection mark makes an angle of 45° with the belt conveyance direction. However, the present invention is not limited to this angle. A detection method when the detection (slant line) mark makes an angle different from 45° will be described below with reference to FIGS. 17A and 17B and FIG. 18.

FIG. 17A shows a case in which only the angle to be made by the detection pattern L2Y of pair 2 of the marks of yellow Y is changed from 45° to 26.565° in the main-scanning misregistration detection patterns. FIG. 17B shows a state of the marks of pair 2 when main-scanning misregistration has occurred in the detection patterns shown in FIG. 17A. When a main-scanning misregistration amount of +100 μm is generated, the mark position at the registration detection sensor 6L of the detection pattern L2Y which makes the angle of 26.565° is moved by +200 μm in the sub-scanning direction. Since the mark of 26.565° in FIG. 17B has an acute angle smaller than that of the mark which makes the angle of 45°, a moving amount in the sub-scanning direction by a mark moving amount in the main-scanning direction does not have one-to-one correspondence, and the mark is moved by a larger amount to improve the sensitivity.

When a moving amount of the slant line mark which makes an angle=θ deg is x, a moving amount y in the sub-scanning direction can be calculated by y=x×tan(90°−θ). That is, the moving amount in the sub-scanning direction is changed according to the angle θ to be made by the mark. When θ is acute smaller than 45°, y is larger than x; when θ is obtuse more than 45°, y is smaller than x. The magnitude relationship between the moving amounts y and x is replaced by a ratio, and its ratio y/x will be referred to as a sensitivity ratio hereinafter. FIG. 18 is a table showing the relationship between this sensitivity ratio y/x and mark angle θ deg. Note that the mark which makes the angle=26.565° in FIG. 17B has a sensitivity ratio=2.

In this case, when the detection calculations described using FIGS. 11A and 11B are made, a problem is posed. In the case shown in FIG. 17B, a main-scanning misregistration detection value of pair 2 is calculated to be +200 μm, which is different from a true main-scanning misregistration value=+ 100 μm, and causes a detection error. Hence, this detection value has to be corrected. This correction can be attained by multiplying the detected value by a correction coefficient α as a reciprocal of the sensitivity ratio shown in FIG. 18.

Details of corrected detection formulas will be described below while generalizing an angle to be made by the detection (slant line) mark of pair 1 to θ1 and that to be made by the detection (slant line) mark of pair 2 to θ2. Correction coefficients α1 and α2 of the respective detection marks can be calculated by:

$$\alpha 1 = 1/\tan(90°-\theta 1) = \cot(90°-\theta 1) \tag{37}$$

$$\alpha 2 = 1/\tan(90°-\theta 2) = \cot(90°-\theta 2) \tag{38}$$

Next, the calculation formula of the main-scanning write start position misregistration value xtop(Y) in step S122 is modified to:

$$xtop(Y) = \frac{1}{2}(\alpha 1 \times dxR(Y) + \alpha 2 \times dxL(Y)) \tag{39}$$

Also, the calculation formula of the main-scanning total magnification displacement value xtw(Y) in step S123 is modified to:

$$xtw(Y) = \alpha 1 \times dxR(Y) - \alpha 2 \times dxL(Y) \tag{40}$$

By the similar methods, the calculation formulas of the main-scanning write start position misregistration values xtop and main-scanning total magnification displacement values xtw of the remaining colors, that is, magenta M, cyan C, and black K can be modified.

Note that this embodiment has exemplified the state in which marks are to be formed to be free from any misregistration in the sub-scanning direction in a state in which the registration detection sensors 6L and 6R are arranged to be free from any misregistration in the sub-scanning direction, as shown in, for example, FIG. 12. However, the present invention is not limited to such specific state. For example, when the registration detection sensors 6L and 6R are arranged to be displaced by, for example, 100 μm in the sub-scanning direction, marks to be formed are also displaced by 100 μm in the sub-scanning direction, thus allowing the registration detection sensors 6L and 6R to simultaneously detect these marks.

[Latent Image Registration Detection]

This embodiment adopts the detection method using the toner marks shown in FIGS. 6A and 6B as the arrangement for independently executing the sub-scanning misregistration correction control. Alternatively, a sub-scanning misregistration detection method using latent image patterns of Japanese Patent Laid-Open No. 2001-356542 described in the related art may be used. This is because the detection method using the latent image patterns requires a shorter detection time than the detection method using the toner marks of this embodiment. Therefore, by using the aforementioned detection method together with the main-scanning misregistration detection of the present invention, color misalignment correction control operations in both the main-scanning and sub-scanning directions can be effectively executed for a shorter period time.

Second Embodiment

The first embodiment suffers a problem that a detection error of a main-scanning total magnification displacement is generated according to a tilt misregistration value in the sub-scanning direction (sub-scanning tilt misregistration) when the main-scanning color misalignment correction control is executed at the continuous print timing described in the paragraphs of the color misalignment correction control execution timings (FIG. 14). For this reason, this embodiment is characterized by correcting a main-scanning total magnification displacement detection value according to a sub-scanning tilt misregistration value.

[Problem Caused by Sub-Scanning Tilt Misregistration]

Figure 19A:
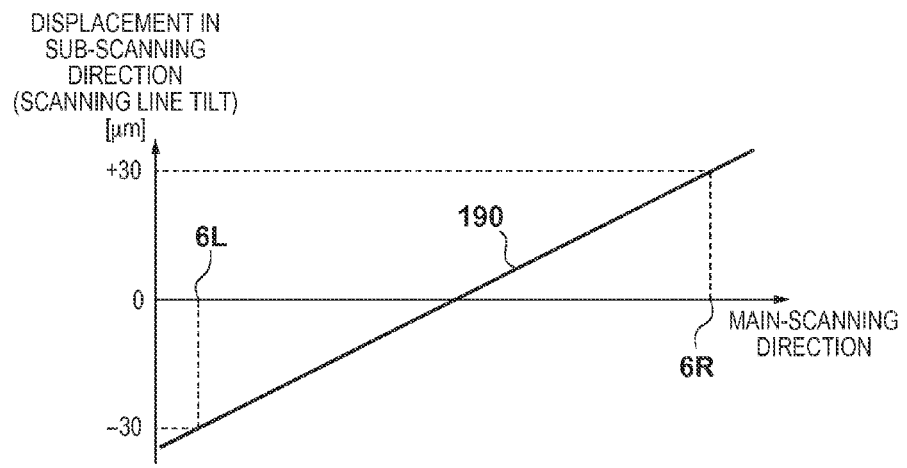
FIGS. 19A and 19B are views showing a state of the main-scanning misregistration detection patterns when a sub-scanning tilt misregistration has occurred.
Figure 19B:
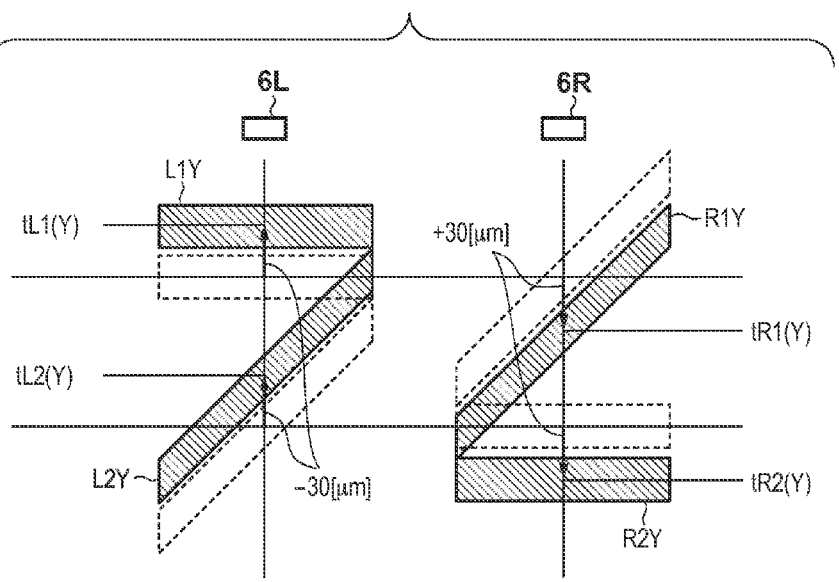

FIGS. 19A and 19B show a problem that a detection error of a main-scanning total magnification displacement is generated according to a sub-scanning tilt misregistration value. FIG. 19A shows an example of sub-scanning tilt misregistration. A sub-scanning tilt 190 is a linear scanning line tilt which has a tilt amount=60 µm between two sensors, and generates a sub-scanning tilt misregistration amount=−30 µm at the position of a left registration detection sensor 6L and a sub-scanning tilt misregistration amount=+30 µm at the position of a right registration detection sensor 6R. FIG. 19B shows a state of main-scanning misregistration detection patterns (FIG. 12) of the first embodiment when the sub-scanning tilt 190 is generated. FIG. 19B extracts only marks of yellow Y as a sub-scanning tilt of yellow Y.

Since the sub-scanning misregistration amount=−30 µm is generated at the position of the left registration detection sensor 6L, both a traverse line mark L1Y and slant line mark L2Y on the left side are moved by 30 µm from their ideal positions (broken lines) in a direction opposite to the sub-scanning direction. Also, since the sub-scanning misregistration amount=+30 µm is generated at the position of the right registration detection sensor 6R, both a slant line mark R1Y and traverse line mark R2Y at the right side are moved by +30 µm from their ideal positions (broken lines) in the sub-scanning direction. However, in the misregistration generation state shown in FIG. 19B, mark positions are illustrated to be exaggerated compared to actual misregistration for the sake of easy understanding.

At this time, a relative difference according to the misregistration having the tilt amount=60 µm is generated at the detection timings between the left and right marks in respective pairs. That is, this indicates that a right main-scanning misregistration value dxR obtained by subtracting a detection timing tL1(Y) of a reference mark from a detection timing tR1(Y) of the detection mark (equation (20)) is unwantedly detected as +60 µm. In practice, since no main-scanning misregistration is generated, this value is a detection error. Also, in pair 2, a left main-scanning misregistration value dxL obtained by subtracting a detection timing tR2(Y) of a reference mark from a detection timing tL2(Y) of the detection mark (equation (21)) is unwantedly detected as −60 µm. In this case, since no main-scanning misregistration is generated in practice, this value is a detection error.

However, since a main-scanning write start position misregistration value xtop(Y) is calculated by calculating an average of the detected left and right main-scanning misregistration values dxL and dxR (equation (28)), detection errors consequently cancel with each other, and become zero. On the other hand, since a main-scanning total magnification displacement value xtw(Y) is calculated by calculating a difference between the detected left and right main-scanning misregistration values dxL and dxR (equation (32)), a detection error remains, and is 120 µm twice of an actual tilt amount. Hence, in the first embodiment, when a sub-scanning tilt is generated at the main-scanning misregistration detection timing, a detection error is generated in the main-scanning total magnification displacement value.

Differences from the first embodiment will be described below. The differences include main-scanning misregistration detection patterns (FIG. 12) and main-scanning misregistration value calculations (FIG. 11B) by detecting these patterns in the main-scanning misregistration correction control.

[Main-Scanning Misregistration Detection Pattern]

Figure 21:
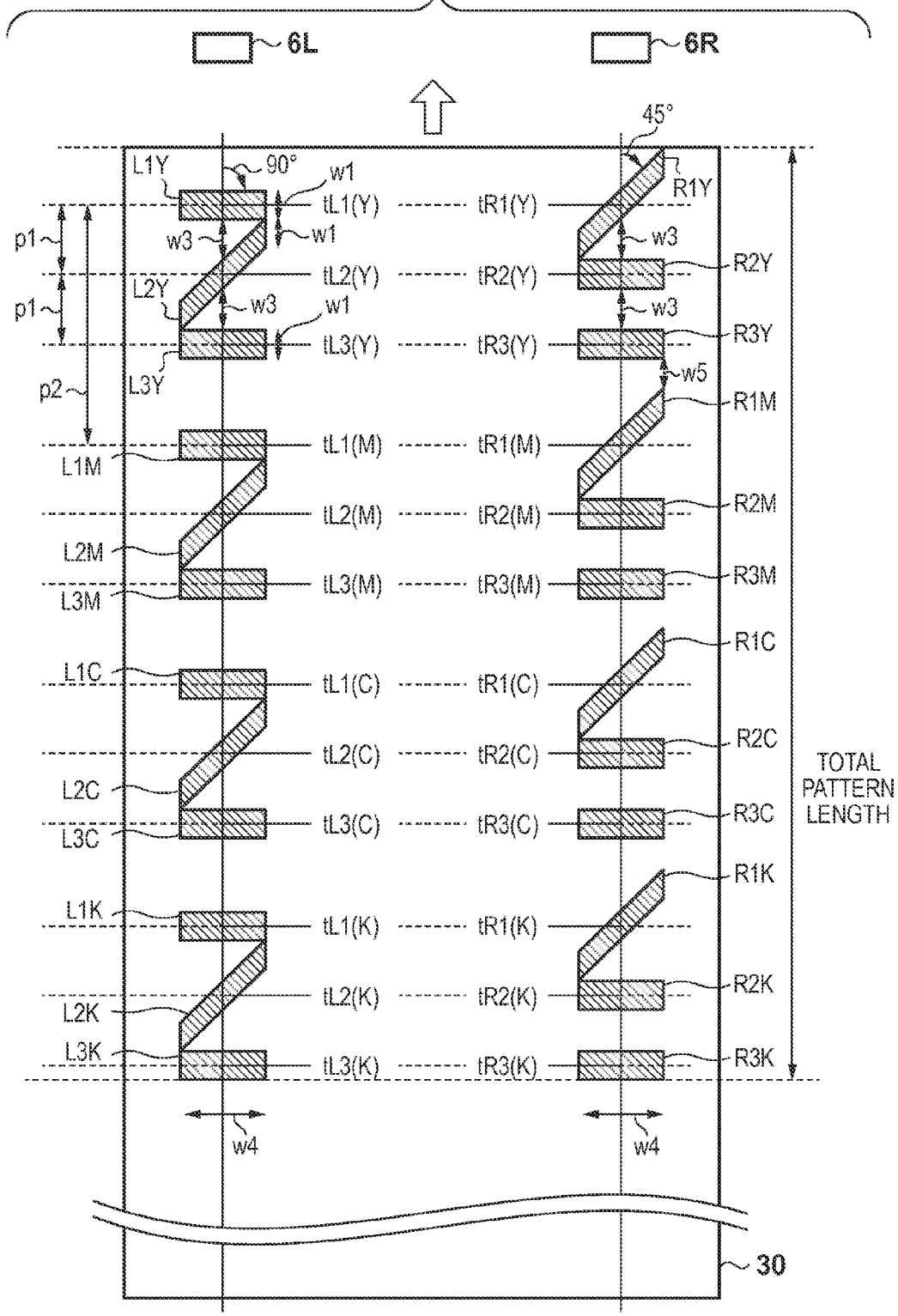
FIG. 21 is a view showing main-scanning misregistration detection patterns according to the second embodiment.

FIG. 21 shows main-scanning misregistration detection patterns of this embodiment. In this embodiment, left and right traverse line marks L3Y and R3Y as a third pair are added at the left and right positions of the detection patterns (FIG. 12) of the first embodiment. The detection timings of the added marks are set as tL3 (Y) and tR3(Y). Note that similar marks of the third pair are also added not only to yellow Y but also to the remaining colors, that is, magenta M, cyan C, and black K.

Also, a mark width w1, mark gaps w3 and w5, mark longitudinal width w4, and the like are the same as those of the detection patterns (FIG. 12) of the first embodiment. A mark interval p2 between colors is about 13.1 mm (310 dots), and the total length of the detection patterns is about 50.8 mm (1,200 dots). This total length of the detection patterns is larger than 35.6 mm of the detection patterns of the first embodiment, but it is still greatly shorter than 700 mm of the total belt length B and the detection patterns of this embodiment can be still greatly shorter than those (for example FIG. 28) of the related art.

[Main-Scanning Misregistration Value Calculation]

Figure 20A:
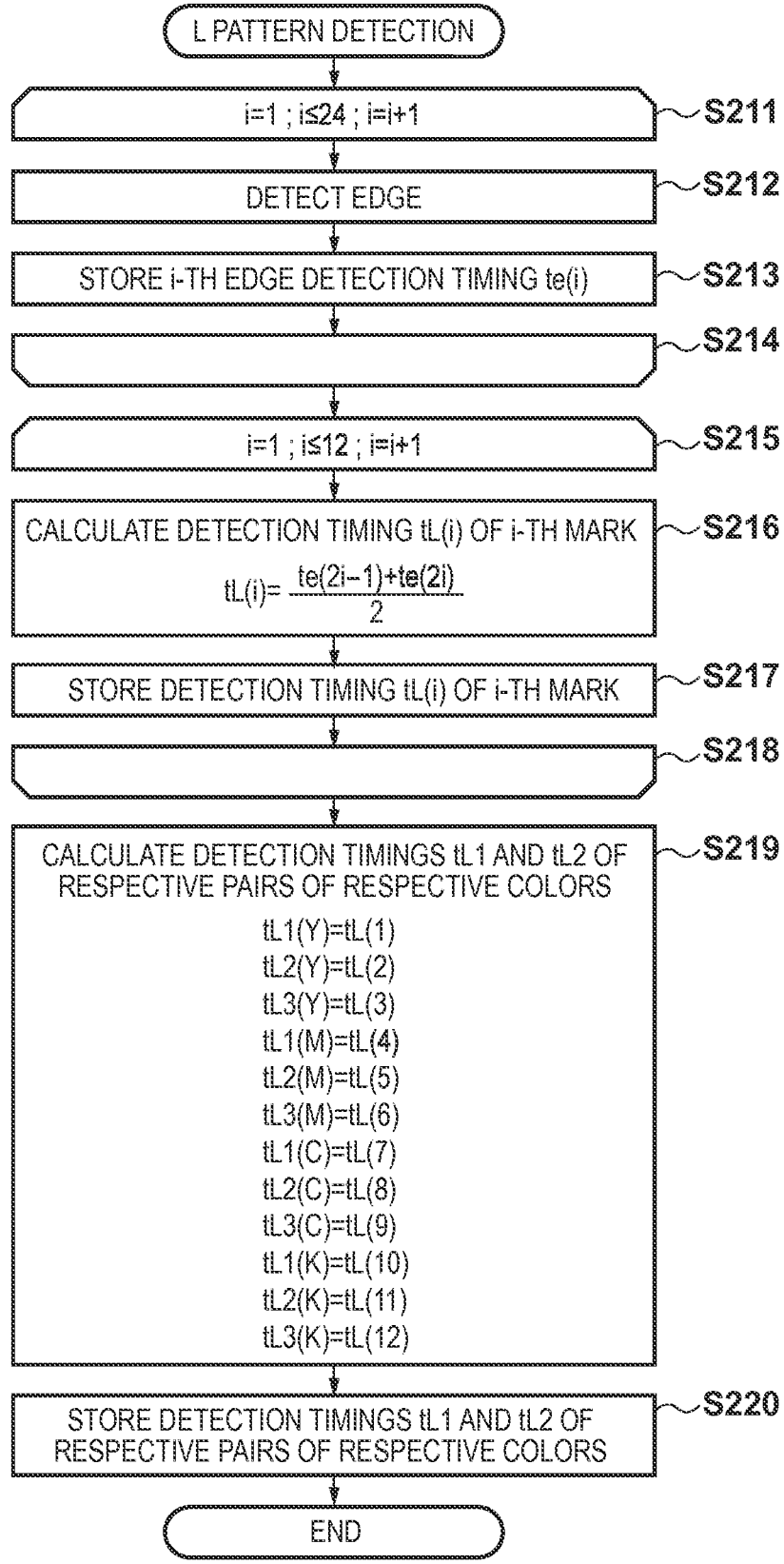

FIG. 20A shows the processing sequence for detecting the main-scanning misregistration detection patterns of this embodiment by the registration detection sensor (6L). Processes of respective steps in FIG. 20A are basically the same as those shown in FIG. 11A, and a detailed description thereof will not be repeated. Differences from FIG. 11A will be mainly described below. Since the main-scanning misregistration detection patterns of this embodiment include a total of 12 marks on one side (L side), loop processing in step S211 is repeated by i=1 to 24, and that in step S215 is repeated by i=1 to 12.

In step S219, a control unit 1 makes calculations for separating detection timings of respective pairs of respective colors from detection timings tL of the total of 12 marks. The detection timings of respective pairs of yellow Y are tL1(Y) for pair 1, tL2(Y) for pair 2, and tL3(Y) for pair 3, and can be respectively calculated by:

$$tL1(Y)=tL(1), tL2(Y)=tL(2), tL3(Y)=tL(3) \tag{41}$$

By the similar methods, the detection timings of respective pairs of the remaining colors, that is, magenta M, cyan C, and black K can be respectively calculated by:

$$tL1(M)=tL(4), tL2(M)=tL(5), tL3(M)=tL(6) \quad (42)$$

$$tL1(C)=tL(7), tL2(C)=tL(8), tL3(C)=tL(9) \quad (43)$$

$$tL1(K)=tL(10), tL2(K)=tL(11), tL3(K)=tL(12) \quad (44)$$

The calculated detection timings tL1, tL2, and tL3 of respective pairs of respective colors indicate those of the respective marks shown in FIG. 21. In step S220, the control unit 1 stores the calculated detection timings tL1, tL2, and tL3 of respective pairs of respective colors in an EEPROM 4.

FIG. 20B shows the processing sequence for calculating two different main-scanning misregistration values, that is, main-scanning write start position misregistration and main-scanning total magnification displacement values in this embodiment. Processes of respective steps shown in FIG. 20B are basically the same as those shown in FIG. 11B, and a detailed description thereof will not be repeated. Differences from FIG. 11B will be mainly described below.

In step S222 as a process added in this embodiment, the control unit 1 newly calculates sub-scanning tilt misregistration values yprl. A sub-scanning tilt misregistration value yprl(Y) of yellow Y can be calculated by multiplying a difference between the detection timings tL3(Y) and tR3(Y) of the left and right traverse line marks of pair 3 by a moving velocity Vp (mm/s) of an intermediate transfer belt 30 by:

$$yprl(Y)=(tR3(Y)-tL3(Y)) \times Vp \quad (45)$$

By the similar methods, misregistration values of the remaining colors, that is, magenta M, cyan C, and black K can be respectively calculated by:

$$yprl(M)=(tR3(M)-tL3(M)) \times Vp \quad (46)$$

$$yprl(C)=(tR3(C)-tL3(C)) \times Vp \quad (47)$$

$$yprl(K)=(tR3(K)-tL3(K)) \times Vp \quad (48)$$

This sub-scanning tilt misregistration value yprl is to calculate a tilt value of a scanning line from the main-scanning position of the registration detection sensor 6L to that of the registration detection sensor 6R.

In step S223, the control unit 1 calculates main-scanning write start position misregistration values xtop of respective colors. The contents are the same as those in step S122 in FIG. 11B.

Next, in step S224, the control unit 1 calculates main-scanning total magnification displacement values xtw of respective colors. In order to correct a detection error caused by the sub-scanning tilt misregistration amount yprl(Y), a main-scanning total magnification displacement value xtw (Y) of yellow Y can be calculated from a difference between the misregistration values dxL(Y) and dxR(Y) using:

$$xtw(Y)=dxR(Y)-dxL(Y)-2 \times yprl(Y) \quad (49)$$

By the similar methods, misregistration values of the remaining colors, that is, magenta M, cyan C, and black K can be respectively calculated by:

$$xtw(M)=dxR(M)-dxL(M)-2 \times yprl(M) \quad (50)$$

$$xtw(C)=dxR(C)-dxL(C)-2 \times yprl(C) \quad (51)$$

$$xtw(K)=dxR(K)-dxL(K)-2 \times yprl(K) \quad (52)$$

This main-scanning total magnification displacement value xtw is to calculate an increment/decrement value due to enlargement/reduction of a scanning line width from the main-scanning position of the registration detection sensor 6L to that of the registration detection sensor 6R. Then, in step S225, the control unit 1 stores the main-scanning write start position misregistration values xtop and main-scanning total magnification displacement values xtw of respective colors in the EEPROM 4.

The differences from the first embodiment in this embodiment have been described.

In this embodiment, by correcting the main-scanning total magnification displacement detection values according to the sub-scanning tilt misregistration amounts, more precise main-scanning total magnification displacement detection can be attained independently of any sub-scanning tilt misregistration amounts.

[Modification]

Note that in order to calculate the sub-scanning tilt misregistration value yprl to be corrected upon calculation of the main-scanning total magnification displacement in this embodiment, the traverse line marks of the third pair for tilt detection, which are shown in the main-scanning misregistration detection patterns (FIG. 21), are added and are used to detect a tilt each time. However, the patterns to be used to detect a sub-scanning tilt are not limited to the additional patterns like the traverse line marks of the third pair, and any other patterns may be used as long as a sub-scanning tilt can be detected.

Also, in order to calculate the sub-scanning tilt misregistration value yprl to be corrected, the sub-scanning tilt detection patterns required to detect a tilt each time are added to the main-scanning misregistration detection patterns. However, the present invention is not limited to such arrangement for detecting a tilt each time. For example, a tilt value which is detected at the previous sub-scanning color misalignment correction control timing and is stored in the EEPROM 4, that which is predicted during a continuous print operation, that which is calculated according to these two values, a fixed tilt value which is set by measuring a tilt value using a measuring device at a factory delivery timing, and the like may be used. This is because this embodiment adopts the arrangement for correcting a tilt in the sub-scanning direction, as shown in FIGS. 8A and 8B, but an arrangement that does not execute such tilt correction is available. In case of that arrangement, since it is designed to prevent a tilt from being largely changed along with the elapse of time, a tilt need not be detected each time even by adding new patterns to the detection patterns, and a previous tilt value obtained at the sub-scanning color misalignment correction control timing can also be used.

Third Embodiment

In the first and second embodiments, the two pairs of detection (slant line) marks used in the main-scanning misregistration detection patterns use the slant line marks whose angles made with the belt conveyance direction have the same sign. However, the present invention is not limited to this, and slant line marks having angles to be made of different signs may be used. However, when the slant line marks having angles to be made of different signs are used, subsequent main-scanning misregistration value calculation formulas and the sub-scanning tilt correction calculation formulas in the second embodiment are different. For this reason, in this embodiment, two pairs of detection (slant line) marks are characterized by detection patterns when angles these detection marks make with the belt conveyance direction have different signs, and an arrangement suitable for such marks will be described below.

Differences from the second embodiment will be described below. The differences include main-scanning misregistration detection patterns (FIG. 21) and execution of main-scanning misregistration value calculations (FIG. 20B) by detecting these patterns.

[Main-Scanning Misregistration Detection Pattern]

Figure 23:
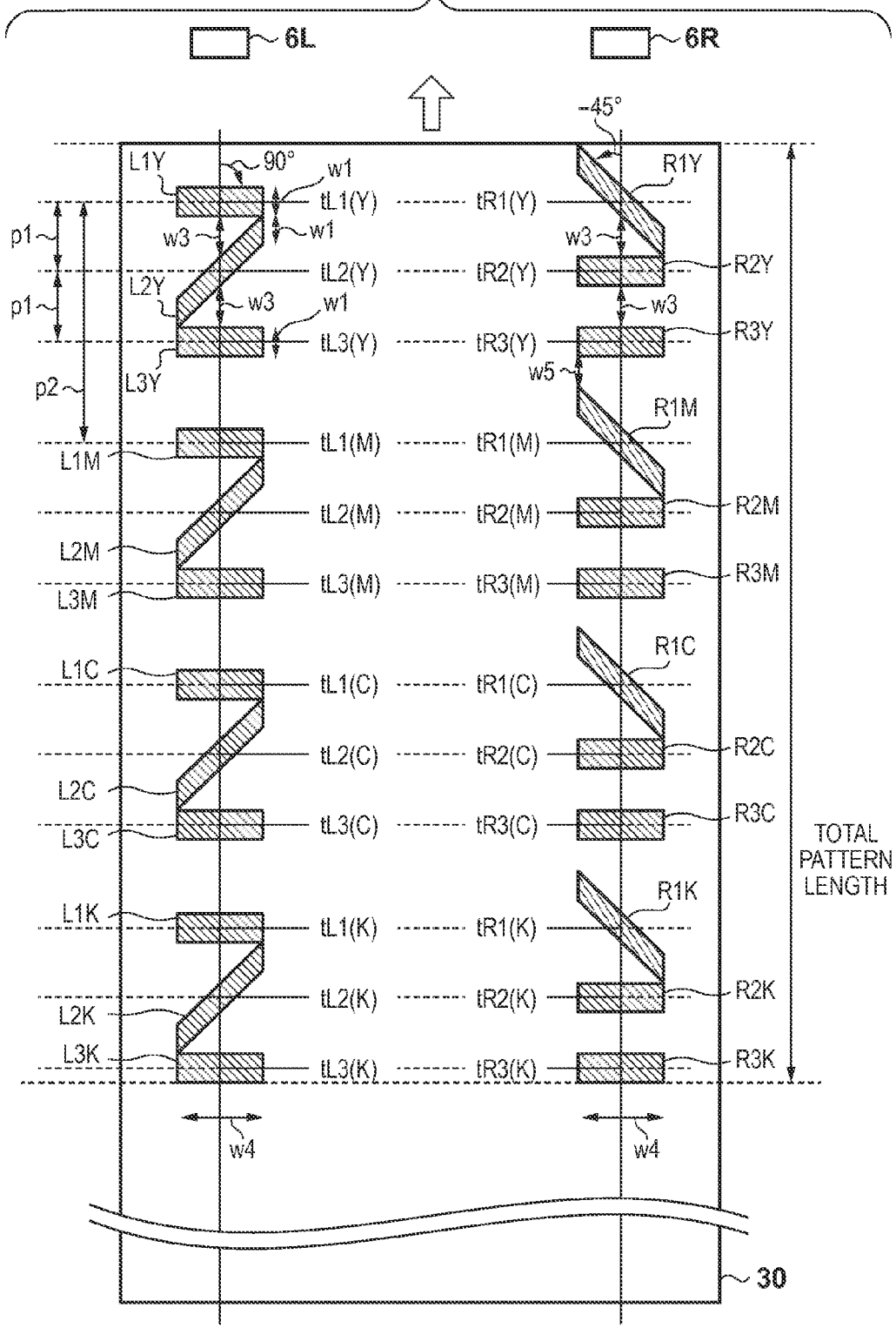
FIG. 23 is a view showing main-scanning misregistration detection patterns according to the third embodiment.

FIG. 23 shows main-scanning misregistration detection patterns according to this embodiment. In this embodiment, an angle made by a right detection (slant line) mark R1Y in pair 1 is set to be −45° having a sign different from that of an angle made by a left detection mark L2Y in pair 2. Likewise, angles made by detection marks in pairs 1 for the remaining colors, that is, magenta M, cyan C, and black K are set to be −45°. Since detection patterns shown in FIG. 23 are the same as those shown in FIG. 21 except for changes of these angles to be made, a detailed description will not be given.

Figure 24:
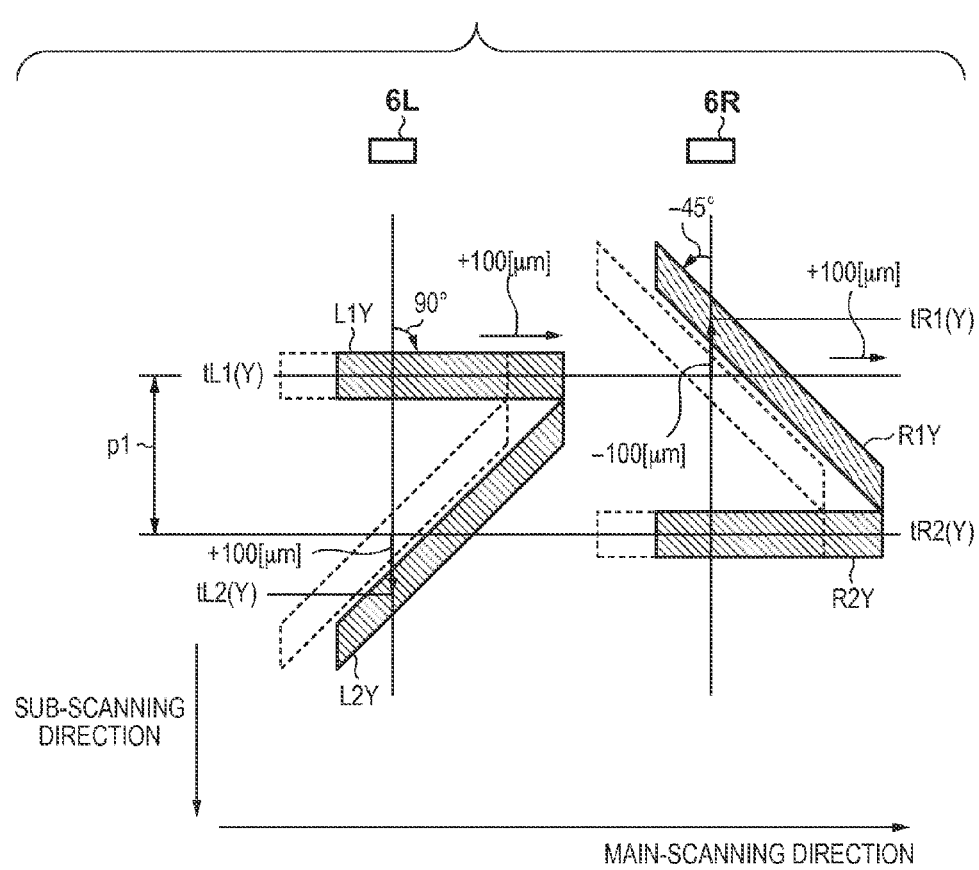
FIG. 24 is a view showing a state of the main-scanning misregistration detection patterns when main-scanning misregistration has occurred according to the third embodiment.

FIG. 24 shows a state in which the main-scanning misregistration detection patterns (FIG. 23) in this embodiment are displaced when a main-scanning misregistration amount=+100 μm as a DC component is generated. FIG. 24 extracts only marks of yellow Y. As can be seen from FIG. 24, the detection mark L2Y of pair 2 having an angle=+45° to be made is displaced by +100 μm in the sub-scanning direction, while the detection mark R1Y of pair 2 having an angle=−45° to be made, which is changed in this embodiment, is displaced by −100 μm in the sub-scanning direction. Hence, if the signs of angles to be made by the detection (slant line) marks are different, displacement directions of the detection marks in the sub-scanning direction due to the main-scanning misregistration are also different. Hence, in the subsequent detection calculations, these signs have to be taken into consideration.

[Main-Scanning Misregistration Value Calculation]

Figure 22:
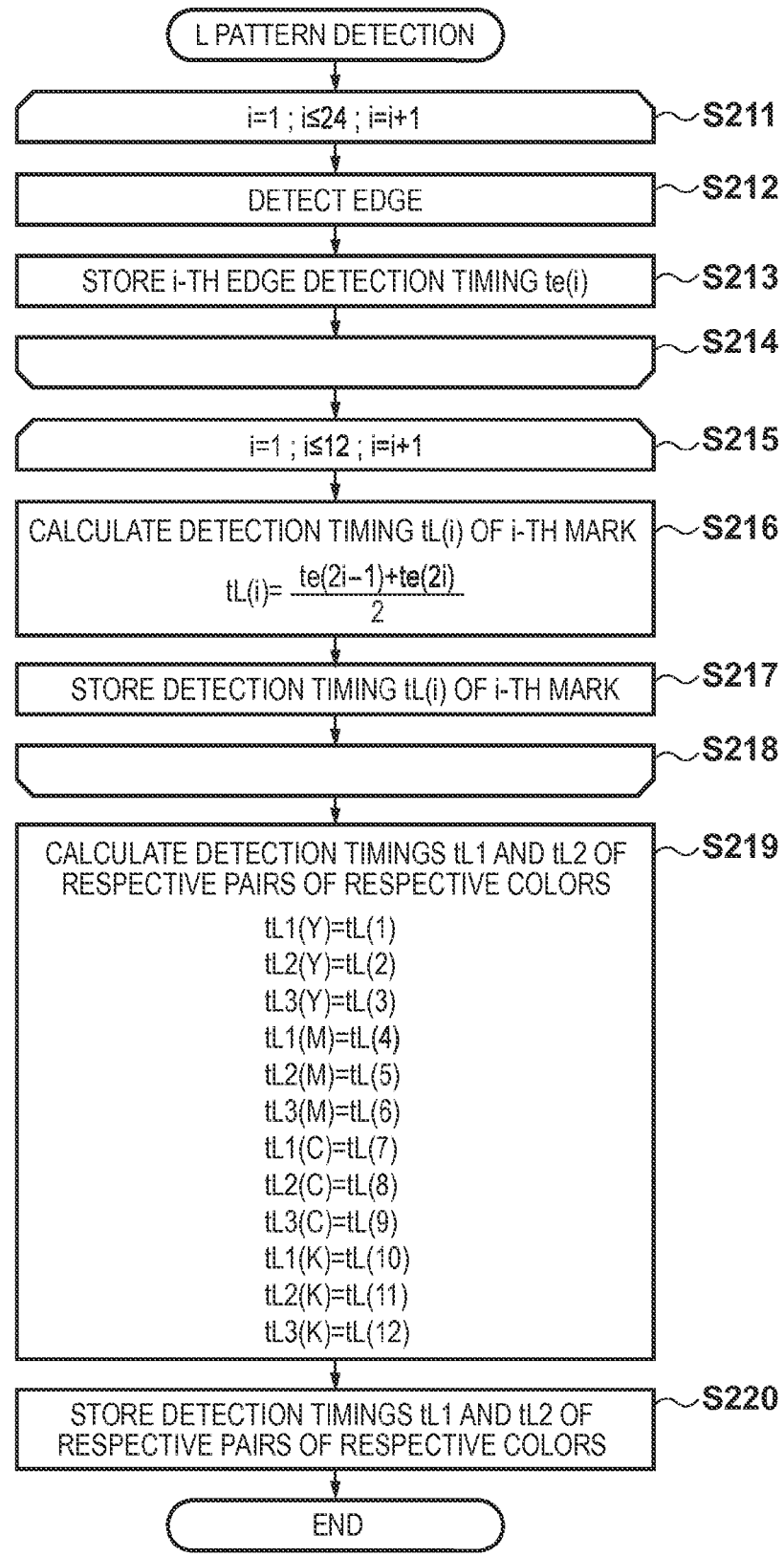
FIGS. 22A and 22B are flowcharts of main-scanning misregistration value detection according to the third embodiment.

FIG. 22A shows the processing sequence for detecting the main-scanning misregistration detection patterns of this embodiment by a registration detection sensor (6L). Since processes of respective steps shown in FIG. 22A are the same as those of the respective steps shown in FIG. 20A, a detailed description thereof will not be repeated.

FIG. 22B shows the processing sequence for calculating, for respective colors, two types of main-scanning misregistration values, that is, main-scanning write start position misregistration and main-scanning total magnification displacement values in this embodiment. Since processes of respective steps shown in FIG. 22B are basically the same as those of respective steps shown in FIG. 20B, a detailed description thereof will not be repeated. Differences from FIG. 20B will be mainly described below.

In step S231, a control unit 1 calculates main-scanning misregistration values xL and xR of respective colors at registration detection sensors 6L and 6R. In pair 1 of yellow Y, a main-scanning misregistration value dxR to be detected can be calculated in consideration of the aforementioned displacement direction of the detection mark in a timing difference obtained by subtracting a detection timing tL1(Y) of a reference mark from a detection timing tR1(Y) of the detection mark using:

$$dxR(Y) = -(tR1(Y) - tL1(Y)) \times Vp \quad (53)$$

where Vp is a moving velocity (mm/s) of an intermediate transfer belt 30. As for pair 2, since the sign of the angle to be made is the same as that of the detection mark L2Y of the second embodiment, a main-scanning misregistration value dxL can be detected and calculated by the same calculation formula (equation (21)), and a detailed description thereof will not be repeated.

By the similar methods, main-scanning misregistration values dxR in pairs 1 of the remaining colors, that is, magenta M, cyan C, and black K can also be respectively calculated by:

$$dxR(M) = -(tR1(M) - tL1(M)) \times Vp \quad (54)$$

$$dxR(C) = -(tR1(C) - tL1(C)) \times Vp \quad (55)$$

$$dxR(K) = -(tR1(K) - tL1(K)) \times Vp \quad (56)$$

What kind of detection errors the main-scanning misregistration amounts dxR and dxL, which are detected and calculated in step S231, become when a sub-scanning tilt described in FIG. 19A has occurred will be described below. Since a sub-scanning misregistration amount=+30 μm is generated at the position of the right registration detection sensor 6R, a main-scanning misregistration value dxR(Y), which can be detected from pair 1 of yellow Y, is −30 μm. Note that this value has a sign different from that in the second embodiment. Then, since a sub-scanning misregistration amount=−30 μm is generated at the position of the registration detection sensor 6L, a main-scanning misregistration value dxL(Y) which can be detected from pair 2 of yellow Y is also −30 μm.

That is, errors of −30 μm of the same sign are detected in the right and left main-scanning misregistration values dxR and dxL with respect to this misregistration of the tilt amount=60 μm. Thus, since the main-scanning write start position misregistration value xtop(Y) is calculated by averaging the detected right and left main-scanning misregistration values dxR and dxL, the detection errors are consequently not canceled with each other, and an error=−30 μm remains. On the other hand, since a main-scanning total magnification displacement value xtw(Y) is calculated by calculating a difference between the detected right and left main-scanning misregistration values dxR and dxL, detection errors are canceled with each other to 0 μm.

Therefore, in this embodiment, when a sub-scanning tilt is generated, detection errors are generated in only the main-scanning write start position misregistration values unlike in the second embodiment.

In step S232, the control unit 1 calculates sub-scanning tilt misregistration values yprl of respective colors. The contents are the same as those in step S222 in FIG. 20B.

Next, in step S233, the control unit 1 calculates main-scanning write start position misregistration values xtop of respective colors. As described above, when a sub-scanning tilt is generated, since detection errors are generated in the main-scanning write start position misregistration values, the control unit 1 corrects the detection errors using the sub-scanning tilt misregistration values yprl. In order to correct a detection error caused by a sub-scanning tilt misregistration amount yprl(Y), a main-scanning write start position misregistration value xtop(Y) of yellow Y can be calculated form an average value of the misregistration values dxL(Y) and dxR(Y) in the main-scanning direction using:

$$xtop(Y) = \frac{1}{2}(dxR(Y) + dxL(Y)) + \frac{1}{2}yprl(Y) \quad (57)$$

By the similar methods, misregistration values of the remaining colors, that is, magenta M, cyan C, and black K can also be respectively calculated by:

$$xtop(M) = \frac{1}{2}(dxR(M) + dxL(M)) + \frac{1}{2}yprl(M) \quad (58)$$

$$xtop(C) = \frac{1}{2}(dxR(C) + dxL(C)) + \frac{1}{2}yprl(C) \quad (59)$$

-continued $$xtop(K) = \frac{1}{2}(dxR(K) + dxL(K)) + \frac{1}{2}yprl(K) \quad (60)$$

Next, in step S234, the control unit 1 calculates main-scanning total magnification displacement values xtw of respective colors. As described above, since no detection error is generated in the main-scanning total magnification displacement values even when a sub-scanning tilt is generated in this embodiment, the main-scanning total magnification displacement values xtw need not be corrected unlike in the second embodiment. Hence, the contents are the same as those in step S123 shown in FIG. 11B.

The differences from the second embodiment in this embodiment have been described.

In this embodiment, even when detection (slant line) marks of two pairs correspond to those having different signs of angles these detection marks make with the belt conveyance direction, high-precision main-scanning write start position misregistration and main-scanning total magnification displacement amounts can be detected independently of a sub-scanning tilt misregistration amount.

Fourth Embodiment

In the second and third embodiments, when a sub-scanning tilt misregistration amount is generated, main-scanning misregistration value detection requires correction according to the tilt misregistration amount. This embodiment is characterized in that no sub-scanning tilt misregistration correction is required.

In the second embodiment, when angles made by detection (slant line) marks of two pairs have the same sign, a main-scanning misregistration item which requires sub-scanning tilt misregistration correction is a main-scanning total magnification displacement value. In the third embodiment, when angles made by detection (slant line) marks of two pairs have different signs, a main-scanning misregistration item which requires sub-scanning tilt misregistration correction is a main-scanning write start position misregistration value. Hence, this embodiment combines these two arrangements to selectively adopt a main-scanning misregistration item free from any sub-scanning tilt misregistration correction.

Differences from the first to third embodiments will be described below. The differences include main-scanning misregistration detection patterns (FIGS. 12, 21, and 23) and main-scanning misregistration value calculations (FIGS. 11B, 20B, and 22B) by detecting these patterns in the main-scanning color misalignment correction control.

[Main-Scanning Misregistration Detection Pattern]

Figure 26:
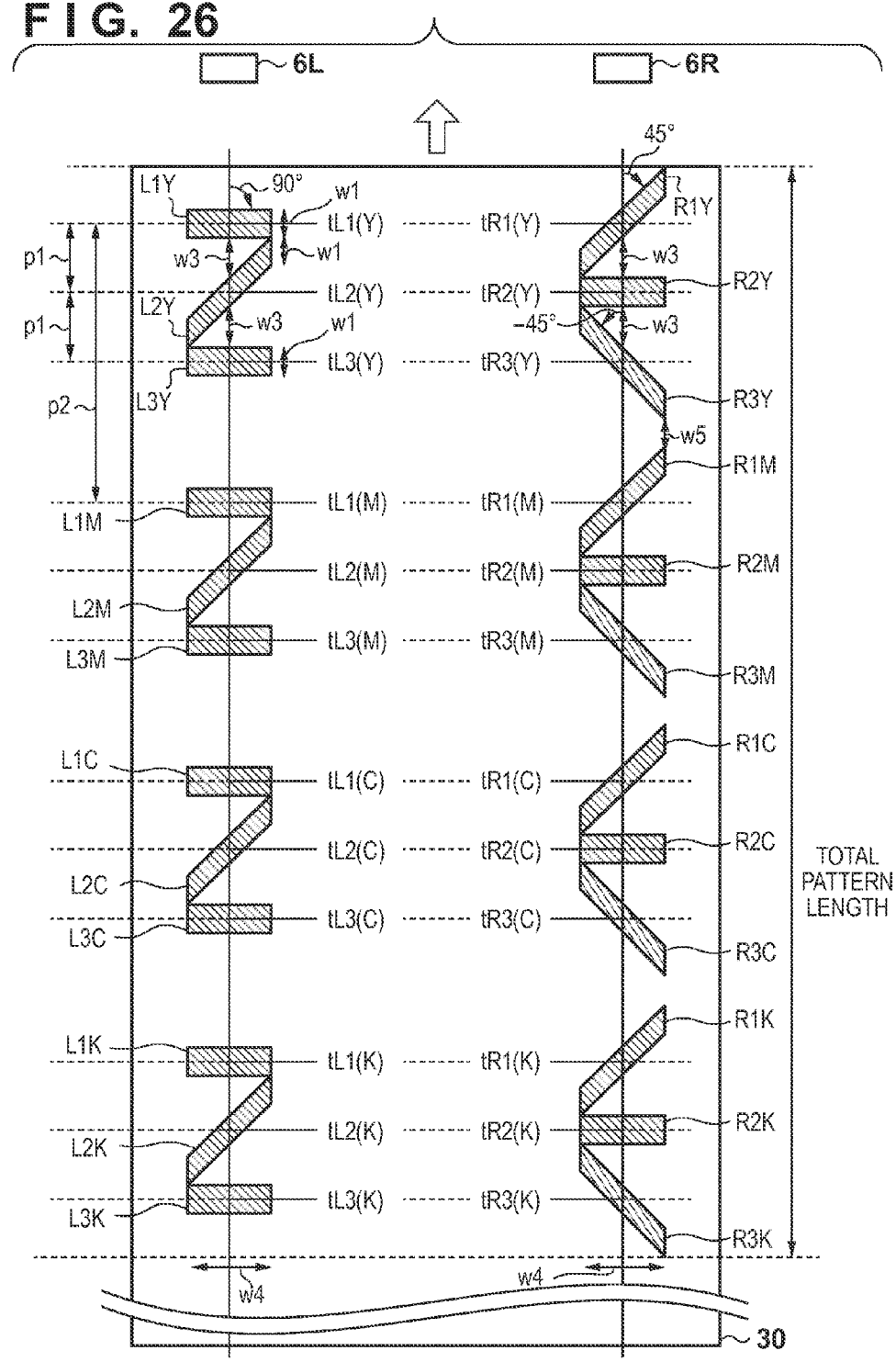
FIG. 26 is a view showing main-scanning misregistration detection patterns according to the fourth embodiment.

FIG. 26 shows main-scanning misregistration detection patterns according to this embodiment. In this embodiment, marks of a third pair, that is, a reference (traverse line) mark L3Y and a detection (slant line) mark R3Y having an angle=−45° to be made, the sign of which is opposite to that of the detection mark of pair 1, are added to the detection patterns (FIG. 12) of the first embodiment. The added marks are the same as those of the third embodiment (pair 1). Detection timings of these marks are respectively tL3(Y) and tR3(Y). Note that not only to yellow Y but also to the remaining colors, that is, magenta M, cyan C, and black K, similar marks of third pairs are added.

Note that in the arrangement example of the detection patterns described in this embodiment, the traverse line mark L3 will also be described as a third reference mark, and the slant line mark R3 will also be described as a third detection mark for the sake of convenience.

Also, a mark width w1, mark gaps w3 and w5, mark longitudinal width w4, and the like are the same as those of the detection patterns (FIG. 12) of the first embodiment. A mark interval p2 between colors is about 15.2 mm (360 dots), and a total length of the detection patterns is about 59.3 mm (1,400 dots). This total length of the detection patterns is longer than 35.6 mm of those of the first embodiment and about 50.8 of those of the second (third) embodiment. However, this total length is greatly shorter than 700 mm of the total belt length B. Therefore, the total length of the detection patterns of this embodiment is still greatly shorter than those of the related art.

[Main-Scanning Misregistration Value Calculation]

FIG. 25A shows the processing sequence for detecting the main-scanning misregistration detection patterns of this embodiment using a registration detection sensor (6L). Since processes of respective steps shown in FIG. 25A are the same as those of the respective steps shown in FIG. 20A, a detailed description thereof will not be repeated.

Figure 25B:
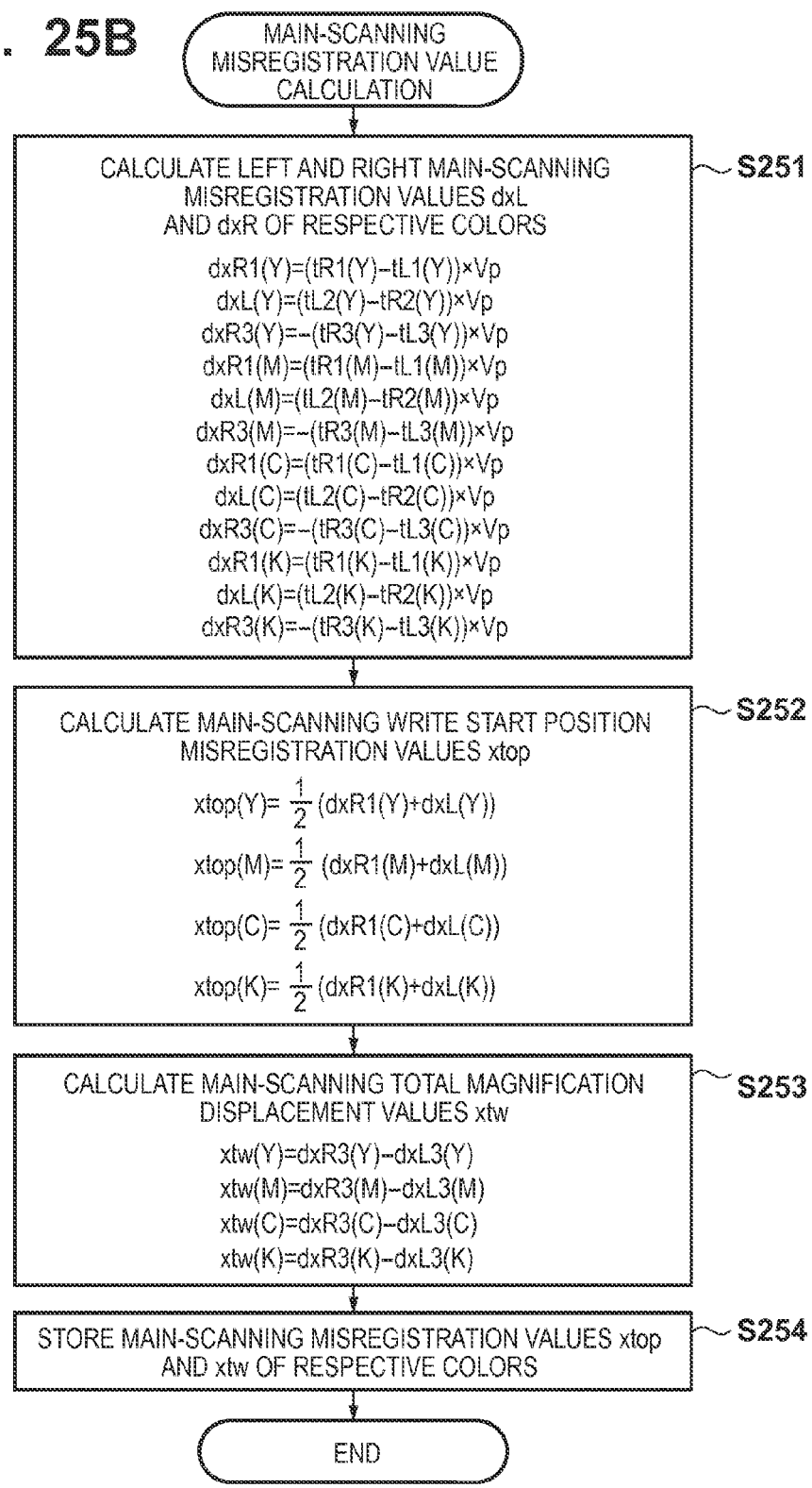

FIG. 25B shows the processing sequence for calculating, for respective colors, two types of main-scanning misregistration values, that is, main-scanning write start position misregistration and main-scanning total magnification displacement values in this embodiment. Since processes of respective steps shown in FIG. 25B are basically the same as those of respective steps shown in FIG. 11B, a detailed description thereof will not be repeated. Differences from FIG. 11B will be mainly described below.

In step S251, a control unit 1 calculates main-scanning misregistration values xL and xR of respective colors at registration detection sensors 6L and 6R.

The control unit 1 calculates a main-scanning misregistration value dxR1 from a detection timing tR1(Y) of a detection mark and a detection timing tL1(Y) of a reference mark in pair 1 of yellow Y. The control unit 1 calculates a main-scanning misregistration value dxL from a detection timing tL2(Y) of a detection mark and a detection timing tR2(Y) of a reference mark in pair 2. The control unit 1 calculates a main-scanning misregistration value dxR3 from a detection timing tR3(Y) of a detection mark and a detection timing tL3(Y) of a reference mark in pair 3. Since the same calculation formulas as in the first embodiment (pairs 1 and 2) apply to pairs 1 and 2, and the same calculation formula as in the third embodiment (pair 1) applies to pair 3, a detailed description thereof will not be repeated.

The main-scanning misregistration values dxR1, dxL, and dxR3 detected from respective pairs can be calculated using a moving velocity Vp (mm/s) of an intermediate transfer belt 30 by:

$$dxR1(Y)=(tR1(Y)-tL1(Y))\times Vp \quad (61)$$

$$dxL(Y)=(tL2(Y)-tR2(Y))\times Vp \quad (62)$$

$$dxR3(Y)=-(tR3(Y)-tL3(Y))\times Vp \quad (63)$$

By the similar methods, main-scanning misregistration values dxR1, dxL, and dxR3 detected from respective pairs of the remaining colors, that is, magenta M, cyan C, and black K can be respectively calculated by:

$$dxR1(M)=(tR1(M)-tL1(M))\times Vp \quad (64)$$

$$dxL(M)=(tL2(M)-tR2(M))\times Vp \quad (65)$$

$$dxR3(M)=-(tR3(M)-tL3(M))\times Vp \quad (66)$$

$$dxR1(C) = (tR1(C) - tL1(C)) \times Vp \quad (67)$$

$$dxL(C) = (tL2(C) - tR2(C)) \times Vp \quad (68)$$

$$dxR3(C) = -(tR3(C) - tL3(C)) \times Vp \quad (69)$$

$$dxR1(K) = (tR1(K) - tL1(K)) \times Vp \quad (70)$$

$$dxL(K) = (tL2(K) - tR2(K)) \times Vp \quad (71)$$

$$dxR3(K) = -(tR3(K) - tL3(K)) \times Vp \quad (72)$$

What kind of detection errors the main-scanning misregistration amounts dxR1, dxL, and dxR3, which are detected and calculated in step S251, become when a sub-scanning tilt described in FIG. 19A has occurred will be described below. Since a sub-scanning misregistration amount=+30 µm is generated at the position of the right registration detection sensor 6R, a main-scanning misregistration value dxR1(Y), which can be detected from pair 1 of yellow Y, is +30 µm, and a main-scanning misregistration value dxR3(Y), which can be detected from pair 3, is −30 µm. Then, since a sub-scanning misregistration amount=−30 µm is generated at the position of the registration detection sensor 6L, a main-scanning misregistration value dxL(Y) which can be detected from pair 2 of yellow Y is −30 µm.

That is, as can be seen from the above description, the main-scanning misregistration values dxR1(Y) and dxR3(Y) detected at the position of the right registration detection sensor 6R have the same amount as that of the left main-scanning misregistration value dxL(Y), but one value has the same sign as and the other value has a different sign from that of the left value. Thus, since a main-scanning write start position misregistration value xtop(Y) is calculated by averaging detected right and left main-scanning misregistration values dxR and dxL (equation (28)), dxR1(Y) which can cancel detection errors with each other can be used as dxR.

On the other hand, since a main-scanning total magnification displacement value xtw(Y) is calculated by calculating a difference between the detected right and left main-scanning misregistration values dxR and dxL (equation (32)), dxR3(Y) which can cancel detection errors with each other can be used as dxR. By selectively using the right main-scanning misregistration value, detection errors can be prevented from being generated.

Next, in step S252, the control unit 1 calculates main-scanning write start position misregistration values xtop of respective colors. As described above, the right main-scanning misregistration value dxR to be used in the calculation uses dxR1 of pair 1. Hence, a main-scanning write start position misregistration value xtop(Y) of yellow Y can be calculated from the misregistration values dxR1(Y) and dxL(Y) in the main-scanning direction of pairs 1 and 2 by:

$$xtop(Y) = \frac{1}{2}(dxR1(Y) + dxL(Y)) \quad (73)$$

By the similar methods, misregistration values of the remaining colors, that is, magenta M, cyan C, and black K can be respectively calculated by:

$$xtop(M) = \frac{1}{2}(dxR1(M) + dxL(M)) \quad (74)$$

$$xtop(C) = \frac{1}{2}(dxR1(C) + dxL(C)) \quad (75)$$

$$xtop(K) = \frac{1}{2}(dxR1(K) + dxL(K)) \quad (76)$$

Next, in step S253, the control unit 1 calculates main-scanning total magnification displacement values xtw. As described above, the right main-scanning misregistration value dxR used in the calculation uses dxR3 of pair 3. Hence, a main-scanning total magnification displacement value xtw(Y) of yellow Y can be calculated from the misregistration values dxR3(Y) and dxL(Y) in the main-scanning direction of pairs 3 and 2 by:

$$xtw(Y) = dxR3(Y) - dxL(Y) \quad (77)$$

By the similar methods, misregistration values of the remaining colors, that is, magenta M, cyan C, and black K can be respectively calculated by:

$$xtw(M) = dxR3(M) - dxL(M) \quad (78)$$

$$xtw(C) = dxR3(C) - dxL(C) \quad (79)$$

$$xtw(K) = dxR3(K) - dxL(K) \quad (80)$$

Then, in step S254, the control unit 1 stores the main-scanning write start position misregistration values xtop and main-scanning total magnification displacement values xtw of the respective colors in the EEPROM 4. The differences from the first, second, and third embodiments in this embodiment have been described.

Hence, this embodiment allows main-scanning misregistration value detection which does not require any sub-scanning tilt misregistration correction.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-172304, filed Aug. 2, 2012, which is hereby incorporated by reference herein in its entirety.

What is claimed is:

1. A color image forming apparatus, which comprises a plurality of image forming units, corresponding to respective colors, for forming images on an intermediate transfer member or a conveyed printing material, in a tandem system, comprising:

a control unit configured to control the plurality of image forming units to form misregistration detection patterns on the intermediate transfer member, the printing material, or a conveyance member which conveys the printing material;

a first detection unit and a second detection unit configured to detect the formed misregistration detection patterns, said first detection unit and said second detection unit being arranged to be juxtaposed in a direction perpendicular to a moving direction of the intermediate transfer member or in a direction perpendicular to a conveyance direction of the printing material;

a calculation unit configured to calculate misregistration values from detection results of the misregistration detection patterns by said first detection unit and said second detection unit; and a correction unit configured to correct image forming conditions by the plurality of image forming units using the calculated misregistration values, wherein the misregistration detection patterns include:

a linear first reference mark and a first detection mark to be detected by said first detection unit; and a linear second reference mark and a second detection mark to be detected by said second detection unit, the linear first reference mark and the linear second reference mark make substantially 90° as an angle with the moving direction of the intermediate transfer member or the conveyance direction of the printing material, an angle the second detection mark makes with the moving direction of the intermediate transfer member or the conveyance direction of the printing material is smaller than the angle made by the linear first reference mark, an angle the first detection mark makes with the moving direction of the intermediate transfer member or the conveyance direction of the printing material is smaller than the angle made by the linear second reference mark, the linear first reference mark and the second detection mark are arranged so that a detection timing of the linear first reference mark by said first detection unit and a detection timing of the second detection mark by said second detection unit are concurrent timings when no misregistration occurs on the intermediate transfer member, the printing material, or the conveyance member, and the linear second reference mark and the first detection mark are arranged so that a detection timing of the first detection mark by said first detection unit and a detection timing of the linear second reference mark by said second detection unit are concurrent timings when no misregistration occurs on the intermediate transfer member, the printing material, or the conveyance member.

2. The apparatus according to claim 1, wherein letting θ1 be the angle the first detection mark makes with the moving direction of the intermediate transfer member or the conveyance direction of the printing material, and letting θ2 be the angle the second detection mark makes with the moving direction of the intermediate transfer member or the conveyance direction of the printing material, when said calculation unit calculates a difference between the detection timings of the linear first reference mark and the second detection mark, said calculation unit multiplies the difference by cot(90°-θ2) as a coefficient, and when said calculation unit calculates a difference between the detection timings of the linear second reference mark and the first detection mark, said calculation unit multiplies the difference by cot(90°-θ1) as a coefficient.

3. The apparatus according to claim 1, wherein said calculation unit calculates a tilt misregistration value as a tilt with respect to the moving direction of the intermediate transfer member or the conveyance direction of the printing material based on a difference between a detection timing of the linear first reference mark by said first detection unit and a detection timing of the second detection mark by said second detection unit and a difference between a detection timing of the first detection mark by said first detection unit and a detection timing of the linear second reference mark by said second detection unit, and the misregistration values are corrected according to the tilt misregistration value.

4. The apparatus according to claim 3, wherein when the angle the first detection mark makes with the moving direction of the intermediate transfer member or the conveyance direction of the printing material and the angle the second detection mark makes with the moving direction of the intermediate transfer member or the conveyance direction of the printing material have the same sign, said calculation unit corrects the total magnification displacement value of the misregistration values according to the tilt misregistration value.

5. The apparatus according to claim 3, wherein when the angle the first detection mark makes with the moving direction of the intermediate transfer member or the conveyance direction of the printing material and the angle the second detection mark makes with the moving direction of the intermediate transfer member or the conveyance direction of the printing material have different signs, said calculation unit corrects the write start position misregistration value of the misregistration values according to the tilt misregistration value.

6. The apparatus according to claim 1, wherein the angle the first detection mark makes with the moving direction of the intermediate transfer member or the conveyance direction of the printing material is 45°, and the angle the second detection mark makes with the moving direction of the intermediate transfer member or the conveyance direction of the printing material is 45°.

7. The apparatus according to claim 1, wherein the misregistration values include a write start position misregistration value indicating a misregistration value of a write start position and a total magnification displacement value indicating a misregistration value of an output magnification in the direction perpendicular to the moving direction of the intermediate transfer member or the direction perpendicular to the conveyance direction of the printing material, said calculation unit calculates the write start position misregistration value from an average value of a difference between detection timings of the linear first reference mark and the second detection mark and a difference between detection timings of the linear second reference mark and the first detection mark, and said calculation unit calculates the total magnification displacement value from a difference between the difference between detection timings of the linear first reference mark and the second detection mark and the difference between the detection timings of the linear second reference mark and the first detection mark.

8. A color image forming apparatus, which comprises a plurality of image forming units, corresponding to respective colors, for forming images on an intermediate transfer member or a conveyed printing material, in a tandem system, comprising:

a control unit configured to control the plurality of image forming units to form misregistration detection patterns on the intermediate transfer member, the printing material, or a conveyance member which conveys the printing material;

a first detection unit and a second detection unit configured to detect the misregistration detection patterns formed on the intermediate transfer member, the printing material, or the conveyance member which conveys the printing material, said first detection unit and said second detection unit being arranged to be juxtaposed in a direction perpendicular to a moving direction of the intermediate transfer member or in a direction perpendicular to a conveyance direction of the printing material;

a calculation unit configured to calculate misregistration values from detection results of the misregistration detection patterns by said first detection unit and said second detection unit; and a correction unit configured to correct image forming conditions by the plurality of image forming units from the calculated misregistration values, wherein the misregistration detection patterns include:

a linear first reference mark, a first detection mark, and a linear third reference mark to be detected by said first detection unit; and a linear second reference mark, a second detection mark, and a third detection mark to be detected by said second detection unit, the linear first reference mark, the second reference mark, and the linear third reference mark make substantially 90° as an angle with the moving direction of the intermediate transfer member or the conveyance direction of the printing material, an angle the second detection mark makes with the moving direction of the intermediate transfer member or the conveyance direction of the printing material is smaller than the angle made by the linear first reference mark, an angle the first detection mark makes with the moving direction of the intermediate transfer member or the conveyance direction of the printing material is smaller than the angle made by the linear second reference mark, an angle the third detection mark makes with the moving direction of the intermediate transfer member or the conveyance direction of the printing material has a sign different from the angle the second detection mark makes with the moving direction of the intermediate transfer member or the conveyance direction of the printing material, the linear first reference mark and the second detection mark are arranged so that a detection timing of the linear first reference mark by said first detection unit and a detection timing of the second detection mark by said second detection unit are concurrent timings when no misregistration occurs on the intermediate transfer member, the printing material, or the conveyance member, the linear second reference mark and the first detection mark are arranged so that a detection timing of the first detection mark by said first detection unit and a detection timing of the linear second reference mark by said second detection unit are concurrent timings when no misregistration occurs on the intermediate transfer member, the printing material, or the conveyance member, and the linear third reference mark and the third detection mark are arranged so that a detection timing of the linear third reference mark by said first detection unit and a detection timing of the third detection mark by said second detection unit are concurrent timings when no misregistration occurs on the intermediate transfer member, the printing material, or the conveyance member.

9. The apparatus according to claim 8, wherein the misregistration values include a write start position misregistration value indicating a misregistration value of a write start position and a total magnification displacement value indicating a misregistration value of an output magnification in the direction perpendicular to the moving direction of the intermediate transfer member or the direction perpendicular to the conveyance direction of the printing material, said calculation unit calculates the write start position misregistration value from an average value of a difference between detection timings of the linear first reference mark and the second detection mark and a difference between detection timings of the linear second reference mark and the first detection mark, and said calculation unit calculates the total magnification displacement value from a difference between a value of a different sign of a difference between detection timings of the linear third reference mark and the third detection mark and the difference between the detection timings of the linear second reference mark and the first detection mark.

10. A color image forming apparatus comprising:

an image forming unit configured to form misregistration detection patterns;

a transfer member on which the misregistration detection patterns are transferred;

a first detection unit and a second detection unit arranged to be juxtaposed in a direction perpendicular to a moving direction of said transfer member; and a control unit configured to control an image forming condition by said image forming unit based on a result of detecting the misregistration detection patterns, wherein the misregistration detection patterns include a linear first reference mark and a first detection mark to be detected by said first detection unit, and a linear second reference mark and a second detection mark to be detected by said second detection unit, the linear first reference mark, the linear second reference mark, the first detection mark and the second detection mark are formed with toner of the same color, and are marks for detecting misregistration in a main-scanning direction, and said first detection unit detects the linear first reference mark and then detects the first detection mark subsequent to the linear first reference mark, and said second detection unit detects the second detection mark and then detects the linear second reference mark subsequent to the second detection mark.

11. The apparatus according to claim 10, wherein the linear first reference mark and the second detection mark are arranged so that a detection timing of the linear first reference mark by said first detection unit and a detection timing of the second detection mark by said second detection unit are concurrent timings when no misregistration occurs on the transfer member, and the linear second reference mark and the first detection mark are arranged so that a detection timing of the first detection mark by said first detection unit and a detection timing of the linear second reference mark by said second detection unit are concurrent timings when no misregistration occurs on the transfer member.

12. The apparatus according to claim 10, wherein when a misregistration occurs in the direction perpendicular to the moving direction of said transfer member, detection timings of the first detection mark and the second detection mark by said first detection unit and said second detection unit are different from detection timings when no misregistration occurs, and detection timings of the linear first reference mark and the linear second reference mark by said first detection unit and said second detection unit are the same as detection timings when no misregistration occurs.

13. The apparatus according to claim 10, wherein the misregistration detection patterns further include a linear third reference mark to be detected by said first detection unit and a linear fourth reference mark to be detected by said second detection unit, and said first detection unit detects the first detection mark and then detects the linear third reference mark, and said second detection unit detects the second detection mark and then detects the linear fourth reference mark.

14. The apparatus according to claim 13, wherein the linear third reference mark and the linear fourth reference mark are arranged so that a detection timing of the linear third reference mark by said first detection unit and a detection timing of the linear fourth reference mark by said second detection unit are concurrent timings.

15. The apparatus according to claim 10, wherein the misregistration detection patterns further include a linear third reference mark to be detected by said first detection unit and a third detection mark to be detected by said second detection unit, and said first detection unit detects the first detection mark and then detects the linear third reference mark, and said second detection unit detects the second detection mark and then detects the third detection mark.

16. The apparatus according to claim 15, wherein the linear third reference mark and the linear third detection mark are arranged so that a detection timing of the third reference mark by said first detection unit and a detection timing of the third detection mark by said second detection unit are concurrent timings when no misregistration occurs on the transfer member.

17. The apparatus according to claim 10, wherein the first detection mark is slanted with respect to the linear first reference mark, and the second detection mark is slanted with respect to the linear second reference mark.

18. A color image forming apparatus, comprising:

an image forming unit that forms a misregistration detection pattern;

a transfer member to which the misregistration detection pattern is transferred;

a detector that detects the misregistration detection pattern; and a controller that controls a condition for image forming by said image forming unit according to a result of detecting the misregistration detection pattern, wherein the misregistration detection pattern includes a linear reference mark and a detection mark, the linear reference mark and the detection mark, which are formed with toner of the same color, are marks for detecting misregistration in a main-scanning direction, and wherein in view of a direction perpendicular to a moving direction of said transfer member and a direction along a surface of said transfer member, at least a portion of each of the linear reference mark and the detection mark are overlapped.

19. The apparatus according to claim 18, wherein said detector comprises first and second detection units that detect the misregistration detection pattern, wherein the misregistration detection pattern includes, as the linear reference mark and the detection mark, a linear first reference mark and a first detection mark to be detected by said first detection unit, and a linear second reference mark and a second detection mark to be detected by said second detection unit, wherein the linear first reference mark, the linear second reference mark, the first detection mark and the second detection mark are formed with toner of the same color, and wherein in view of the direction perpendicular to the moving direction of said transfer member, and the direction along the surface of said transfer member, at least a portion of each of the linear first reference mark and the linear second detection mark are overlapped and at least a portion of each of the first detection mark and the linear second reference mark are overlapped.

20. The apparatus according to claim 19, wherein the linear first reference mark and the second detection mark are arranged so that a detection timing of the linear first reference mark by said first detection unit and a detection timing of the second detection mark by said second detection unit are concurrent timings when no misregistration occurs on said transfer member, and the linear second reference mark and the first detection mark are arranged so that a detection timing of the first detection mark by said first detection unit and a detection timing of the linear second reference mark by said second detection unit are concurrent timings when no misregistration occurs on said transfer member.

21. The apparatus according to claim 19, wherein when misregistration occurs in the direction perpendicular to the moving direction of said transfer member, detection timings of the first detection mark and the second detection mark by said first detection unit and said second detection unit are different from detection timings when no misregistration occurs, and detection timings of the linear first reference mark and the linear second reference mark by said first detection unit and said second detection unit are the same as detection timings when no misregistration occurs.

22. The apparatus according to claim 19, wherein the misregistration detection pattern further includes a linear third reference mark to be detected by said first detection unit and a linear fourth reference mark to be detected by said second detection unit, and in view of the direction perpendicular to the moving direction of said transfer member and the direction along the surface of said transfer member, at least a portion of each of the linear third reference mark and linear fourth reference mark are overlapped.

23. The apparatus according to claim 22, wherein the linear third reference mark and the linear fourth reference mark are arranged so that a detection timing of the linear third reference mark by said first detection unit and a detection timing of the linear fourth reference mark by said second detection unit are concurrent timings.

24. The apparatus according to claim 19, wherein the misregistration detection pattern further includes a linear third reference mark to be detected by said first detection unit and a third detection mark to be detected by said second detection unit, and in view of the direction perpendicular to the moving direction of said transfer member and the direction along the surface of said transfer member, at least a portion of each of the linear third reference mark and the third detection mark are overlapped.

25. The apparatus according to claim 24, wherein the linear third reference mark and the third detection mark are arranged so that a detection timing of the linear third reference mark by said first detection unit and a detection timing of the third detection mark by said second detection unit are concurrent timings when no misregistration occurs on said transfer member.

26. The apparatus according to claim 18, wherein an angle formed by the linear reference mark and the moving direction of said transfer member is different from an angle formed by the detection mark and the moving direction of said transfer member.

27. The apparatus according to claim 18, wherein the detection mark is slanted with respect to the linear reference mark.

28. A color image forming apparatus, comprising:
an image forming unit that forms a misregistration detection pattern;
a transfer member to which the misregistration detection pattern is transferred;
a detector that detects the misregistration detection pattern; and
a controller that controls a condition for image forming by said image forming unit according to a result of detecting the misregistration detection pattern,
wherein said controller causes said image forming unit to form a misregistration detection pattern for a sub-scanning direction in a case of detecting a misregistration value in the sub-scanning direction, and said controller causes said image forming unit to form a misregistration detection pattern for a main-scanning direction in a case of detecting a misregistration value in the main-scanning direction, and
wherein the misregistration detection pattern for the main-scanning direction is formed after the transfer member is rotated one or more revolutions after starting of forming the misregistration detection pattern for the sub-scanning direction, or the misregistration detection pattern for the sub-scanning direction is formed after the transfer member is rotated one or more revolutions after starting of forming the misregistration direction pattern for the main-scanning direction.

29. The apparatus according to claim 28, wherein the misregistration detection pattern for the sub-scanning direction comprises a linear mark formed in a direction perpendicular to a moving direction of said transfer member, and
the misregistration detection pattern for the main-scanning direction comprises a linear reference mark and a linear detection mark, wherein the linear reference mark is formed in the direction perpendicular to the moving direction of the transfer member, and the linear detection mark is formed in a direction different from the direction of the linear reference mark.

30. The apparatus according to claim 28, wherein said detector comprises first and second detection units positioned in the direction perpendicular to the moving direction of said transfer member,
the misregistration detection pattern comprises a first reference mark and a first detection mark which are detected by said first detection unit and a second reference mark and a second detection mark which are detected by said second detection unit, and
in view of the direction perpendicular to the moving direction of said transfer member and the direction along the surface of said transfer member, at least a portion of each of the first reference mark and second detection mark are overlapped and at least a portion of each of the first detection mark and second reference mark are overlapped.

31. The apparatus according to claim 28, wherein said detector comprises first and second detection units positioned in the direction perpendicular to the moving direction of said transfer member,
the misregistration detection pattern comprises a first reference mark and a first detection mark which are detected by said first detection unit and a second reference mark and a second detection mark which are detected by said second detection unit,
the first reference mark and the second detection mark are arranged so that a detection timing of the first reference mark by said first detection unit and a detection timing of the second detection mark by said second detection unit are concurrent timings when no misregistration occurs on said transfer member, and
the second reference mark and the first detection mark are arranged so that a detection timing of the first detection mark by said first detection unit and a detection timing of the second reference mark by said second detection unit are concurrent timings when no misregistration occurs on said transfer member.

32. A color image forming apparatus comprising:
an image forming unit configured to form misregistration detection patterns;
a transfer member on which the misregistration detection patterns are transferred;
a first detection unit and a second detection unit arranged to be juxtaposed in a direction perpendicular to a moving direction of said transfer member; and
a control unit configured to control an image forming condition by said image forming unit based on a result of detecting the misregistration detection patterns,
wherein the misregistration detection patterns include a first mark and a second mark to be detected by said first detection unit, and a third mark and a fourth mark to be detected by said second detection unit,
wherein the first mark, the second mark, the third mark, and the fourth mark are formed with toner of the same color, and are marks for detecting misregistration in a main-scanning direction,
wherein in view of the direction perpendicular to the moving direction of said transfer member and the direction along a surface of said transfer member, at least a portion of each of the first mark and the third mark are overlapped and at least a portion of each of the second mark and the fourth mark are overlapped, and
wherein the third mark is slanted with respect to the first mark, and the second mark is slanted with respect to the first mark and the fourth mark.

33. The apparatus according to claim 32, wherein the first mark and the fourth mark are linear marks which are formed in the direction perpendicular to the moving direction of said transfer member and the direction along the surface of said transfer member.

* * * * *